United States Patent

Dohta et al.

[11] Patent Number: 5,845,489
[45] Date of Patent: Dec. 8, 1998

[54] ABNORMALITY DETECTOR FOR AIR-FUEL RATIO CONTROL SYSTEM

[75] Inventors: Hisayo Dohta, Chiryu; Shigenori Isomura, Kariya; Katsuhiko Kawai, Nagoya, all of Japan

[73] Assignee: Denso Corporation, Kariya, Japan

[21] Appl. No.: 743,741

[22] Filed: Nov. 7, 1996

[30] Foreign Application Priority Data

Nov. 8, 1995 [JP] Japan .................................. 7-289755
Dec. 15, 1995 [JP] Japan .................................. 7-326661
May 27, 1996 [JP] Japan .................................. 8-131707

[51] Int. Cl.⁶ .............................. F01N 3/00; F02D 41/14
[52] U.S. Cl. .............................. 60/276; 60/277; 60/285; 73/118.1; 123/688
[58] Field of Search .............................. 60/274, 276, 277, 60/285; 123/688; 73/23.32, 118.1

[56] References Cited

U.S. PATENT DOCUMENTS

| | | | |
|---|---|---|---|
| 4,724,814 | 2/1988 | Mieno et al. | 123/688 |
| 5,228,335 | 7/1993 | Clemmens et al. | 73/118.1 |
| 5,289,678 | 3/1994 | Grutter | 60/277 |
| 5,317,868 | 6/1994 | Blischke et al. | 60/274 |
| 5,385,016 | 1/1995 | Zimlich et al. | 60/274 |
| 5,417,099 | 5/1995 | Ohuchi | 60/276 X |
| 5,544,481 | 8/1996 | Davey et al. | 60/277 X |
| 5,595,061 | 1/1997 | Toyoda | 60/277 X |
| 5,622,047 | 4/1997 | Yamashita et al. | 60/277 X |
| 5,673,555 | 10/1997 | Achleitner | 60/277 X |

FOREIGN PATENT DOCUMENTS

| | | |
|---|---|---|
| 5-141227 | 6/1993 | Japan . |
| 6-26330 | 2/1994 | Japan . |
| 6-193436 | 7/1994 | Japan . |

*Primary Examiner*—Tony M. Argenbright
*Attorney, Agent, or Firm*—Nixon & Vanderhye P.C.

[57] ABSTRACT

An inflow quantity of an exhaust gas component flowing into a catalyst is calculated based upon air fuel ratio detected by an upstream air fuel ratio sensor which is provided on the upstream side of the catalyst. In addition, an outflow quantity of an exhaust gas component flowing out of the catalyst is calculated based upon air fuel ratio detected by a downstream air fuel ratio sensor which is provided on the downstream side of the catalyst. The quantity of an exhaust gas component absorbed by the catalyst can be detected in real time based upon a difference between the inflow quantity and outflow quantity. Thus, a state of the catalyst can be precisely detected in real time.

35 Claims, 44 Drawing Sheets

TARGET AIR
FUEL RATIO
λTG

CORRECTION
FACTOR
FAF

AIR FUEL RATIO
λ

FIRST COUNTER
CT1

SECOND COUNTER
CT2

FIG. 21A TEMPERATURE CORRECTION FACTOR FWL

FIG. 21B LOAD CORRECTION FACTOR FOTP

FIG. 21C AIR FUEL RATIO CORRECTION FACTOR FAF

FIG. 21D AIR FUEL RATIO λ

FIG. 21E VEHICLE SPEED

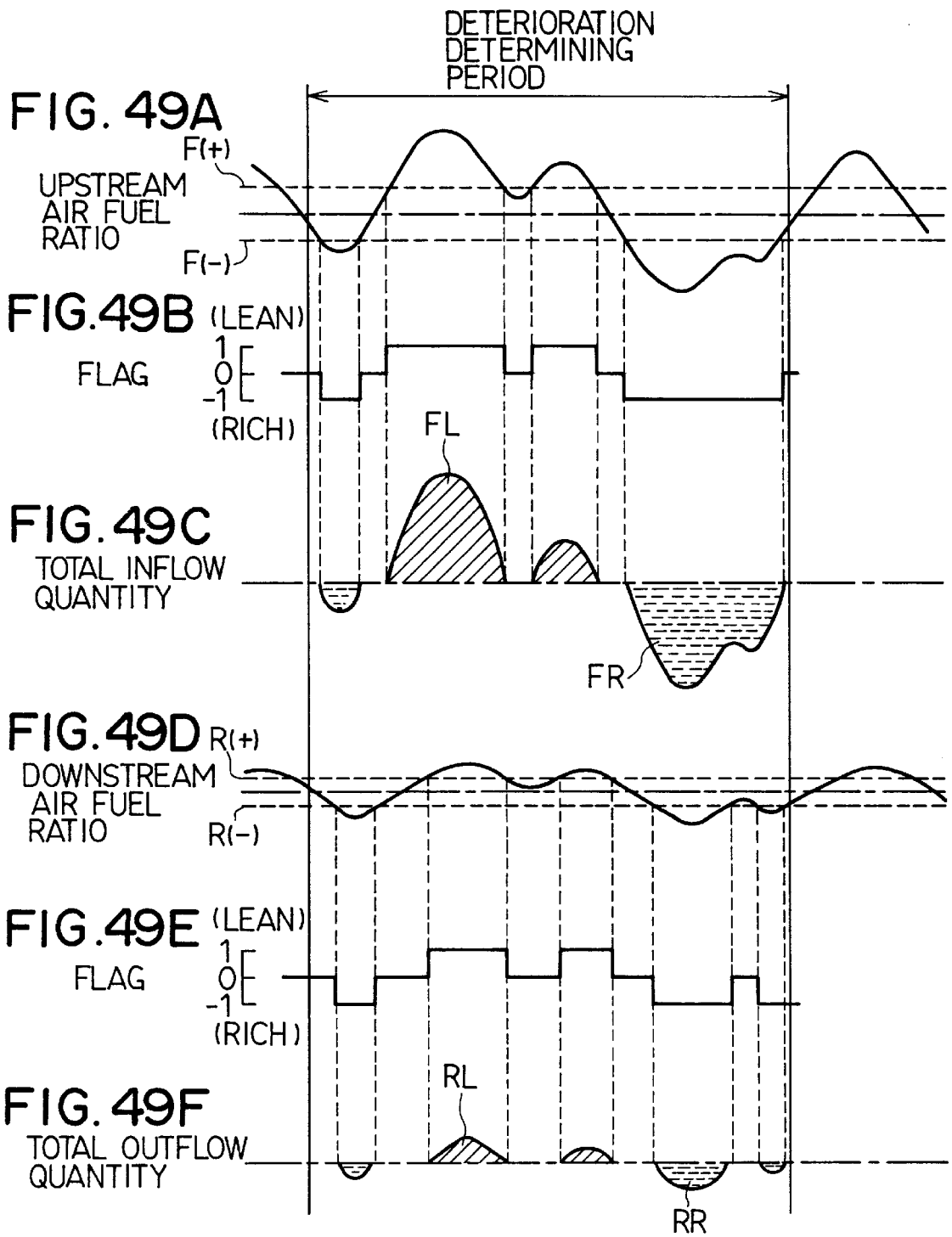

FIG. 50A UPSTREAM FA/F F(+) F(−)
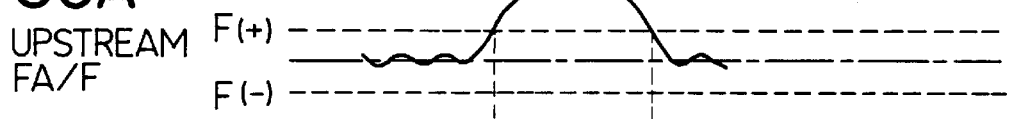
FIG. 50B UPSTREAM FA/F FLAG (LEAN) 1 0 −1 (RICH)
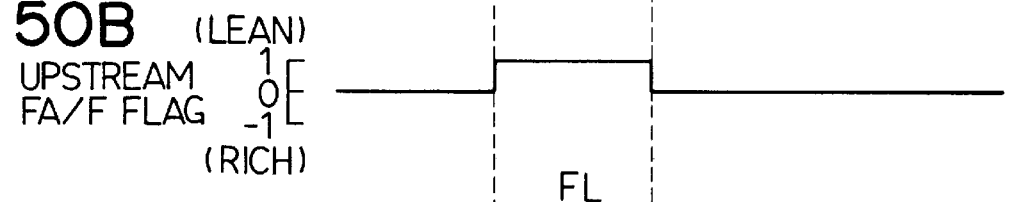
FIG. 50C LEAN COMPONENT QUANTITY
FL
FIG. 50D DOWNSTREAM RA/F R(+) R(−)
Δtk
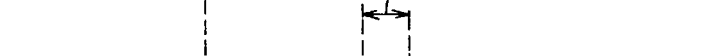
FIG. 50E DOWNSTREAM RA/F FLAG (LEAN) 1 0 −1 (RICH)
FIG. 50F dt COUNT FLAG    0  1  0

ABNORMALITY DETECTOR FOR AIR-FUEL RATIO CONTROL SYSTEM

CROSS REFERENCE TO RELATED APPLICATION

This application is based upon and claims the benefit of priority of prior Japanese Patent Application No. 7-289755 filed on Nov. 8, 1995, No. 7-326661 filed on Dec. 15, 1995, and No 8-131707 filed on May 27, 1996, the contents of which are incorporated herein by reference.

BACKGROUND OF THE INVENTION

1. Field of the Invention

The present invention relates to an abnormality detector for an air-fuel ratio control system. It detects the state of a catalyst for purifying exhaust gas based upon outputs from air-fuel ratio sensors respectively set on the upstream and downstream sides of the catalyst and detects the state of the air-fuel ratio sensors.

2. Description of the Related Art

To detect the degree of catalyst deterioration for purifying exhaust gas, Japanese published unexamined patent application No. Hei 6-17640 teaches a saturated absorption quantity detecting apparatus for a catalyst. In the detecting apparatus, fuel injection quantity (target air fuel ratio) is varied by a predetermined correction quantity for a predetermined time continuously so that the air-fuel ratio of exhaust gas approaches rich or lean until the output of an air-fuel ratio sensor set on the downstream side of a catalyst reaches saturation. A saturated absorption quantity (maximum absorption quantity) of a catalyst is calculated based upon the correction quantity for fuel injection and a time duration wherein the correction of fuel injection quantity has been performed when the output of the air fuel ratio sensor set on the downstream side reaches saturation. In this case, the catalyst is already saturated before the air fuel ratio sensor output reaches saturation. That is, there is a time lag between the time when the output of the air-fuel ratio sensor reaches saturation and the time when the rich or lean component of exhaust gas (which cannot be absorbed by the catalyst) flows on the downstream side of the catalyst. As the result, a maximum absorption quantity of the catalyst cannot be correctly detected due to the time lag.

In an air fuel ratio control system, the precision of air-fuel ratio control is remarkably deteriorated if an air fuel ratio sensor cannot correctly detect air fuel ratio. Therefore, it is desired to diagnose the state of an air fuel ratio sensor precisely. For example, Japanese published unexamined patent application No. Sho 62-225943 discloses "a method of detecting the abnormality of an oxygen concentration sensor". According to the method, an abnormality of an air-fuel ratio sensor of a limiting current type (oxygen concentration sensor) is detected based upon the relationship between an applied voltage and a detected current.

However, in this case, although failures such as a disconnections and short circuits can be detected, deterioration of the air fuel ratio sensor itself cannot be detected. That is, even if the deterioration of an air fuel ratio sensor has occurred, as long as its output is within a normal range, the engine control computer controls the engine based on the air fuel ratio sensor output. As a result, the precision of air-fuel ratio control may be remarkably deteriorated.

SUMMARY OF THE INVENTION

The object of the present invention is to provide a detector for detecting the abnormality of an air fuel ratio control system by detecting the state of an air fuel ratio sensor and/or catalyst precisely.

In one aspect of the present invention, an inflow quantity of an exhaust gas component flowing into a catalyst is calculated based upon air fuel ratio on the upstream side of the catalyst. An outflow quantity of an exhaust gas component flowing out of the catalyst is calculated based upon air fuel ratio on the downstream side of the catalyst. The catalyst state is detected based upon the inflow quantity and outflow quantity of the exhaust gas component. That is, the quantity of the exhaust gas component absorbed by the catalyst can be detected without time lag based upon the difference between inflow quantities and outflow quantity of the exhaust gas component. Thus, the state of the catalyst can be precisely detected in real time.

In another aspect according to the present invention, a central value of air fuel ratio on the upstream side of a catalyst is determined based upon the output of an upstream air fuel ratio sensor provided on the upstream side of the catalyst. In addition, a central value of air fuel ratio on the downstream side of the catalyst is determined based upon the output of a downstream air fuel ratio sensor provided on the downstream side of the catalyst. An error between the central values of air fuel ratio on the upstream and downstream sides of the catalyst is determined. It is determined whether the upstream air fuel ratio sensor or the downstream air fuel ratio sensor is abnormal based upon whether the error is in a predetermined range.

That is, the central value of air fuel ratio on the upstream side of the catalyst and that on the downstream side are substantially equal if the upstream and downstream air fuel ratio sensors are normal. Therefore, when the error is out of a predetermined range, either of the upstream and downstream air fuel ratio sensors is determined to be deteriorated or to have failed. As a result, an abnormality of the upstream air fuel sensor or downstream air fuel sensor can be precisely determined.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIGS. 49A to 49F are time charts showing an example of processing in the deterioration determination period;

FIGS. 50A to 50F are time charts showing an operation for cancelling the inflow of an exhaust gas component;

DETAILED DESCRIPTION OF PRESENTLY PREFERRED EMBODIMENTS (First Embodiment)

Figure 1:
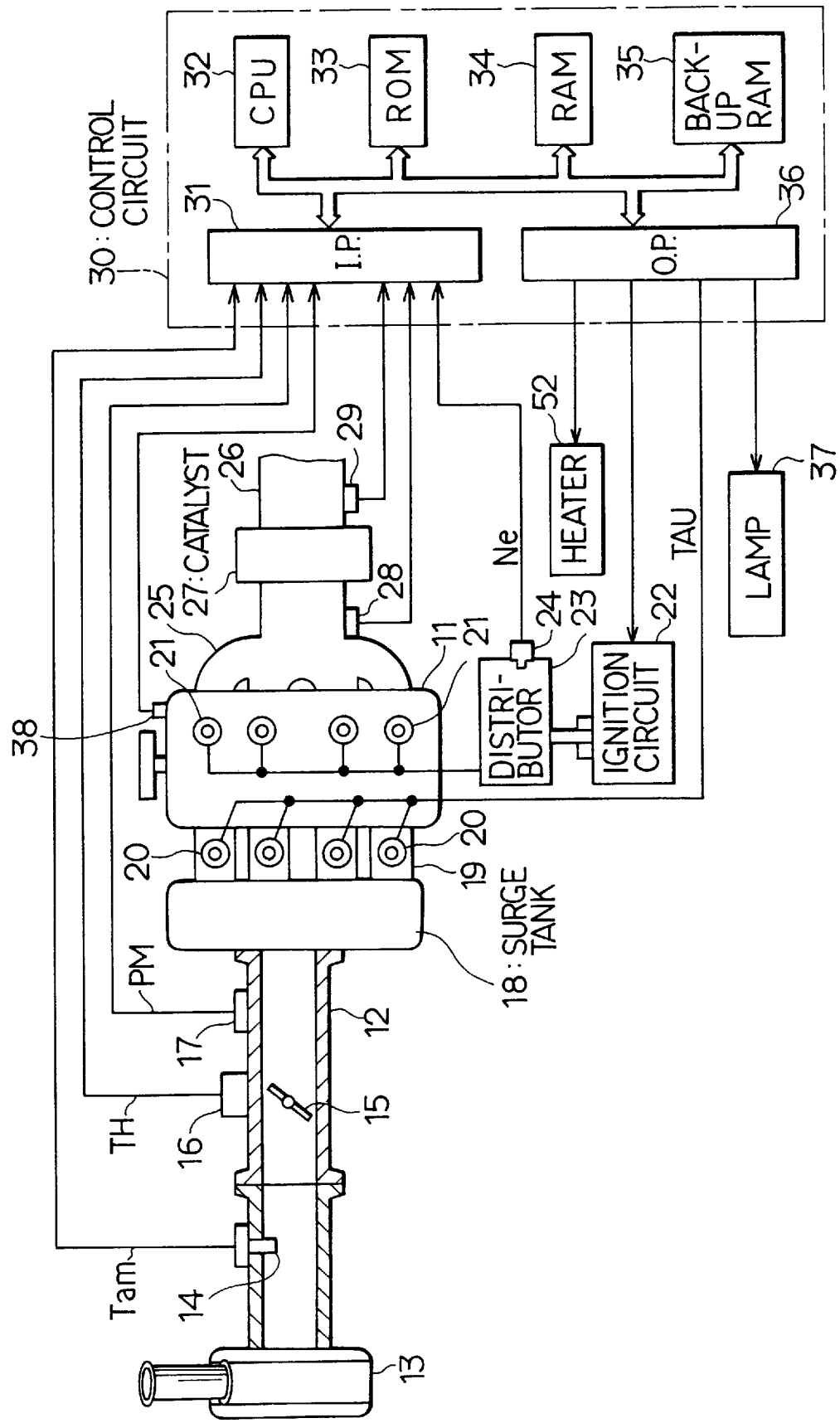
FIG. 1 is a schematic block diagram showing an overall engine control system of a first embodiment according to the present invention.

A first embodiment according to the present invention will be described below referring to FIGS. 1 to 13. First, referring to FIG. 1, the schematic constitution of an overall engine control system will be described. An air cleaner 13 is provided in the most upstream portion of an inlet pipe 12 of an engine 11 which is an internal combustion engine. An intake air temperature sensor 14 for detecting intake air temperature Tam is provided on the downstream side of air cleaner 13. A throttle valve 15 and a throttle opening sensor 16 for detecting the opening position TH of throttle valve 15 are provided on the downstream side of intake air temperature sensor 14. Further, an inlet pipe pressure sensor 17 for detecting pressure PM in inlet pipe 12 is provided on the downstream side of throttle valve 15. A surge tank 18 is provided on the downstream side of inlet pipe pressure sensor 17. An inlet manifold 19 for sending air into each cylinder of engine 11 is connected to surge tank 18. Injectors 20 for injecting fuel are attached to the branch pipes of inlet manifold 19.

Spark plugs 21 are attached to every cylinder in engine 11. High-voltage current generated in an ignition circuit 22 is supplied to each spark plug 21 via a distributor 23. A crank angle sensor 24 for generating, for example, twenty-four pulse signals in 720° CA (equivalent to two rotations of a crankshaft) is provided to distributor 23. An engine speed Ne is detected based on intervals of output pulse signals from crank angle sensor 24. A coolant temperature sensor 38 for detecting the temperature Thw of engine coolant is attached to engine 11.

In the meantime, an exhaust pipe 26 (an exhaust gas passage) is connected to an exhaust port (not shown) of engine 11 via an exhaust manifold 25. A catalyst 27 such as catalytic converter rhodium for reducing a harmful component (Co, HC, NOx and others) in exhaust gas is provided in exhaust pipe 26. An upstream air fuel ratio sensor 28 and a downstream air fuel ratio sensor 29 which generate linear air-fuel ratio signal (limiting current) in response to air fuel ratio in exhaust gas are provided on the upstream and downstream sides of catalyst 27, respectively.

Figure 2:
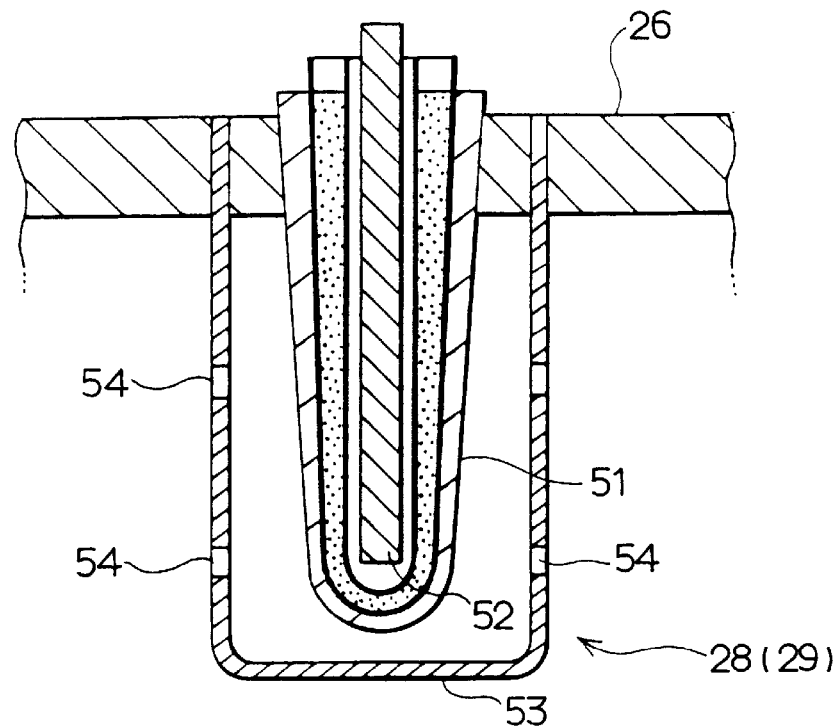
FIG. 2 is a sectional view showing the detailed constitution of an air fuel ratio sensor on the upstream side of a catalyst.

Upstream and downstream air fuel ratio sensors 28 and 29 have structure shown in FIG. 2. The structure will be described in detail below. Air fuel ratio sensors 28 and 29 are attached to exhaust pipe 26 so that they protrude inside exhaust pipe 26. Air fuel ratio sensors 28 and 29 are respectively constituted by an oxygen concentration detecting element 51 for generating limiting current corresponding to the concentration of oxygen in an air fuel ratio lean area or the concentration of carbon monoxide (CO) in an air fuel ratio rich area. A heater 52 for heating oxygen concentration detecting element 51 from its inside. A cover 53 for covering oxygen concentration detecting element 51. A large number of small holes 54 through which exhaust gas flows in are formed through cover 53.

Figure 3:
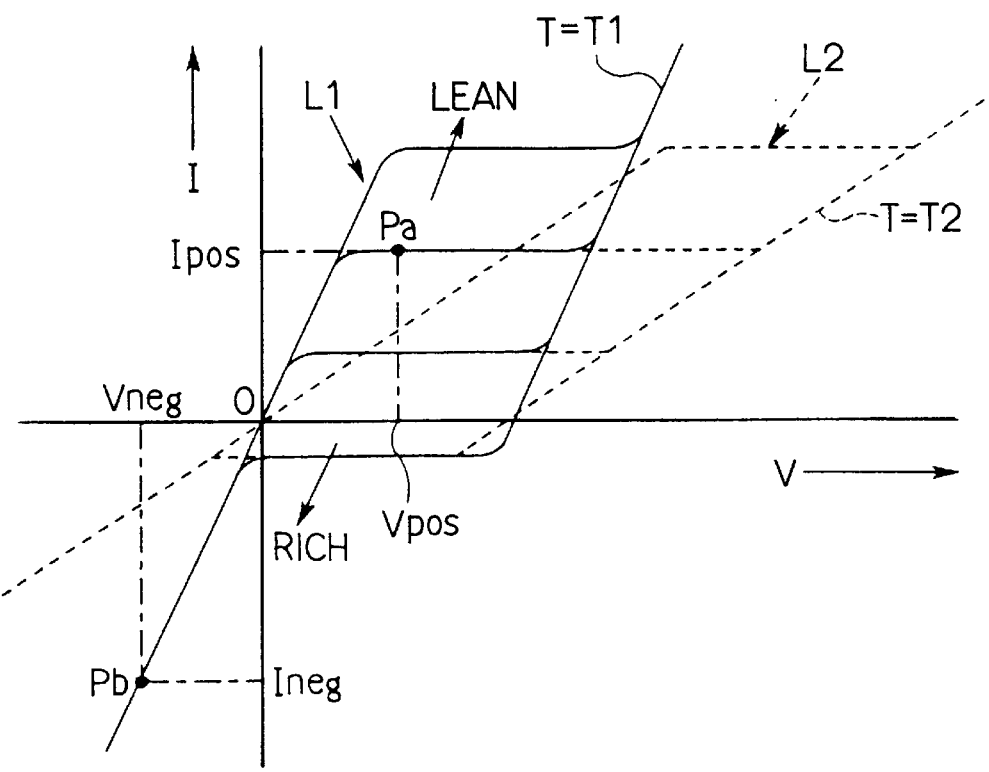
FIG. 3 shows the voltage-current characteristic of a air fuel ratio sensor on the upstream side of a catalyst.

Next, referring to FIG. 3, the voltage-current characteristic of air fuel ratio sensors 28 and 29 will be described. When air fuel ratio sensors 28 and 29 are active at the temperature of T1, they are stable as shown by a characteristic line L1 shown by a full line in FIG. 3. In this case, the straight line portion of the characteristic line L1 which is parallel to a voltage axis V shows limiting current. Limiting current increases or decreases corresponding to air fuel ratio in exhaust gas. That is, when air fuel ratio is lean, limiting current is increased, on the other hand, when air fuel ratio is rich, limiting current is decreased.

Referring to this voltage-current characteristic, an area of voltage lower than the voltage of the straight line portion which is parallel to the voltage axis V is a resistance dominated area. The gradient of the characteristic line L1 in the resistance dominated area is determined by the internal resistance of a solid electrolyte layer of air-fuel ratio sensors 28 and 29. The internal resistance of the solid electrolyte layer varies according to temperature. Thus, when the temperature of oxygen concentration detecting element 51 lowers, the gradient of the characteristic line L1 is reduced because of the increase of the internal resistance. That is, when the temperature T of oxygen concentration detecting element 51 is T2 lower than T1, the voltage-current characteristic is off to a characteristic line L2 shown by a dotted line in FIG. 3. A straight line portion of the characteristic line L2 which is parallel to the voltage axis V shows limiting current. As shown in FIG. 3, limiting current of the characteristic line L1 is substantially equal to that of the characteristic line L1.

Referring to the characteristic line L1, if positive voltage Vpos is applied to the solid electrolyte layer, current flowing in oxygen concentration detecting element 51 is limiting current Ipos. If negative voltage Vneg is applied to solid electrolyte layer, negative current Ineg which is proportional to only temperature without depending upon the concentration of oxygen flowing in oxygen concentration detecting element 51. (See point Pb in FIG. 3.) In this embodiment, a circuit for monitoring the temperature of air fuel ratio sensors 28 and 29 is omitted.

The outputs of the above sensors 28 and 29 are read by an electronic control circuit 30 via an input port 31. Electronic control circuit 30 is constituted mainly by CPU 32, ROM 33, RAM 34 and backup RAM 35. Electronic control circuit 30 operates a fuel injection quantity TAU, an ignition timing Ig and others using the outputs of the sensors (engine operated state parameters) and generates signals according to the result of the operation to injectors 20 and ignition circuit 22 via an output port 36 in order to control engine 11. Further, electronic control circuit 30 executes a sensor abnormality detecting processing described later to diagnose whether air fuel ratio sensor 28 or 29 is abnormal and outputs a lightning signal to an alarm lamp 37 via the output port 36 to light the alarm lamp 3 and warn a driver when air fuel ratio sensor 28 or 29 is abnormal.

Next, a method of controlling air fuel ratio which is executed by electronic control circuit 30 will be described.

[1] Modeling controlled object

For the model of a system for controlling the air fuel ratio λ of engine 11, the autoregressive moving average model of a degree 1 provided with dead time P=3 is applied. The model can be approximated by the following expression (1):

$$\lambda(k) = a \times \lambda(k-1) + b \times FAF(k-3) \tag{1}$$

Herein, FAF denotes an air fuel ratio correction factor, "a" and "b" denote a model constant for determining the responsibility of the model and "k", "k−1" and "k−3" denote sampling timings.

In the above expression (1), in view of disturbance d, the model of a control system can be approximated by the following expression (2):

$$\lambda(k) = a \times \lambda(k-1) + b \times FAF(k-3) + d(k-1) \tag{2}$$

It is easy to determine the above model constants "a" and "b" through discretization by sampling with a rotational period (360° CA) using a step response, that is, to work out a transfer function G of the control system for controlling air fuel ratio λ.

[2] A method of expressing a state variable X (However, X denotes vector quantity.)

When the above expression (2) is rewritten using an expression "a state variable X (k)=[X1 (k), X2 (k), X3 (k), X4 (k)]$^T$ (T denotes a transposed matrix), a determinant shown by the following expression (3) is produced:

$$\begin{bmatrix} X1(k+1) \\ X2(k+2) \\ X3(k+1) \\ X4(k+1) \end{bmatrix} = \begin{bmatrix} a & b & 0 & 0 \\ 0 & 0 & 1 & 0 \\ 0 & 0 & 0 & 1 \\ 0 & 0 & 0 & 0 \end{bmatrix} \begin{bmatrix} X1(k) \\ X2(k) \\ X3(k) \\ X4(k) \end{bmatrix} + \begin{bmatrix} 0 \\ 0 \\ 0 \\ 1 \end{bmatrix} FAF(k) + \begin{bmatrix} 1 \\ 0 \\ 0 \\ 0 \end{bmatrix} d(k) \tag{3}$$

The following expression can be obtained from the above determinant(3).

$$\begin{aligned} X1(k+1) &= a \times X1(k) + b \times X2(k)d + (k) \tag{4} \\ &= \lambda(k+1) \end{aligned}$$

$$X2(k+1) = FAF(k-2) \tag{5}$$

$$X3(k+1) = FAF(k-1) \tag{6}$$

$$X4(k+1) = FAF(k) \tag{7}$$

[3] Design of a regulator

If a regulator is designed based upon the above expressions (3) to (7), the air fuel ratio correction factor FAF is expressed as the following expression (8) using an optimum feedback gain K=[K1, K2, K3, K4] and a state variable $X^T(k)=[\lambda(k), FAF(k-3), FAF(k-2), FAF(k-1)]$:

$$\begin{aligned} FAF(k) &= K \cdot X^T(k) \\ &= K1 \cdot \lambda(k) + K2 \cdot FAF(k-3) + \\ &\quad K3 \cdot FAF(k-2) + K4 \cdot FAF(k-1) \end{aligned} \quad (8)$$

Further, when an integral term ZI (k) for absorbing an error is added to the above expression (8), the air fuel ratio correction factor FAF can be obtained by the following expression (9):

$$FAF(k)=K1 \cdot \lambda(k)+K2 \cdot FAF(k-3)+K3 \cdot FAF(k-2)+K4 \cdot FAF(k-1)+ZI(k) \quad (9)$$

The integral term ZI (k) is determined by a deviation between target air fuel ratio λTG and actual air fuel ratio λ (k). Therefore, an integration constant Ka and can be worked out according to the following expression (10):

$$ZI(k)=ZI(k-1)+Ka\{\lambda TG-\lambda(k)\} \quad (10)$$

Figure 4:
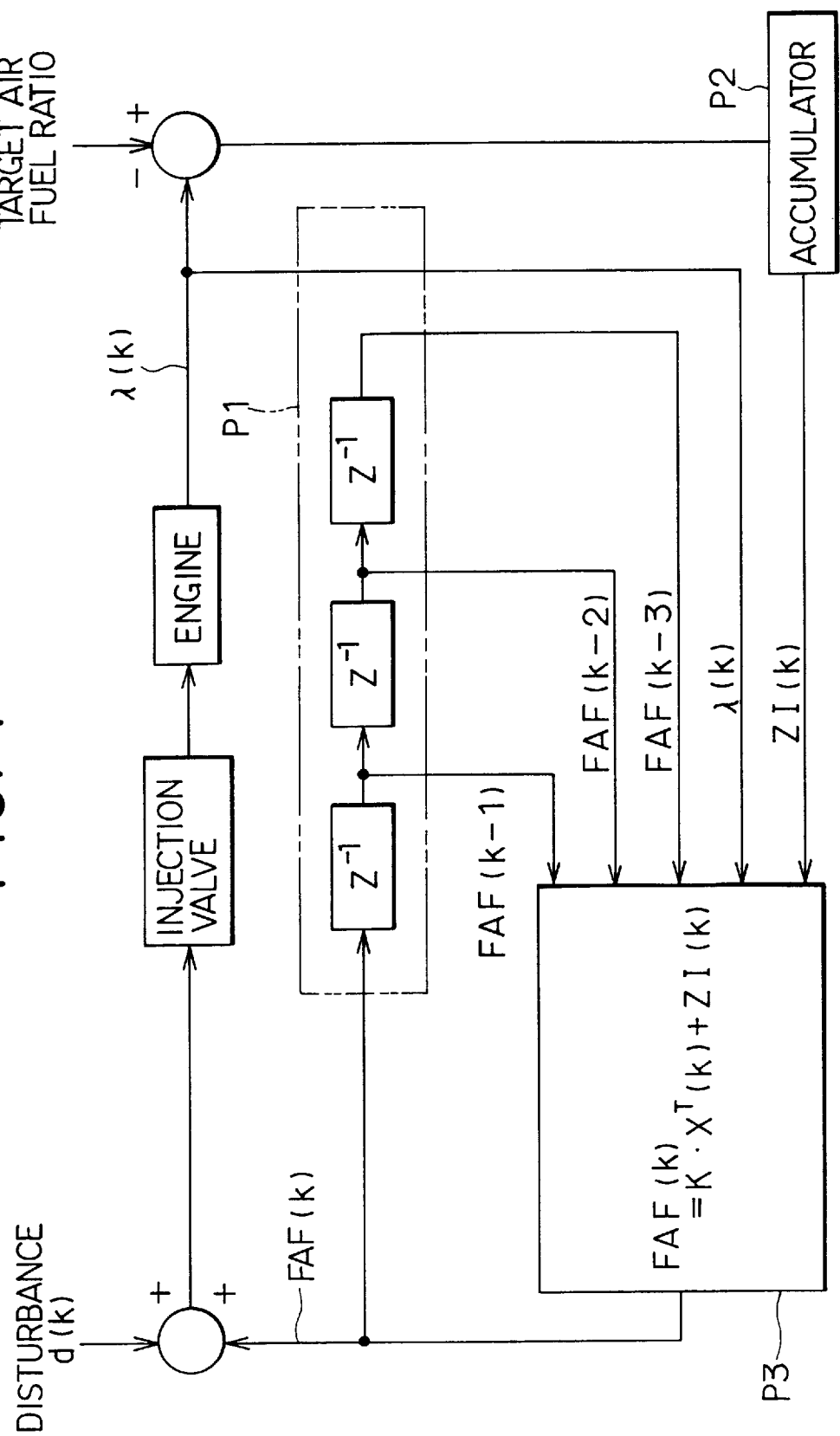
FIG. 4 is a block diagram for explaining the control principle of an air-fuel ratio control system.

FIG. 4 is a block diagram showing an air fuel ratio control system the model of which is designed as described above. In FIG. 4, the air fuel ratio correction factor FAF (k) is expressed using $Z^{-1}$ conversion to produce from FAF (k-1). However, the air fuel ratio correction factor FAF (k-1) is stored in RAM 34 and is read at the next control timing. Here, FAF (k-1) denotes the last air fuel ratio correction factor, FAF (k-2) denotes the second last air fuel ratio correction factor an d FAF (k-3) denotes the third last air fuel ratio correction factor.

I n FIG. 4, a block P1 encircled by an alternate long and two short dashes line determines a state variable X (k) in a state that air fuel ratio λ (k) is feedback-controlled so as to approach to target air fuel ratio λTG. A b lock P2 is an accumulator for calculating the integral term ZI (k) and a block P3 operates a current air fuel ratio correction factor FAF (k) based upon the state variable X (k) determined by the block P1 and the integral term ZI (k) calculated by the block P2.

[4] Determination of an optimum feedback gain K and an integration constant Ka.

An optimum feedback gain K and an integration constant Ka can be set by minimizing an evaluation function J obtained by the following expression (11):

$$J = \sum_{k=0}^{\infty} [Q[\lambda(k) - \lambda TG]^2 + R[FAF(k) - FAF(k-1)]^2] \quad (11)$$

In the above expression (11), the evaluation function J minimizes a deviation between air fuel ratio λ (k) and target air fuel ratio λTG while restricting the influence of the air fuel ratio correction factor FAF (k). Restriction for the air fuel ratio correction factor FAF (k) can be controlled by varying the values of parameters Q and R of weight. Therefore, simulation is repeated until an optimum control characteristic can be obtained by varying the values of the parameters Q and R of weight so as to set an optimum feedback gain K and an integration constant Ka.

Further, an optimum feedback gain K and an integration constant Ka depend upon the above model constants "a" and "b". Therefore, to guarantee the stability (robustness) of a system against the fluctuation of the system for controlling actual air fuel ratio λ (the fluctuation of parameters), it is required to set optimum feedback gain K and an integration constant Ka in anticipation of the fluctuation of each model constant "a" and "b". Therefore, simulation should be performed in anticipation of the fluctuation which may occur actually of each model constant "a" and "b" to set optimum feedback gain K and an integration constant Ka which meet stability of the system.

[1] Modeling a controlled object, [2] a method of expressing a state variable, [3] design of a regulator and [4] determination of an optimum feedback gain and an integration constant have been described above. However, referring to the air fuel ratio control system in this embodiment, these are regarded as already set. Electronic control circuit 30 controls air fuel ratio using only the above expressions (9) and (10).

Figure 5:
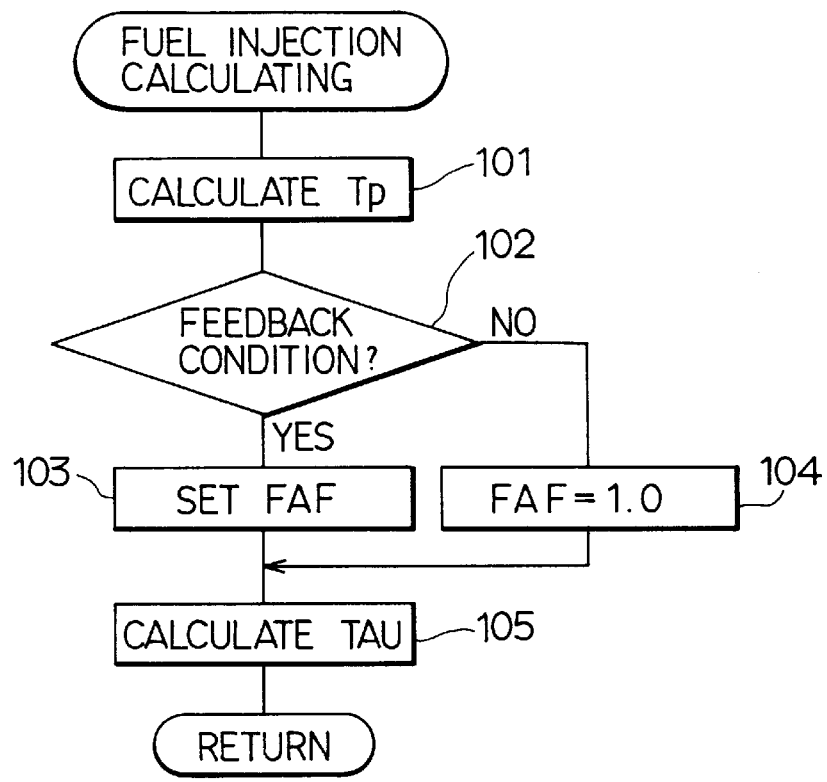
FIG. 5 is a flowchart showing a fuel injection quantity calculating routine.
Figure 6:
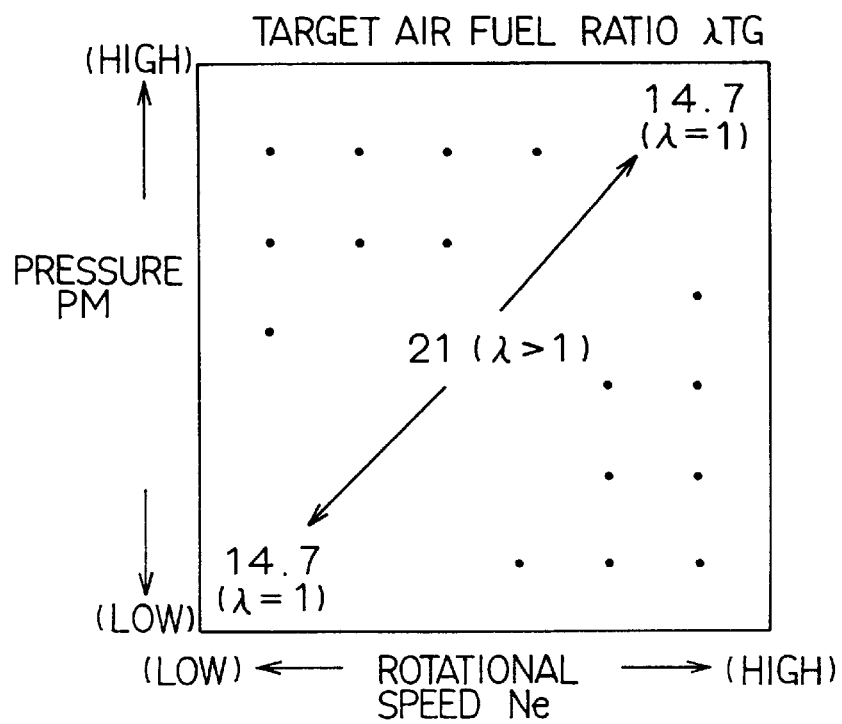
FIG. 6 shows a map for setting a target air fuel ratio.

Next, the operation of the air fuel ratio control system constituted as described above will be described. FIG. 5 is a flowchart showing a fuel injection quantity calculating routine executed by CPU 32 in electronic control circuit 30. This routine is executed each 360° CA in synchronization with the rotation in engine 11. When processing by this routine is started, basic injection quantity Tp is first calculated based upon intake pressure PM, an engine speed Ne and others in step 101. The processing in step 101 functions as basic injection quantity calculating means. In the next step 102, it is determined whether the feedback condition of air fuel ratio λ is met or not. The feedback condition is met, for example, when the temperature Thw of engine coolant is equal to or higher than a predetermined temperature and engine 11 is not rotated at a high speed and with a large load.

If the feedback condition is met at the present, processing proceeds to step 103. In step 103, an air fuel ratio correction factor FAF for approximating a detected air fuel ratio λ to target air fuel ratio λTG is set. That is, an air fuel ratio correction factor FAF is calculated based upon target air fuel ratio λTG and air fuel ratio λ (k) detected by upstream air fuel ratio sensor 28 according to the above expressions (9) and (10). The target air fuel ratio λTG is obtained using, for example, a map shown in FIG. 6. According to this map, target air fuel ratio λTG is set to theoretical air fuel ratio of 14.7 (λ=1.0) in an area in which engine 11 is rotated at a high speed and with a large load and an area in which engine 11 is rotated at a low speed and with a small load. In an intermediate area, target air fuel ratio λTG is set to be lean (λ>1.0). The processing in step 103 functions as air fuel ratio correction setting means.

In the meantime, if in step 102, the feedback condition is not met, processing proceeds to a step 104. In step 104, an air fuel ratio correction factor FAF is set to 1.0. Setting FAF to 1.0 means air fuel ratio λ is not corrected. As a result, so-called open-loop control is executed.

After, in step 103 or 104, the air fuel ratio correction factor FAF is set, processing proceeds to a step 105. In step 105, fuel injection quantity TAU is calculated using basic injection quantity Tp, an air fuel ratio correction factor FAF and another correction factor FALL according to the following expression (12):

$$TAU=Tp \cdot FAF \cdot FALL \quad (12)$$

Afterward, a control signal corresponding to the above injection quantity TAU is output to injectors 20. Hereby, time in which the valve of the injector 20 is opened (fuel injected time) is controlled. As a result, air fuel ratio λ is regulated so that it is target air fuel ratio λTG. The processing in step 105 functions as injection control means.

Next, processing for determining whether either of upstream air fuel ratio sensor 28 or downstream air fuel ratio sensor 29 is abnormal will be described. In this abnormality determining processing, first the central values of air fuel ratio on the upstream side of catalyst 27 and air fuel ratio on the downstream side of catalyst 27 which is respectively detected by both air fuel ratio sensors 28 and 29 are calculated by an air fuel ratio central value operating routine shown in FIG. 7. The error between the air fuel ratio central value on the upstream side of catalyst 27 and the air fuel ratio central value on the downstream side of catalyst 27 is worked out by a sensor abnormality determining routine shown in FIG. 8. It is determined whether upstream air fuel ratio sensor 28 or downstream air fuel ratio sensor 29 is abnormal or not based upon whether the error is in a predetermined range or not. This processing will be described in detail below.

[Calculating a central value of air fuel ratio]

Figure 7:
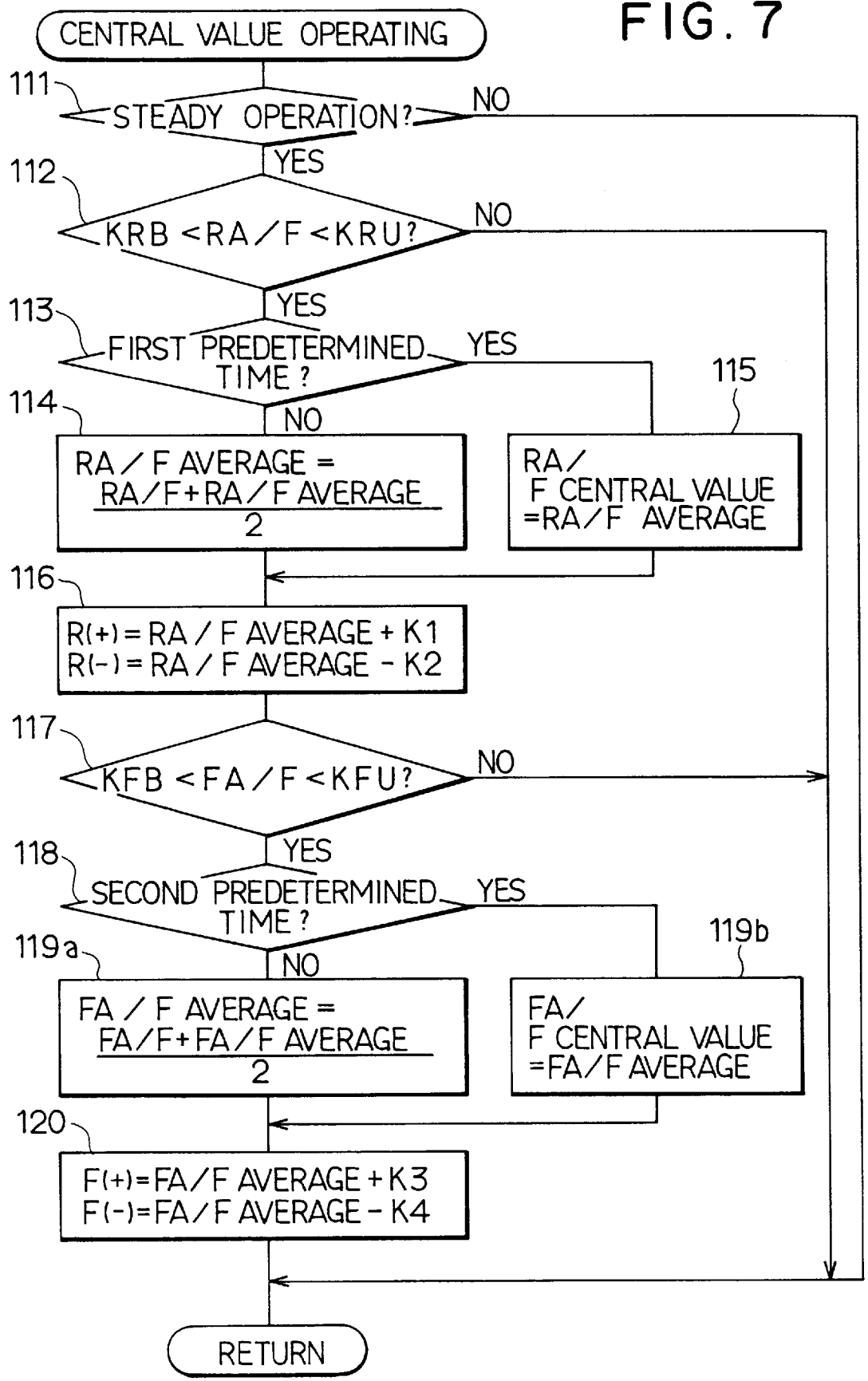
FIG. 7 is a flowchart showing an air fuel ratio central value calculating routine.

Referring to FIG. 7, processing by an air fuel ratio central value calculating routine for calculating the air fuel ratio central values on the upstream and downstream sides of catalyst 27 will be described below. In this routine, first in step 111, it is determined whether of steady operation of engine 11 or not. That is, it is determined whether operating condition and load of engine 11 are substantially constant. An accurate air fuel ratio central value cannot be calculated if the operation of engine 11 is not steady. Therefore, this routine is finished without executing further steps. In the meantime, if the operation is steady, processing proceeds to step 112, it is determined whether the output RA/F of downstream air fuel ratio sensor 29 is in a predetermined range (KRB<RA/F<KRU: KRB and KRU are predetermined values). As air fuel ratio central value cannot be accurately calculated if the output RA/F is out of the predetermined range, this routine is finished without executing further steps.

In the meantime, if the output RA/F of downstream air fuel ratio sensor 29 is in the predetermined range, processing proceeds to step 113 and the average value of RA/F is calculated according to the following expression in a step 114 until it is determined in step 113 that first predetermined time elapses:

Average value of $RA/F = \{RA/F \text{ (current value)} + \text{average value of } RA/F \text{ (last value)}\}/2$ Afterward, when the first predetermined time has elapsed, processing proceeds to step 115. The average value of RA/F obtained in the first predetermined time is set as a central value of RA/F (an air fuel ratio central value on the downstream side of catalyst 27). Afterward, in step 116, an upper limit R(+) and a lower limit R(−) of the central value of RA/F are respectively calculated according to the following expressions:

Upper limit $R(+) = RA/F$ central value $+ K1$ ($K1$: constant)

Lower limit $R(-) = RA/F$ central value $- K2$ ($K2$: constant)

Next, in steps 117 to 120, the central value of FA/F (an air fuel ratio central value on the upstream side of catalyst 27) is calculated based upon the output FA/F of upstream air fuel ratio sensor 28 with the same way as the above. That is, if the output FA/F of upstream air fuel ratio sensor 28 is in a predetermined range (KFB<FA/F<KFU: KFB and KFU are predetermined values), the average value of FA/F obtained in second predetermined time is set as a central value of FA/F (steps 117 to 119a and 119b). Afterward, in step 120, an upper limit F(+) and a lower limit F(−) of the central value of FA/F are respectively calculated according to the following expressions and then this routine is finished:

Upper limit $F(+) = FA/F$ central value $+ K3$ ($K3$: constant)

Lower limit $F(-) = FA/F$ central value $- K4$ ($K4$: constant)

Figure 8:
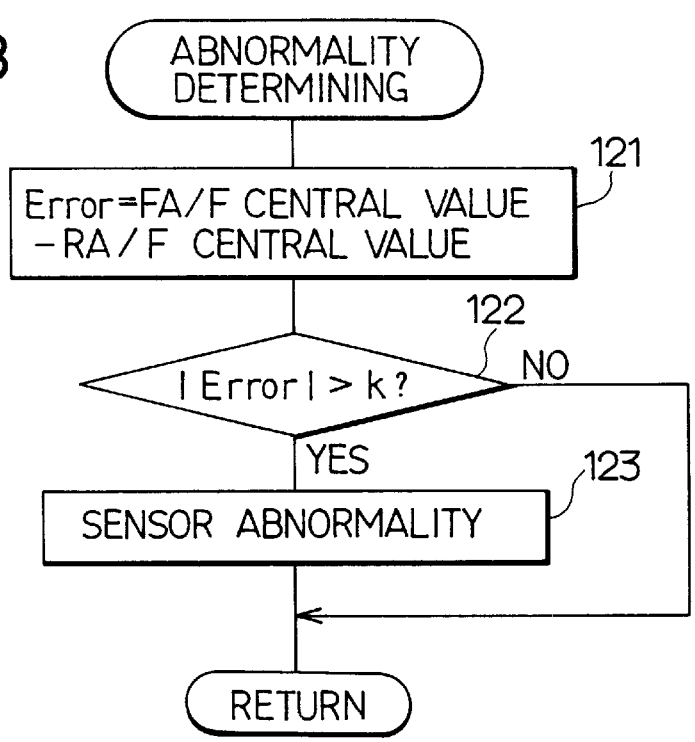
FIG. 8 is a flowchart showing a sensor abnormality determining routine.

A sensor abnormality determining routine shown in FIG. 8 functions as sensor abnormality determining means. In this routine, in step 121, an error (=FA/F central value−RA/F central value) between the central value of FA/F (the air fuel ratio central value on the upstream side of catalyst 27) and the central value of RA/F (the air fuel ratio central value on the downstream side of catalyst 27) is calculated. In the next step 122, an absolute value of the error calculated in step 121 is compared with a predetermined abnormality determination value k. If |error|≦k, since the error is small, it is determined that both upstream air fuel ratio sensor 28 and downstream air fuel ratio sensor 29 are normal. After that, this routine is finished.

If |error|>k, it means that either of upstream air fuel ratio sensor 28 or downstream air fuel ratio sensor 29 deteriorates or fails. The output of the deteriorated sensor shows incorrect air fuel ratio. Therefore, in this case, processing proceeds to step 123 and sensor abnormality detecting processing is performed.

Figure 10:
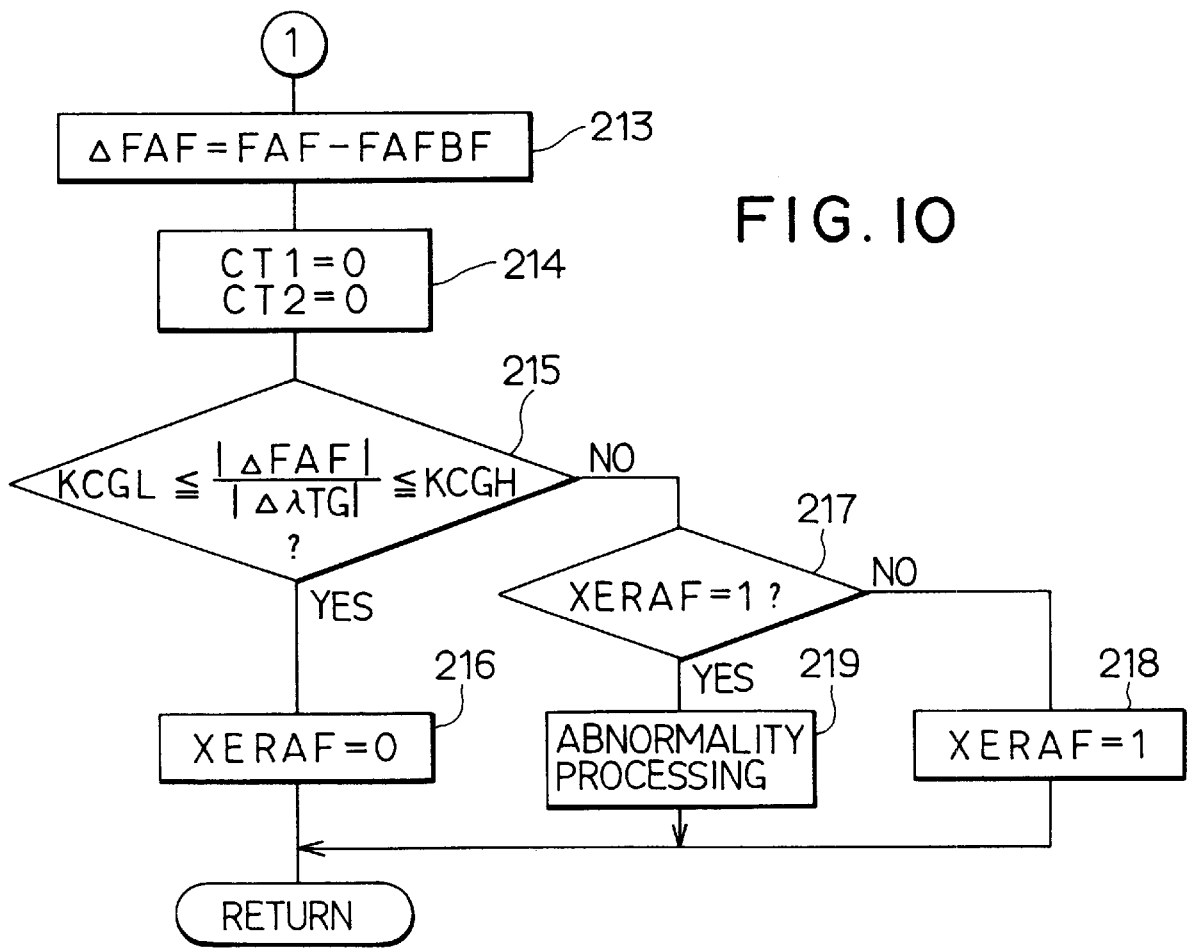
FIG. 10 is a second flowchart showing the upstream air fuel ratio sensor abnormality determining routine.
Figure 9:
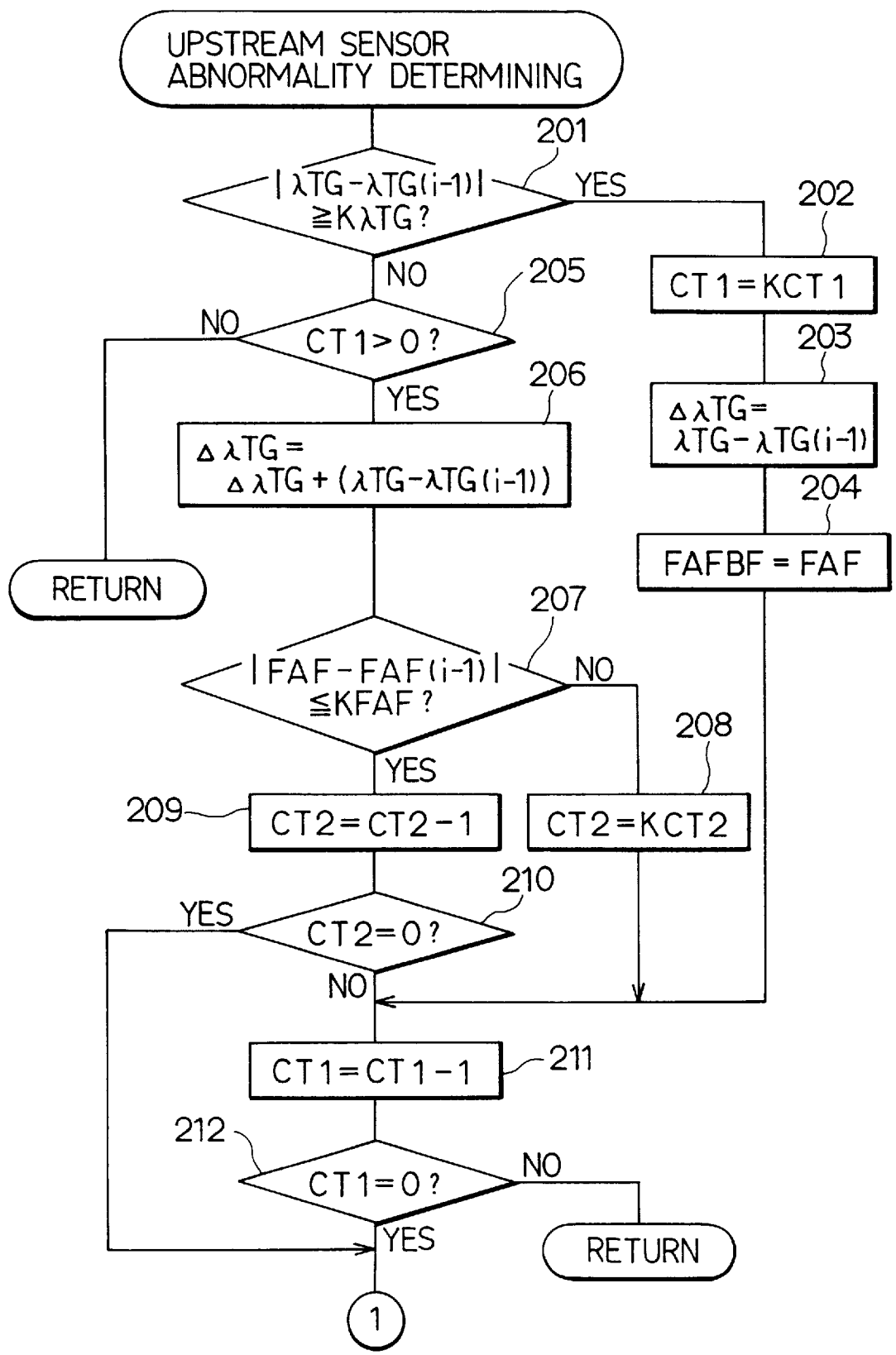
FIG. 9 is a first flowchart showing an upstream air fuel ratio sensor abnormality determining routine.
Figure 11A:
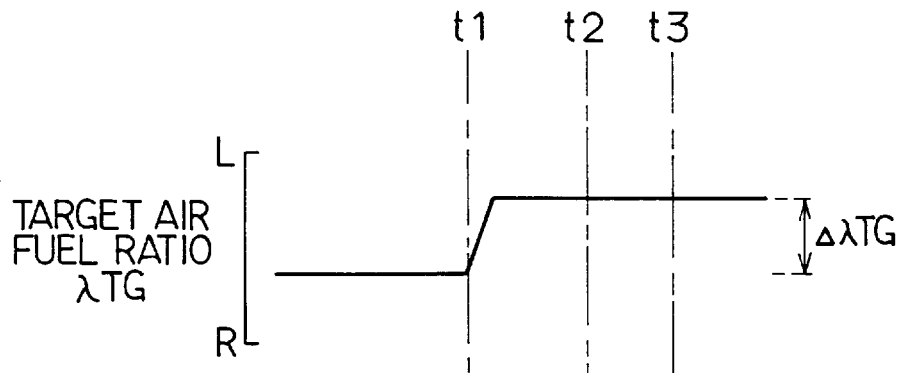
FIGS. 11A to 11E are time charts for explaining the operation for determining the abnormality of the air fuel ratio sensor on the upstream side in a first embodiment.
Figure 11B:
Figure 11C:
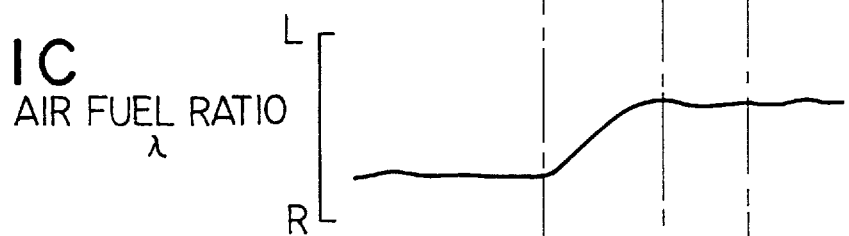
Figure 11D:
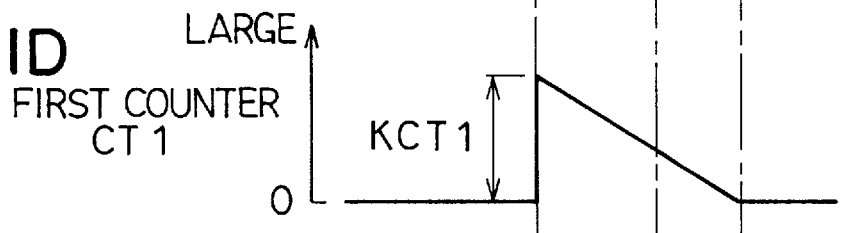
Figure 11E:
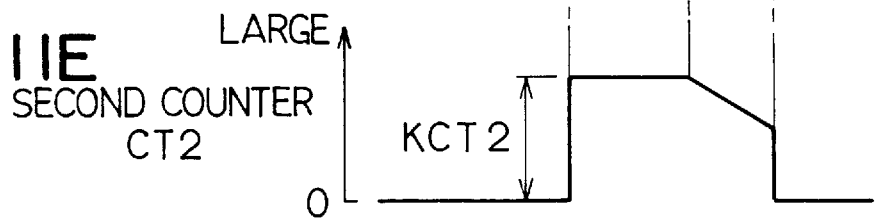

FIGS. 9 and 10 show an upstream air fuel ratio sensor abnormality determining routine for determining whether upstream air fuel ratio sensor 28 is abnormal or not. First, referring to time charts shown in FIGS. 11A to 11E, a method of determining the abnormality of upstream air fuel ratio sensor 28 will be described below.

As shown in time charts in FIGS. 11A to 11E, when target air fuel ratio λTG is suddenly varied toward lean area at time t1, an air fuel ratio correction factor FAF varies so that FAF becomes small. When an injection quantity is reduced according to the variation of the air fuel ratio correction factor FAF, air fuel ratio λ detected by upstream air fuel ratio sensor 28 varies toward lean area. Also, when target air fuel ratio λTG is suddenly varied, predetermined values KCT1 and KCT2 are set in a first counter CT1 and a second counter CT2, respectively. The first counter CT1 is decremented as time elapses after time t1 and the second counter CT2 is decremented after time t2 at which air fuel ratio correction factors FAF converges on a certain value. Afterward, at time t3 at which the value of the first counter CT1 is zero, it is determined whether upstream air fuel ratio sensor 28 is abnormal based upon whether the ratio of the variation ΔλTG of target air fuel ratio λTG and the variation ΔFAF of an air fuel ratio correction factor FAF is in a predetermined range.

That is, if upstream air fuel ratio sensor 28 is normal because an air fuel ratio correction factor FAF is set to agree actual air fuel ratio λ with target air fuel ratio λTG, an appropriate air fuel ratio correction factor FAF is expected to be set according to a deviation between detected air fuel ratio λ and target air fuel ratio λTG. Accordingly, an air fuel ratio correction factor FAF varies corresponding to the variation ΔλTG of target air fuel ratio λTG. However, if a detected air fuel ratio λ is not accurate because upstream air fuel ratio sensor 28 is abnormal, an appropriate air fuel ratio correction factor FAF corresponding to the variation ΔλTG of target air fuel ratio λTG is not set. In this case, it can be determined that the upstream air fuel ratio sensor 28 is abnormal.

Figure 12:
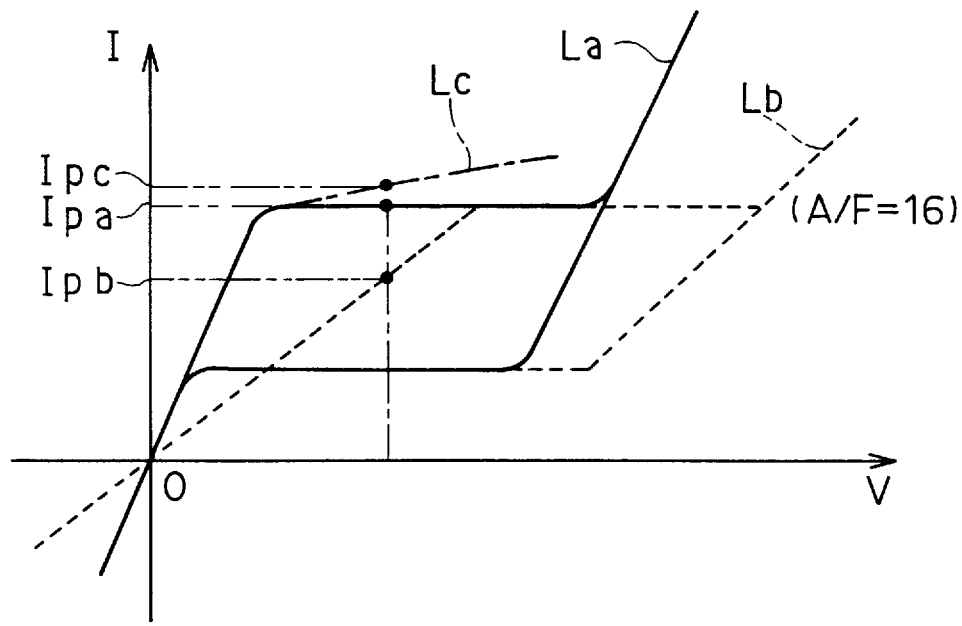
FIG. 12 shows a voltage-current characteristic for explaining an abnormal output of the air fuel ratio sensor on the upstream side.

FIG. 12 explains examples of the output (limiting current) of upstream air fuel ratio sensor 28 when sensor 28 is abnormal. In FIG. 12, the characteristic of the sensor output when sensor 28 is normal is shown by "La" and the characteristic of the sensor output when sensor 28 is abnormal because of the deterioration of sensor element 51 or the failure of heater 52 is shown by "Lb" and "Lc". If actual air fuel ratio λ is '16', air fuel ratio sensor 28 generates limiting current Ipa when air fuel ratio sensor 28 is normal and this is equal to actual air fuel ratio (A/F=16). In the meantime, limiting currents Ipb and Ipc generated when sensor 28 is abnormal are not equal to limiting current Ipa generated when sensor 28 is normal. As a result, actual air fuel ratio cannot be detected. In such a state, because an appropriate air fuel ratio correction factor FAF corresponding to the variation $\Delta\lambda TG$ of target air fuel ratio $\lambda TG$ is not set, it is determined that upstream air fuel ratio sensor 28 is abnormal.

An upstream air fuel ratio sensor abnormality determining routine shown in FIGS. 9 and 10 is executed in synchronism with a fuel injecting operation of injectors 20. In this routine, first in step 201, it is determined whether the difference between current target air fuel ratio $\lambda TG$ and the last target air fuel ratio $\lambda TG(i-1)$ is equal to or greater than a predetermined determination value $K\lambda TG$, that is, whether target air fuel ratio $\lambda TG$ is suddenly varied. If $|\lambda TG - \lambda TG(i-1)| < K\lambda TG$, it is determined that target air fuel ratio $\lambda TG$ is not suddenly varied. In this case, processing proceeds to step 205 and it is determined whether the value of first counter CT1 exceeds zero or not. If target air fuel ratio $\lambda TG$ remains unchanged as before time t1 shown in FIG. 11A, the value of first counter CT1 is held to zero (an initial value) and this routine is finished without executing further steps.

Afterward, when $|\lambda TG - \lambda TG(i-1)| \geq K\lambda TG$ (at time t1 shown in FIG. 11A), it is determined that target air fuel ratio $\lambda TG$ is suddenly varied. Processing proceeds to step 202 and a predetermined value KCT1 is set in first counter CT1. KCT1 is a value equivalent to, for example, fuel injections of 15 times. In step 203, the last target air fuel ratio $\lambda TG(i-1)$ is subtracted from a current target air fuel ratio $\lambda TG$ to calculate the variation $\Delta\lambda TG$ of target air fuel ratio $\lambda TG$ ($\Delta\lambda TG = \lambda TG - \lambda TG(i-1)$). Afterward, in step 204, air fuel ratio correction factor FAF at that time is stored in RAM 34 as a correction factor FAFBF before variation.

Afterward, processing proceeds to step 211, the first counter CT1 is decremented by one. In the next step 212, it is determined whether the value of first counter CT1 is zero or not. Until the value of first counter CT1 is determined to be zero in step 212, first counter CT1 is continued to be decremented by one in step 211.

After target air fuel ratio $\lambda TG$ is suddenly varied (after time t1 shown in FIG. 11A), a negative determination is made at step 201. In step 205, if CT1>0, processing proceeds to a step 206. In step 206, the difference between the current target air fuel ratio $\lambda TG$ and the last target air fuel ratio $\lambda TG(i-1)$ is added to $\Delta\lambda TG$ to update $\Delta\lambda TG$. Afterward, in step 207, it is determined whether the absolute value of the difference between the current air fuel ratio correction factor FAF and the last air fuel ratio correction factor FAF(i-1) is equal to or smaller than a predetermined value KFAF. That is, it is determined whether air fuel ratio correction factor FAF converges on a certain value.

If $|FAF-FAF(i-1)| > KFAF$, that is, before air fuel ratio correction factor FAF converges (from time t1 to t2 shown in FIG. 11B), in step 207 "No" is selected, processing proceeds to step 208. In step 208, a predetermined value KCT2 is set in second counter CT2. KCT2 is a value equivalent to, for example, fuel injections of 15 times.

In the meantime, if $|FAF-FAF(i-1)| \leq KFAF$, that is, after air fuel ratio correction factor FAF converges on a certain value (after time t2 shown in FIG. 11B), in step 207 "Yes" is selected, processing proceeds to step 209. In step 209, second counter CT2 is decremented by one. It is determined in step 210 whether the value of second counter CT2 is zero or not. If the value of second counter CT2 is not zero, processing proceeds to the above step 211. Afterward, until the value of CT2 is determined to be zero, second counter CT2 is continued to be decremented by one in step 209.

Afterward, when the value of either of counters CT1 and CT2 is zero (at time t3 shown in FIG. 11D), processing proceeds to step 213 in FIG. 10. In step 213, the correction factor FAFBF before variation stored in RAM 34 is subtracted from the current air fuel ratio correction factor FAF to obtain the variation $\Delta$ FAF of air fuel ratio correction factor FAF ($\Delta FAF = FAF - FAFBF$). In the next step 214, values in both counters CT1 and CT2 are cleared to zero.

Afterward, in step 215, it is determined whether the ratio of the absolute value of $\Delta FAF$ and that of $\Delta\lambda TG$ is in a predetermined range (from KCGL to KCGH, for example, KCGL=0.9, KCGH=1.1). If an air fuel ratio correction factor FAF varies corresponding to the variation of target air fuel ratio $\lambda TG$, in step 215 "Yes" is selected. That is, if upstream air fuel ratio sensor 28 generates normal output signal corresponding to the variation of target air fuel ratio $\lambda TG$, an air fuel ratio correction factor FAF is normally varied according to the result of the normal output signal. As a result, the ratio of the absolute value of $\Delta FAF$ and that of $\Delta\lambda TG$ is approximately one. In this case, upstream air fuel ratio sensor 28 is determined to be normal, in step 216 an upstream abnormality determining flag XERAF is cleared to zero and this routine is finished.

In the meantime, if air fuel ratio correction factor FAF is excessively varied or hardly varied corresponding to the variation of target air fuel ratio $\lambda TG$, the ratio of the absolute value of $\Delta FAF$ and that of $\Delta\lambda TG$ is greatly off from one. Therefore, in step 215, "No" is selected. In this case, upstream air fuel ratio sensor 28 is determined to be abnormal, processing proceeds to step 217 and it is determined whether upstream abnormality determining flag XERAF has been already '1' or not. If XERAF=0, in step 218 '1' is set for flag XERAF and this routine is finished. If, in the next processing of the routine, it is again determined that upstream air fuel ratio sensor 28 is abnormal, predetermined abnormality processing is executed in step 219 (for example, an alarm lamp 37 is lit or feedback control based on the detected air fuel ratio is suspended).

Figure 13:
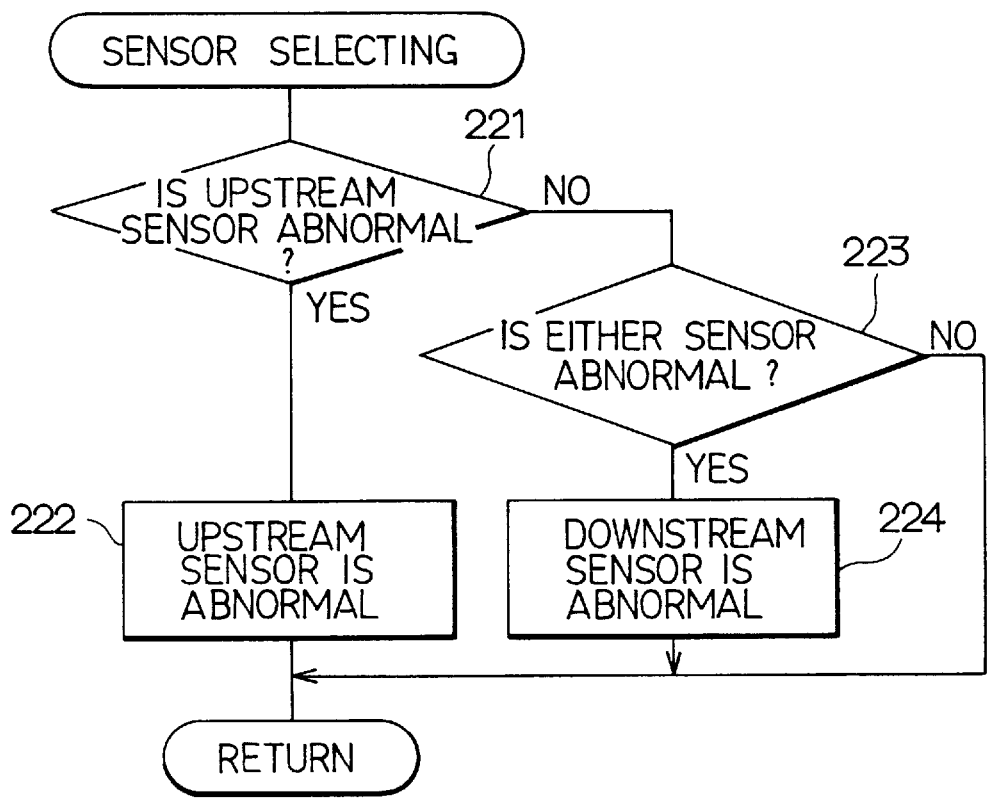
FIG. 13 is a flowchart showing an abnormal sensor selecting routine.

FIG. 13 shows an abnormal sensor selecting routine for selecting which of upstream and downstream air fuel ratio sensors 28 and 29 is abnormal. In this routine, first in step 221, it is determined whether upstream air fuel ratio sensor 28 is abnormal or not. This determination is made based upon the result of the determination of abnormality performed by the upstream air fuel ratio sensor abnormality determining routine shown in FIGS. 9 and 10. That is, when the upstream abnormality determining flag XERAF is set to '1', upstream air fuel sensor 28 is determined to be abnormal in step 222.

In the meantime, when XERAF=0, processing proceeds to step 223 and it is determined whether either upstream or downstream air fuel ratio sensor 28 or 29 is abnormal. This determination is performed based upon the result of the determination of abnormality performed by the sensor abnormality determining routine shown in FIG. 8. If either of air fuel ratio sensors 28 and 29 is determined to be abnormal, processing proceeds to step 224 and downstream air fuel ratio sensor 29 is determined to be abnormal. That is, when in step 221 "No" is selected (it means that upstream air fuel ratio sensor 28 is determined to be not abnormal) and in step 223 either of air fuel ratio sensors 28 and 29 is determined to be abnormal, it can be concluded that the abnormal air fuel ratio sensor is downstream air fuel ratio sensor 29. If in step 223 "No" is selected, since neither of air fuel ratio sensors 28 and 29 are abnormal, this routine is finished without doing further processing.

In the first embodiment, it is determined whether upstream air fuel ratio sensor 28 or downstream air fuel ratio sensor 29 is abnormal based upon whether an error between the air fuel ratio central values detected by both air fuel ratio sensors 28 and 29 is in a predetermined range. The air fuel ratio central value on the upstream side of catalyst 27 and the air fuel ratio central value on the downstream side of catalyst 27 are expected to be substantially equal if upstream and downstream air fuel ratio sensors 28 and 29 are normal. Therefore, based on the error between the central values detected by both sensors 28 and 29, not only the failure of a circuit such as a disconnection or a short circuit but abnormality due to a sensor deterioration can be detected. Hereby, not only the deterioration of catalyst 27 can be precisely detected but air fuel ratio control can be adequately performed using air fuel ratios detected by air fuel ratio sensors 28 and 29.

However, based on the error between the central values detected by both sensors 28 and 29, it cannot be determined which one of upstream air fuel ratio sensor 28 and downstream air fuel ratio sensor 29 has failed.

Therefore, in the first embodiment, it is determined whether upstream air fuel ratio sensor 28 is abnormal based upon the result of comparing the variation $\Delta\lambda TG$ of target air fuel ratio $\lambda TG$ and the variation $\Delta FAF$ of air fuel ratio correction factor FAF when target air fuel ratio is suddenly varied. As a result, the abnormality of upstream air fuel ratio sensor 28 can be precisely determined. Further the sensor which has failed can be specified by the abnormal sensor selecting routine shown in FIG. 13.

[Calculation of the inflow of an exhaust gas component]

Next, referring to FIG. 14, an exhaust gas component inflow calculating routine for calculating the inflow quantity of an exhaust gas component flowing into catalyst 27 will be described. This routine is activated every combustion of each cylinder of engine 11. In this routine, first in steps 321 and 322, the output FA/F of upstream air fuel ratio sensor 28 is compared with the upper limit F(+) and the lower limit F(−) of the central value of FA/F. If F(−)<FA/F≦F(+), that is, FA/F can be regarded as the central value of FA/F, this routine is finished without executing further steps.

Figure 15:
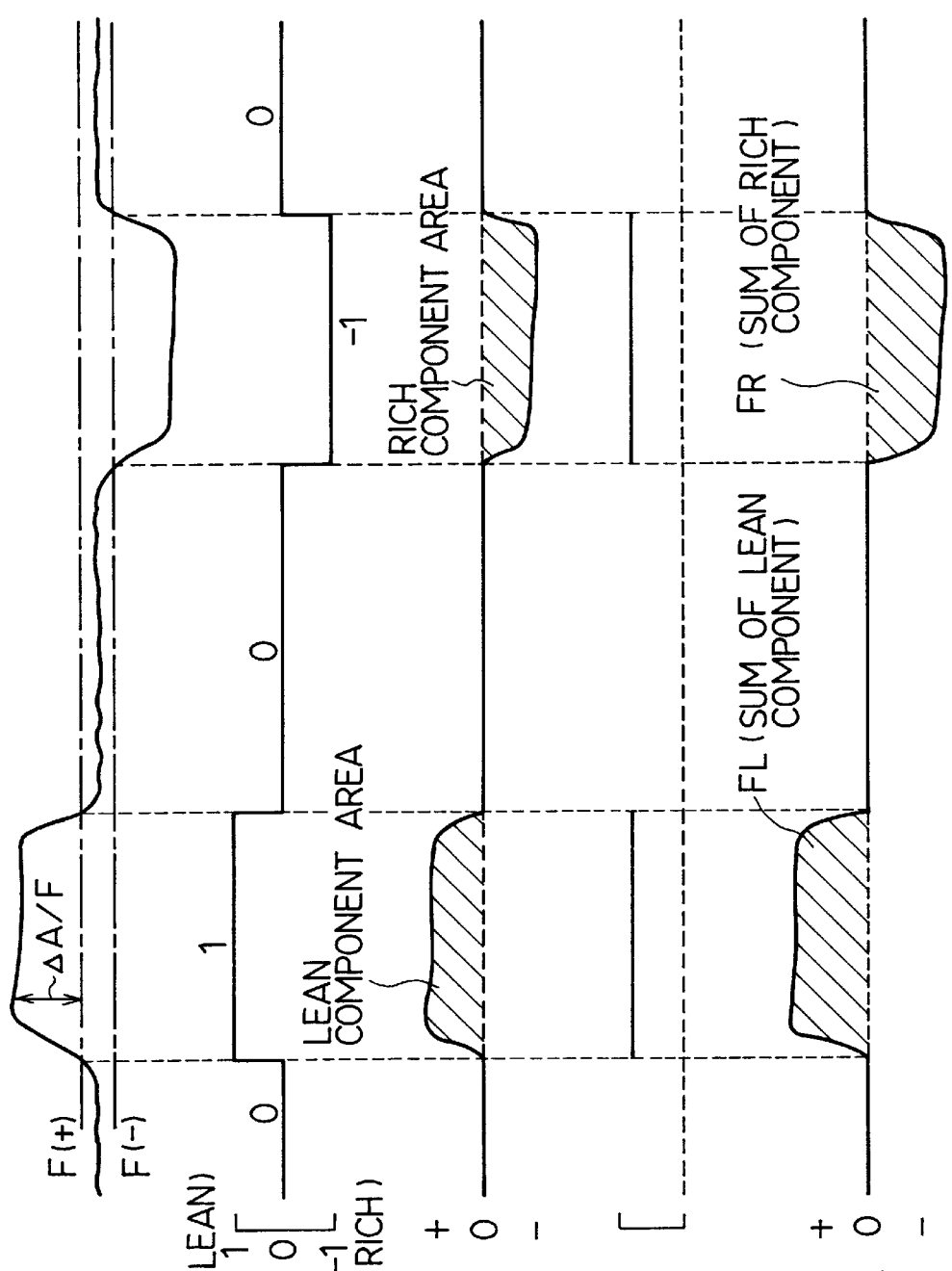
FIGS. 15A to 15E are time charts showing the processing timing of calculating the inflow of an exhaust gas component.

In the meantime, if FA/F>F(+), that is, air fuel ratio on the upstream side of catalyst 27 is off on the side of a lean component from the central value of FA/F, processing proceeds to step 323. In step 323, a deviation $\Delta A/F = FA/F - F(+)$ between FA/F and the upper limit F(+) of the central value is calculated. In the next step 324, an area on the side of a lean component $\Sigma\Delta A/F$ is calculated by integrating the deviation $\Delta A/F$. (See FIG. 15.) Afterward, in step 325, an average value Gav of the quantity of exhaust gas flowing into catalyst 27 during calculating the area on the side of a lean component $\Sigma\Delta A/F$ is calculated based upon the operating state of engine 11. In the next step 326, the sum FL of a lean component quantity of the exhaust gas flowing into catalyst 27 is calculated according to the following expression:

$$FL = \Sigma\Delta A/F \times Gav \times k \quad (k: \text{coefficient})$$

In the meantime, if FA/F<F(−), that is, air fuel ratio on the upstream side of catalyst 27 is off on the side of a rich component from the central value of FA/F, processing proceeds to step 327. In step 327, a deviation $\Delta A/F (= FA/F - F(−))$ between FA/F and the lower limit F(−) of the central value is calculated. In the next step 328, an area on the side of a rich component $\Sigma\Delta A/F$ is calculated by integrating the deviation $\Delta A/F$. (See FIG. 15.) Afterward, in step 329, an average value Gav of the quantity of exhaust gas flowing into catalyst 27 during calculating the area on the side of a rich component $\Sigma\Delta A/F$ is calculated based upon the operating state of engine 11. In the next step 330, the sum FR of a rich component quantity of the exhaust gas flowing into catalyst 27 is calculated according to the following expression:

$$FR = \Sigma\Delta A/F \times Gav \times k \quad (k: \text{coefficient})$$

FIGS. 15A to 15E show the relationship among $\Sigma\Delta A/F$, Gav·k, FL and FR obtained by the exhaust gas component inflow calculating routine.

[Calculation of the outflow of an exhaust gas component]

Figure 16:
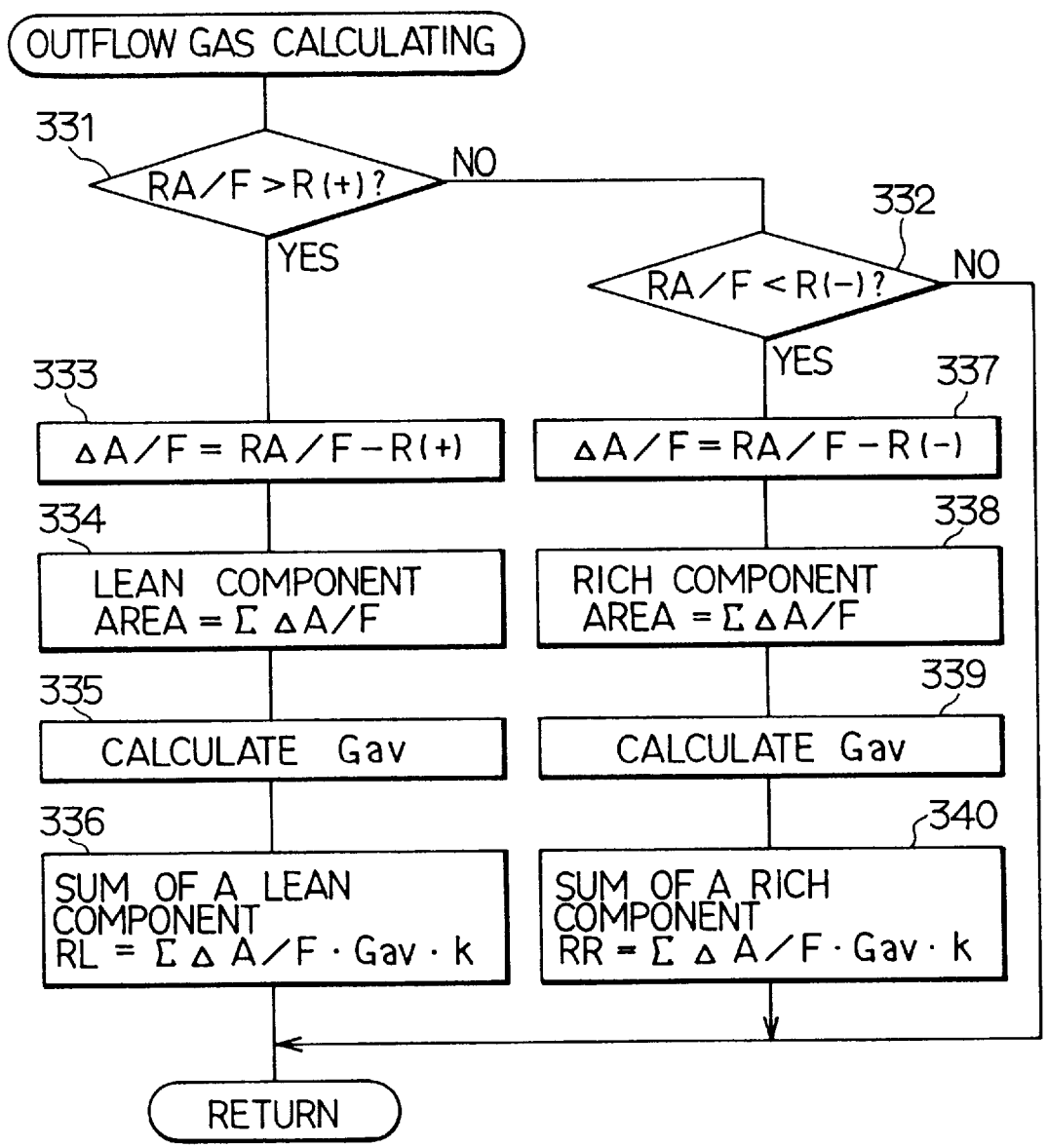
FIG. 16 is a flowchart showing an exhaust gas component outflow calculating routine.

Referring to FIG. 16, an exhaust gas component outflow calculating routine for calculating the outflow quantity of an exhaust gas component flowing out of catalyst 27 will be described below. This routine is activated every combustion of each cylinder. In this routine, first in steps 331 and 332, the output RA/F of downstream air fuel ratio sensor 29 is compared with the upper limit F(+) and the lower limit F(−) of the central value of RA/F. If R(−)≦RA/F≦R(+), that is, RA/F can be regarded as the central value of RA/F, this routine is finished without executing further steps.

If RA/F>R(+), that is, air fuel ratio on the downstream side of catalyst 27 is off on the side of a lean component from the central value of RA/F, processing proceeds to step 333. In step 333, a deviation $\Delta A/F (= RA/F - R(+))$ between RA/F and the upper limit R(+) of the central value is calculated. In the next step 334, an area on the side of a lean component $\Sigma\Delta A/F$ is calculated by integrating the deviation $\Delta A/F$. Afterward, in step 335, an average value Gav of the quantity of exhaust gas flowing from catalyst 27 during calculating the area on the side of a lean component $\Sigma\Delta A/F$ is calculated based upon the operating state of engine 11. In the next step 336, the sum RL of a lean component quantity of the exhaust gas flowing out of catalyst 27 is calculated according to the following expression:

$$RL = \Sigma\Delta A/F \times Gav \times k \quad (k: \text{coefficient})$$

If RA/F<R(−), that is, air fuel ratio on the downstream side of catalyst 27 is off on the side of a rich component from the central value of RA/F, processing proceeds to step 337. In step 337, a deviation $\Delta A/F (= RA/F - R(−))$ between RA/F and the lower limit R(−) of the central value is calculated. In the next step 338, an area on the side of a rich component $\Sigma\Delta A/F$ is calculated by integrating the deviation $\Delta A/F$. Afterward, in step 339, the average value Gav of the quantity of exhaust gas flowing from catalyst 27 during calculating the area on the side of a rich component $\Sigma\Delta A/F$ is calculated based upon the operating state of engine 11. In the next step 340, the sum RR of a rich component quantity of the exhaust gas flowing out of catalyst 27 is calculated according to the following expression:

$$RR = \Sigma\Delta A/F \times Gav \times k \quad (k: \text{coefficient})$$

[Calculation of the quantity of an absorbed lean component]

Figure 17:
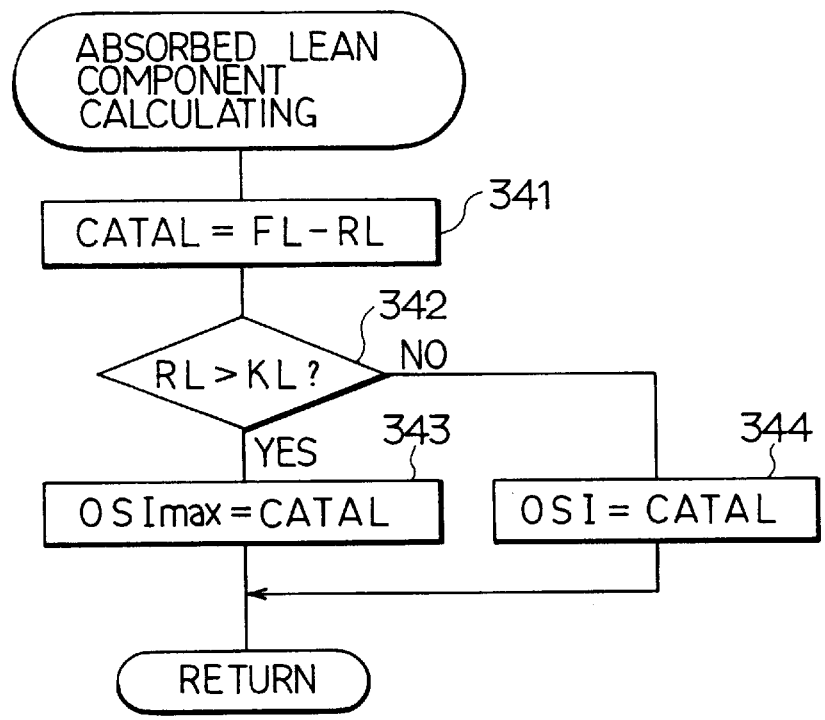
FIG. 17 is a flowchart showing a lean component absorbed quantity calculating routine.

Referring to FIG. 17, an absorbed lean component quantity calculating routine for calculating the quantity of a lean component of the exhaust gas absorbed in catalyst 27 will be described below. In this routine, first in step 341, the sum RL of the lean component quantity of the exhaust gas flowing out of catalyst 27 is subtracted from the sum FL of the lean component quantity of the exhaust gas flowing into catalyst 27 to obtain quantity CATAL of a lean component absorbed by catalyst 27. In the next step 342, the sum RL of the lean component quantity flowing out of catalyst 27 is compared with a predetermined value KL. If RL>KL, processing proceeds to step 343 and the quantity CATAL of a lean component absorbed by catalyst 27 is set as a maximum quantity (the saturation quantity) OSImax in which catalyst can absorb as much as possible. If RL≦KL, processing proceeds to a step 344 and the quantity CATAL is set as a current quantity OSI.

[Calculation of the quantity of an absorbed rich component]

Figure 18:
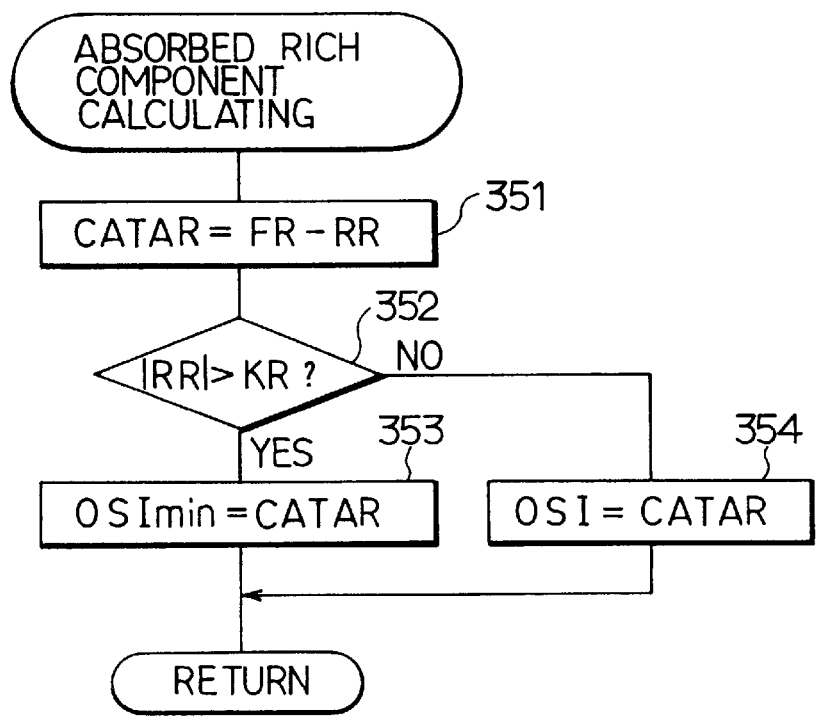
FIG. 18 is a flowchart showing a rich component absorbed quantity calculating routine.

Referring to FIG. 18, an absorbed rich component quantity calculating routine for calculating the quantity of an exhaust gas rich component absorbed in catalyst 27 will be described below. In this routine, first in step 351, the sum RR of the rich component quantity of the exhaust gas flowing out of catalyst 27 is subtracted from the sum FR of the rich component quantity of the exhaust gas flowing into catalyst 27 to obtain quantity CATAR of a rich component absorbed by catalyst 27. In the next step 352, the absolute value of the sum RR of the rich component quantity flowing out of catalyst 27 is compared with a predetermined value KR. The reason why the absolute value of the sum RR of the rich component quantity is used is that the value of the sum RR of the rich component quantity is negative. If |RR|>KR, processing proceeds to step 353 and the quantity CATAR of a rich component absorbed by catalyst 27 is set as a maximum quantity (the saturation quantity) OSImin in which catalyst 27 can absorb as much as possible. If |RR|≦KR, processing proceeds to step 354 and the quantity CATAR is set as a current quantity OSI.

[Detection of the deterioration of catalyst 27 based upon the maximum absorbed quantity of a lean component]

Figure 19:
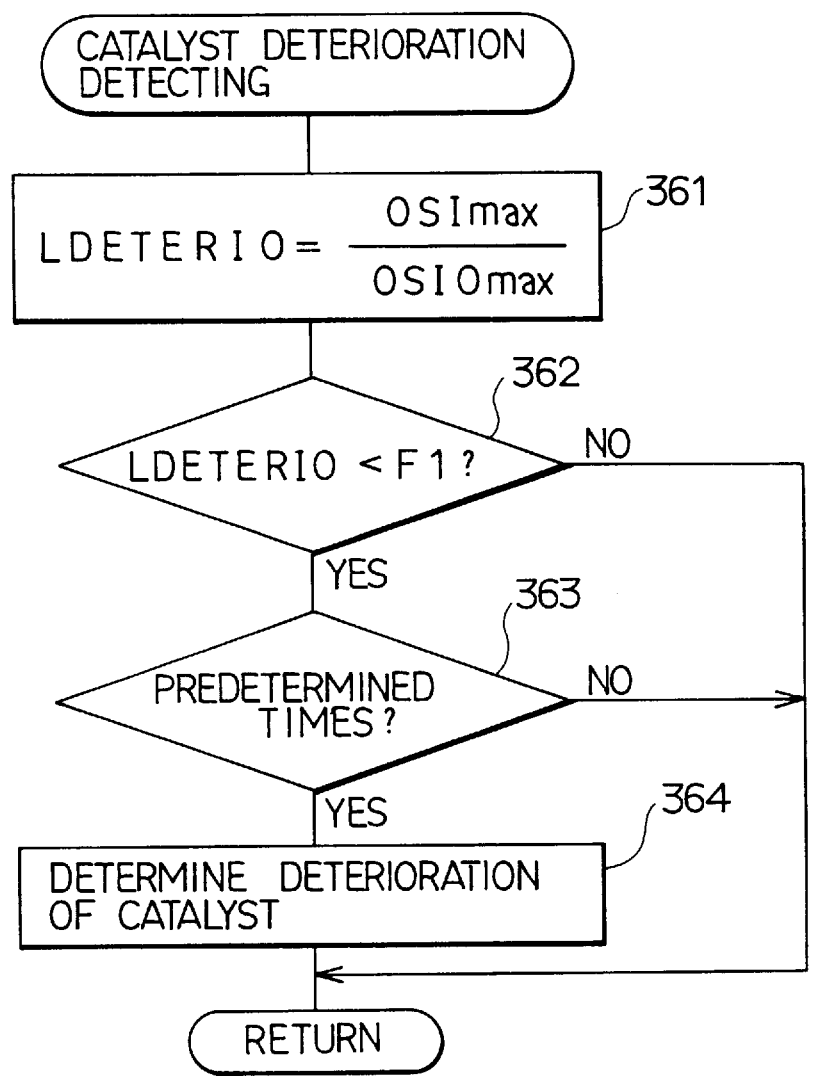
FIG. 19 is a flowchart showing a catalyst deterioration (for lean component) detecting routine.

Referring to FIG. 19, a catalyst deterioration detecting routine for detecting the deterioration of catalyst 27 based upon the maximum absorbed quantity OSImax of the lean component will be described below. This routine is executed every time the maximum absorbed quantity OSImax of the lean component is calculated in step 343 shown in FIG. 17. In this routine, first in step 361, the current maximum absorbed quantity OSImax of the lean component is divided by a maximum absorbed quantity OSIOmax of the lean component which catalyst 27 could absorb before performance of catalyst 27 deteriorates in order to obtain a catalyst deterioration degree determination value LDETERIO. In the next step 362, the catalyst deterioration degree determination value LDETERIO is compared with a predetermined deterioration determination value F1. Further, it is determined in step 363 whether a positive determination at step 362 is made predetermined times continuously. When a positive determination is made at step 363, it is determined that catalyst 27 has deteriorated. When a negative determination is made at step 363, this routine is finished without determining the deterioration of catalyst 27.

[Detection of the deterioration of a catalyst based upon the maximum absorbed quantity of a rich component]

Figure 20:
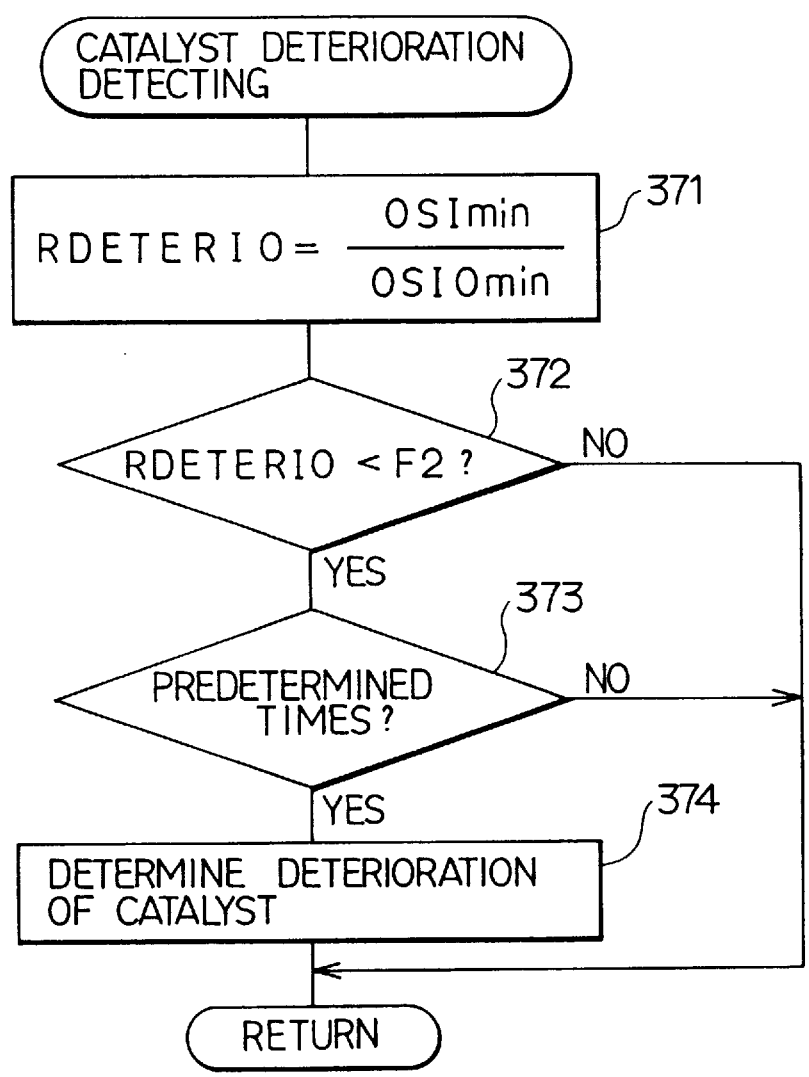
FIG. 20 is a flowchart showing a catalyst deterioration (rich component) detecting routine.
Figure 21:
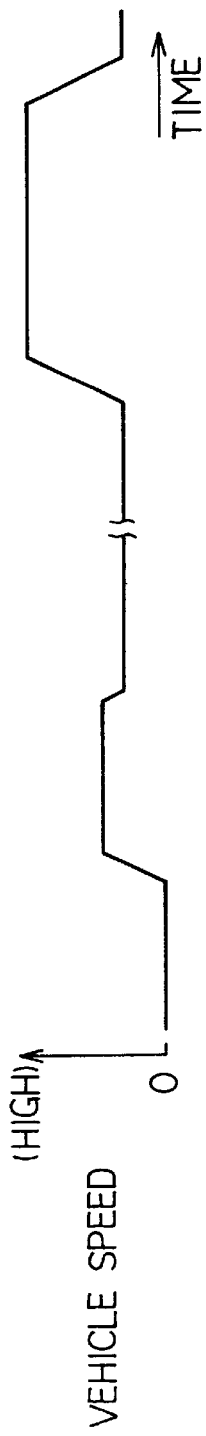
FIGS. 21A to 21E are time charts for explaining the operation for determining the abnormality of the air fuel ratio sensor on the upstream side in a second embodiment.

Referring to FIG. 20, a catalyst deterioration detecting routine for detecting the deterioration of catalyst 27 based upon the maximum absorbed quantity OSImin of the rich component will be described below. This routine is executed every time the maximum absorbed quantity OSImin of the rich component is calculated in step 353 shown in FIG. 18. In this routine, first in step 371, the current maximum absorbed quantity OSImin of the rich component is divided by a maximum absorbed quantity OSIOmin of the rich component which catalyst 27 could absorb before performance of catalyst 27 deteriorates in order to obtain a catalyst deterioration degree determination value RDETERIO. In the next step 372, the catalyst deterioration degree determination value RDETERIO is compared with a predetermined deterioration determination value F2. Further, it is determined in step 373 whether a positive determination at step 372 is made predetermined times continuously. When a positive determination is made at step 373, it is determined that catalyst 27 has deteriorated. When a negative determination is made at step 373, this routine is finished without determining the deterioration of catalyst 27.

Only either of catalyst deterioration detecting routines shown in FIGS. 19 and 20 may be used. When both routines shown in FIGS. 19 and 20 are executed, a method of determining the deterioration of catalyst 27 when the deterioration of catalyst 27 is detected by either routine and another method of determining the deterioration of catalyst 27 when the deterioration of catalyst 27 is simultaneously detected by both routines are conceivable.

In the first embodiment, the central value of FA/F and the central value of RA/F are calculated in FIG. 7. The inflow quantity of an exhaust gas component is calculated in FIG. 14 using these central values and the outflow quantity of an exhaust gas component is calculated in FIG. 16 using the same. However, a sensor output value which is equivalent to theoretical air fuel ratio may be also used in place of the central values of FA/F and RA/F to calculate the inflow quantity and the outflow quantity of an exhaust gas component. When the central values of FA/F and RA/F are used, the quantity of the exhaust gas component flowing into and out of catalyst 27 can be accurately calculated even if air fuel ratio sensor 28 or 29 deteriorates and sensor 28 or 29 cannot generate a sensor output equivalent to theoretical air fuel ratio when it should be generated.

(Second Embodiment)

A second embodiment according to the present invention, which is shown in FIGS. 21A to 23, detects an abnormality of upstream air fuel ratio sensor 28 with a different way from the first embodiment. In the second embodiment, the abnormality of upstream air fuel ratio sensor 28 is detected based upon the behavior of a signal output from upstream air fuel ratio sensor 28 when a fuel injection quantity is increased due to a low temperature or a heavy load. The principle of detecting the abnormality will be described below referring to time charts shown FIGS. 21A to 21E.

As shown in FIGS. 21A to 21E, engine 11 is started by turning on an ignition key at time t10. At this time, a coolant temperature correction factor FWL is set to a larger value than 1.0 to increase fuel injection quantity because of the low temperature of engine coolant. Afterward, when the temperature of engine coolant is gradually increased and reaches a predetermined value (for example, 40° C.), feedback control based on air fuel ratio is started at time t11. An air fuel ratio correction factor FAF is set to a small value against the increase of the fuel injection quantity in response to the low temperature of engine coolant. As a result, the air fuel ratio correction factor FAF is increased as the coolant temperature correction factor FWL is reduced. The air fuel ratio correction factor FAF converges on approximately 1.0 at time t12 at which the engine 11 is heated up and the increase of fuel injection quantity in response to the low temperature is finished.

From time t10 to time t11, air fuel ratio $\lambda$ (which is detected by upstream air fuel ratio sensor 28) is shifted on the side of a rich component in response to the increase of fuel injection quantity. It is diagnosed whether upstream air fuel ratio sensor 28 is abnormal based upon the variation of air fuel ratio $\lambda$ in response to the increase of fuel injection quantity. From time t11 to time t12, the increase of fuel injection quantity is continued. However, since an air fuel ratio correction factor FAF is reduced, air fuel ratio $\lambda$ is held in the vicinity of target air fuel ratio $\lambda$TG ($\lambda$TG=1.0 in FIG. 21D). During this period, it is also diagnosed whether upstream air fuel ratio sensor 28 is abnormal based upon the variation of air fuel ratio λ in response to the increase of fuel injection quantity and the reduction of FAF.

When a vehicle is running, fuel injection quantity is increased in response to a heavy load to engine 11 based on a vehicle acceleration, as shown at time t13. At this time, feedback control of air fuel ratio is temporarily suspended and so-called open-loop control is performed. During open-loop control, the air fuel ratio correction factor FAF is held to 1.0. A load correction factor FOTP is increased and air fuel ratio λ (which is detected by upstream air fuel ratio sensor 28) is shifted on the side of a rich component. From time t13 to time t14, it is diagnosed whether upstream air fuel ratio sensor 28 is abnormal based upon the variation of air fuel ratio λ in response to the increase of fuel injection quantity owing to the heavy load.

Afterward, at time t14 when a vehicle begins to reduce its speed, the increase of fuel injection quantity owing to the heavy load is finished and the load correction factor FOTP returns to 1.0. At time t14, as a result that fuel is cut, air fuel ratio λ is temporarily shifted on the side of a lean component greatly. Feedback control of air fuel ratio is resumed after the fuel cut.

Figure 22:
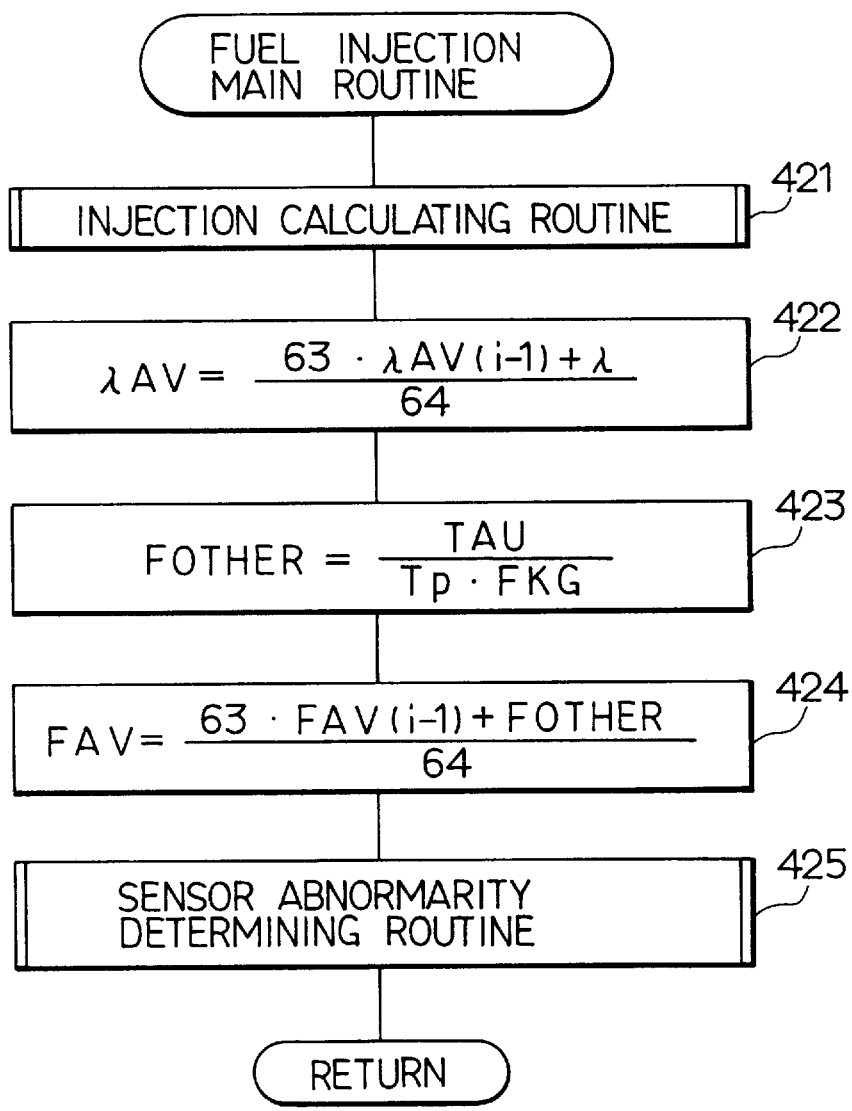
FIG. 22 is a flowchart showing a fuel injection main routine.
Figure 23:
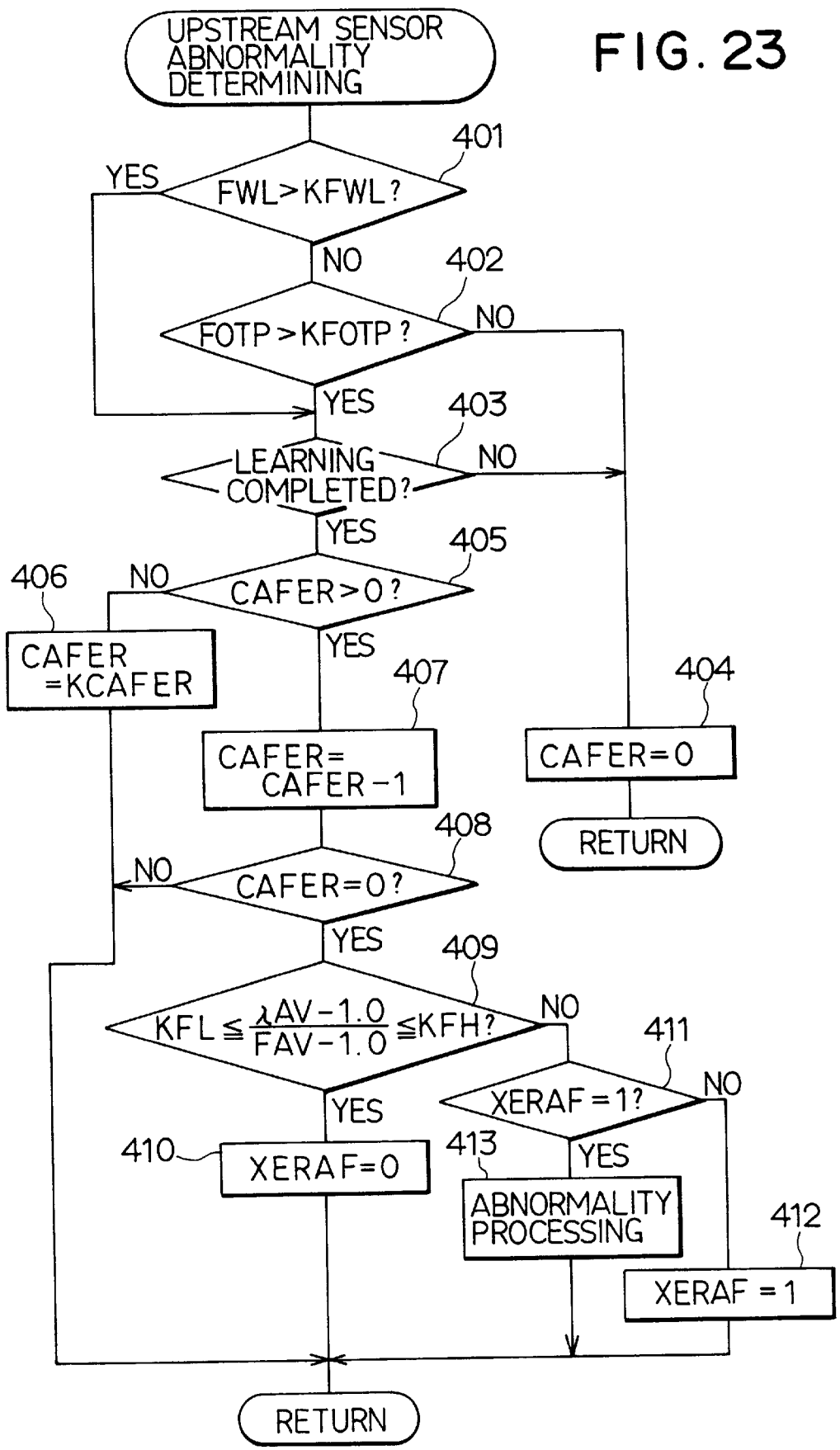
FIG. 23 is a flowchart showing an upstream air fuel ratio sensor abnormality determining routine in the second embodiment.

The above-described operation is executed by a fuel injection main routine shown in FIG. 22 and an upstream air fuel ratio sensor abnormality determining routine shown in FIG. 23. The fuel injection main routine shown in FIG. 22 is executed in synchronism with the fuel injecting operation of injectors 20. When processing by this routine is started, in step 421, the injection quantity calculating routine shown in FIG. 5 is executed to calculate fuel injection quantity TAU. Afterward, in step 422, an averaging value λAV of air fuel ratio λ is calculated with 1/64 averaging operation according to the following expression:

$$\lambda AV = (63 \times \lambda AV(i-1) + \lambda)/64$$

In the next step 423, fuel injection quantity TAU is divided by basic injection quantity Tp and an air fuel ratio learned value FKG to obtain fuel correction quantity FOTHER for injection quantity TAU.

$$FOTHER = TAU/(Tp \times FKG)$$

Fuel correction quantity FOTHER is equivalent to a total correction quantity except the air fuel ratio learned value FKG and is obtained as a correction factor including, for example, a coolant temperature correction factor FWL, a load correction factor FOTP and an air fuel ratio correction factor FAF. That is, basic injection quantity Tp calculated according to the operating state of engine 11 (engine speed Ne, intake pressure PM and so on) is originally set so that air fuel ratio λ is controlled to be theoretical air fuel ratio λth (λth=1). The dispersion of fuel injection quantity due to differences in characteristic among engines of the same type and aging of an engine is compensated by the air fuel ratio learned value FKG. Therefore, in step 423, total correction quantity required for realizing the air fuel ratio λth (λth=1) can be obtained by dividing TAU by Tp×FKG.

Afterward, in step 424, an average value FAV of correction factor FOTHER is calculated according to the following expression:

$$FAV = (63 \times FAV(i-1) + FOTHER)/64$$

In the next step 425, the upstream air fuel ratio sensor abnormality determining routine shown in FIG. 23 is executed.

In step 401, it is determined whether a coolant temperature correction factor FWL exceeds a predetermined determination value KFWL. For example, when fuel injection quantity is increased owing to a low temperature (at time t10 shown in FIG. 21), FWL is larger than KFWL. As a result, in step 401 "Yes" is selected and processing is jumped to step 403. However, if FWL≦KFWL, it is determined at step 402 whether a load correction factor FOTP exceeds a predetermined determination value KFOTP. For example, when fuel injection quantity is increased owing to a heavy load (at time t13 shown in FIG. 21), FOTP is larger than KFOTP. As a result, in step 402 "Yes" is selected and processing proceeds to step 403. In step 403, it is determined whether processing for learning air fuel ratio is completed in the total area in which engine 11 is operated. In the meantime, when fuel injection quantity is not increased because of the low temperature or the heavy load ("No" is selected in steps 401 and 402) or when learning air fuel ratio in the total area is not completed ("No" is selected in step 403), processing proceeds to step 404. In step 404, a value of a counter CAFER is cleared to zero and this routine is finished. That is, if learning air fuel ratio is not completed, the dispersion of injection quantity due to differences in characteristic among engines of the same type and aging of an engine cannot be corrected in an area in which the learning is not completed. Only when the learning is completed, it is diagnosed whether upstream air fuel ratio sensor 28 is abnormal.

If fuel injection quantity is increased because of the low temperature or the heavy load and the learning of air fuel ratio is completed (that is, if "Yes" is selected in either step 401 or 402 and "Yes" is selected in step 403), processing proceeds to a step 405. In step 405, it is determined whether the value of the counter CAFER is larger than zero. Since CAFER =0 (initial value) at the beginning, "No" is selected in step 405 and processing proceeds to step 406. In step 406, a predetermined value KCAFER (for example, a value equivalent to fuel injections of 15 times) is set in the counter CAFER and this routine is finished.

After the value KCAFER is set in the counter CAFER in step 406, "Yes" is selected in step 405 when this routine is executed afterwards. Therefore, processing proceeds to step 407 and the counter CAFER is decremented by one. In the next step 408, it is determined whether the value of the counter CAFER is zero. If it is not zero, this routine is finished without executing further steps. The above processing is repeated until CAFER=0. Afterward, when CAFER= 0, processing proceeds from step 408 to step 409. An error λAV−1.0 between the average value λAV of air fuel ratio calculated in step 422 and target air fuel ratio λTG (λTG=1.0 in this embodiment) and an error FAV−1.0 between the average value FAV of correction factor FOTHER calculated in step 424 and a reference value (1.0 ) are calculated. Further, the ratio (λAV−1.0 )/(FAV−1.0 ) of both errors is worked out and it is determined whether the ratio is in a predetermined range (from KFL to KFH, for example, KFL=−0.8, KFH=−1.2).

If "Yes" is selected in step 409, the output of upstream air fuel ratio sensor 28 is determined to be normal. Processing proceeds to step 410, an upstream abnormality determining flag XERAF is cleared to zero and then this routine is finished.

If "No" is selected in step 409, upstream air fuel ratio sensor 28 is determined to be abnormal. Processing proceeds to step 411 and it is determined whether the upstream abnormality determining flag XERAF has been already set to '1'. If XERAF=0, the flag XERAF is set to '1' in step 412 and this routine is finished. If upstream air fuel ratio sensor 28 is determined to be abnormal again in the next determination at step 409, processing proceeds to step 413 and a predetermined processing against a sensor abnormality is executed (for example, an alarm lamp 37 is lit or feedback control based on detected air fuel ratio is suspended).

According to the second embodiment, as total fuel correction quantity FOTHER for basic injection quantity Tp calculated based upon engine speed Ne and a load applied to engine 11 (intake pressure PM) is worked out in step 423 and the average value FAV thereof is also obtained in step 424. Based upon the result of comparing the average value FAV of the total correction quantity FOTHER and the variation of air fuel ratio $\lambda$ detected by upstream air fuel ratio sensor 28, it is determined whether upstream air fuel ratio sensor 28 is abnormal. Therefore, the abnormality of upstream air fuel ratio sensor 28 can be precisely and readily determined like the first embodiment.

In the second embodiment, it is determined whether upstream air fuel ratio sensor 28 is abnormal in response to the increase of fuel injection quantity based upon a low temperature or a heavy load when engine 11 is operated. However, when the fuel injection quantity is decreased, it can be also determined whether upstream air fuel ratio sensor 28 is abnormal. For example, in an air-fuel ratio control system having an evapopurge mechanism for purging fuel vapor (evaporation gas) generated in a fuel tank into the inlet pipe of engine 11, fuel quantity injected from injectors 20 is reduced according to a purged fuel quantity. In such a state, it is determined based upon the variation of air fuel ratio $\lambda$ (the output of upstream air fuel ratio sensor 28) when fuel injection quantity is reduced whether upstream air fuel ratio sensor 28 is abnormal.

(Third Embodiment)

FIGS. 24A to 24C and 25 show a third embodiment for determining the abnormality of upstream air fuel ratio sensor 28 by a method different from those in the above embodiments. In the third embodiment, it is determined based upon the behavior of air fuel ratio $\lambda$ (detected by upstream air fuel ratio sensor 28) in transient operation of engine 11 whether upstream air fuel ratio sensor 28 is abnormal. The principle of determining the abnormality of air fuel ratio sensor 28 in the third embodiment will be described below referring to time charts shown in FIGS. 24A to 24C.

Figure 24A:
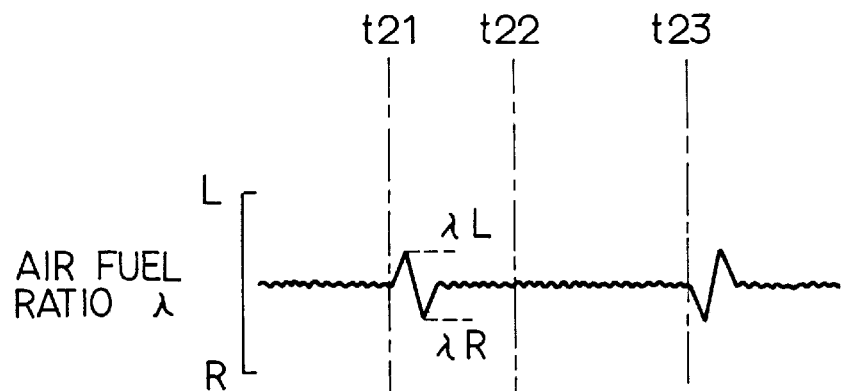
FIGS. 24A to 24C are time charts for explaining the operation for determining the abnormality of the air fuel ratio sensor on the upstream side in a third embodiment.
Figure 24B:
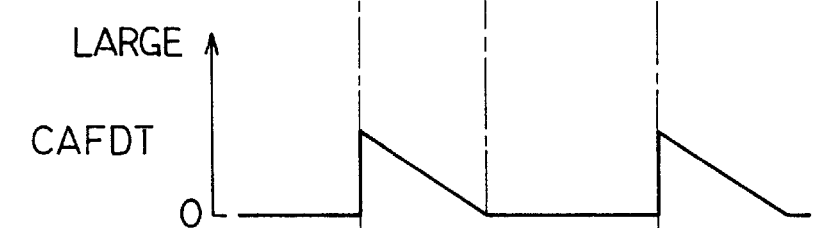
Figure 24C:
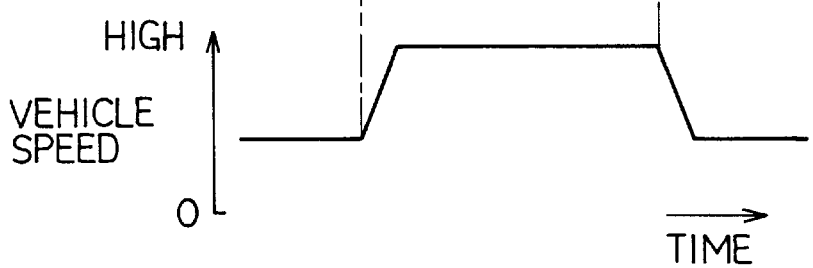

As shown in FIGS. 24A to 24C, a vehicle is suddenly accelerated at time t21. As a result, air fuel ratio $\lambda$ temporarily fluctuates on the sides of lean and rich components. When a vehicle is suddenly decelerated at time t23, air fuel ratio $\lambda$ also fluctuates greatly. In this case, it is determined based upon a difference between a lean peak $\lambda$L and a rich peak $\lambda$R (amplitude of air fuel ratio $\lambda$) when air fuel ratio $\lambda$ fluctuates whether upstream air fuel ratio sensor 28 is abnormal.

Figure 25:
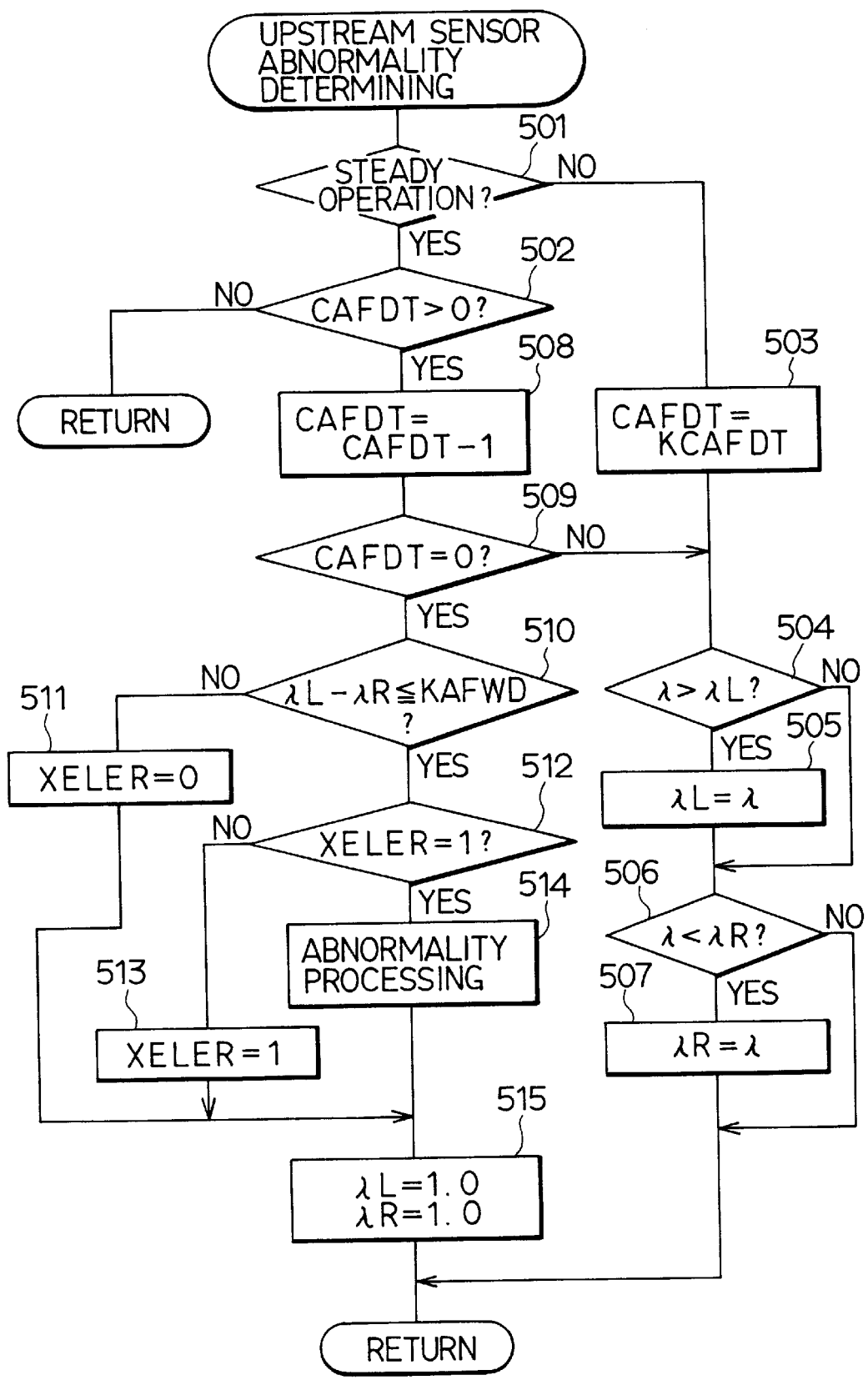
FIG. 25 is a flowchart showing an upstream air fuel ratio sensor abnormality determining routine in the third embodiment.

The above-described processing is executed by an upstream air fuel ratio sensor abnormality determining routine shown in FIG. 25. First in step 501, it is determined whether an operating state of engine 11 is steady. The determination of whether it is steady is performed based on whether a vehicle accelerates or decelerates, whether target air fuel ratio $\lambda$TG has been suddenly varied or whether an air fuel ratio correction factor FAF has been suddenly varied. If the operating state of engine 11 is steady, processing proceeds to step 502 and it is determined whether a value of a counter CAFDT exceeds zero. As the value of the counter CAFDT is zero (an initial value) at the start of the diagnosis of abnormality, "No" is selected in step 502 and this routine is finished without executing further steps.

If, for example, a vehicle is suddenly accelerated and engine 11 is in a transient operation, "No" is selected in step 501 (time t21 shown in FIG. 24). Processing proceeds to step 503 and a predetermined value KCAFDT is set in the counter CAFDT. Afterward, in step 504, it is determined whether the current air fuel ratio $\lambda$ is larger than a stored lean peak $\lambda$L (it is on the side of a lean component further than the stored lean peak $\lambda$L). Only if $\lambda$>$\lambda$L, processing proceeds to step 505 and the lean peak $\lambda$L is updated with the current air fuel ratio $\lambda$. Afterward, processing proceeds to step 506 and it is determined whether the current air fuel ratio $\lambda$ is smaller than a stored rich peak $\lambda$R (it is on the side of a rich component further than $\lambda$R). Only if $\lambda$<$\lambda$R, processing proceeds to a step 507 and the rich peak $\lambda$R is updated with the current air fuel ratio $\lambda$. As described above, a lean peak $\lambda$L and a rich peak $\lambda$R are updated during a period of the transient operation of engine 11.

Afterward, when the operating state of engine 11 is returned to a steady state, processing proceeds to steps 501, 502 and 508 and the counter CAFDT is decremented by one. In the next step 509, it is determined whether the value of the counter CAFDT is zero. If CAFDT is not zero, processing proceeds to the above step 504. That is, a lean peak $\lambda$L and a rich peak $\lambda$L are updated in steps 504 to 507 during a period in which the counter CAFDT is decremented to zero (From t21 to 22 shown in FIG. 24).

Afterward, when CAFDT=0 (at time t22 shown in FIG. 24), "Yes" is selected in the step 509. In the next step 510, it is determined whether difference between a lean peak $\lambda$L and a rich peak $\lambda$R is equal to or less than a predetermined value KAFWD. If $\lambda$L–$\lambda$R>KAFWD, processing proceeds to step 511 and an upstream abnormality determining flag XELER is cleared to zero. That is, if $\lambda$L–$\lambda$R>KAFWD, it means that increasing fuel injection quantity because of sudden acceleration normally has affected the output of upstream air fuel ratio sensor 28. Thus, upstream air fuel ratio sensor 28 is determined to be normal. In the next step 515, the lean peak $\lambda$L and the rich peak $\lambda$L are respectively reset to 1.0 for the next determination of abnormality and this routine is finished.

If the result of determination in step 510 is $\lambda$L–$\lambda$R ≦KAFWD, processing proceeds to step 512 and it is determined whether the upstream abnormality determining flag XELER has been already set to '1'. If the upstream abnormality determining flag XELER has not been set to '1', processing proceeds to step 513 and the flag XELER is set to '1'. If it is again determined to be abnormal in the next determination at step 510, in step 514 processing against the abnormality of sensor 28 is executed.

According to the third embodiment, if engine 11 is in a transient operation, the amplitude $\lambda$L–$\lambda$R of air fuel ratio $\lambda$ detected by upstream air fuel ratio sensor 28 is worked out. It is diagnosed based upon the amplitude $\lambda$L–$\lambda$R whether upstream air fuel ratio sensor 28 is abnormal. Hereby, it can be precisely and readily determined whether upstream air fuel ratio sensor 28 is abnormal like the above embodiments.

(Fourth Embodiment)

In a fourth embodiment, downstream air fuel ratio sensor 29 operates as a linear air fuel (A/F) sensor which generates a linear air fuel ratio signal according to air fuel ratio of exhaust gas when operating voltage is applied thereto. However, downstream air fuel ratio sensor 29 operates as an oxygen sensor which detects only whether the air fuel ratio of exhaust gas is on the side of a lean component or a rich component (output signal thereof is inverted depending upon the side of a lean or rich component) when operating voltage is not applied thereto.

[Control of downstream air fuel ratio sensor 29]

Figure 26:
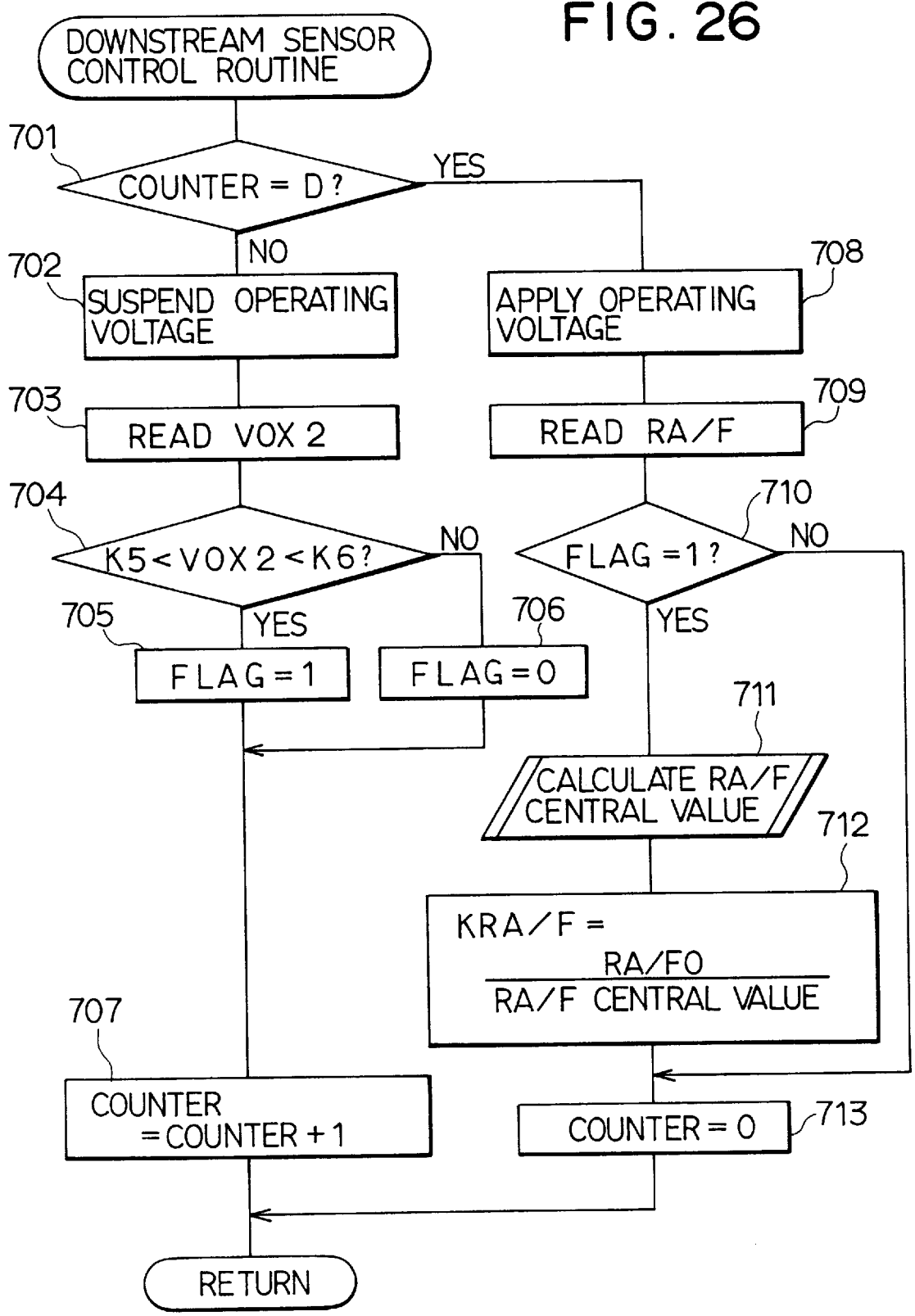
FIG. 26 is a flowchart showing a downstream air fuel ratio sensor control routine in a fourth embodiment.

Referring to FIG. 26, a downstream air fuel ratio sensor control routine for turning on or off an operating voltage for downstream air fuel ratio sensor 29 will be described below. In this routine, first in step 701, it is determined whether a value of a time counter COUNTER incremented in step 707 described later reaches a predetermined value D. That is, it is determined whether a predetermined time elapses or not. If the predetermined time does not elapse, application of the operating voltage is suspended in step 702. If the predetermined time elapses, the operating voltage is applied to downstream air fuel ratio sensor 29 in step 708.

While application of the operating voltage is suspended, in step 703, an output VOX2 from downstream air fuel ratio sensor 29 as an oxygen sensor is read. In the next step 704, it is determined whether the output VOX2 from oxygen sensor 29 is in a predetermined range (K5<VOX2<K6, K5, K6: predetermined value). If the output VOX2 is in the predetermined range, a central value operation execution flag FLAG is set to '1' in step 705. If the output is out of the predetermined range, the central value operation execution flag FLAG is cleared to zero in step 706. Afterward, in step 707, the time counter COUNTER is incremented and this routine is finished.

While the operating voltage is applied, in step 709, output RA/F from downstream air fuel ratio sensor 29 as a linear A/F sensor is read. In the next step 710, it is determined whether the central value operation execution flag FLAG is '1'. If FLAG=1, the central value of RA/F is calculated in step 710. The central value of RA/F is calculated by the same method as the steps 113 to 115 shown in FIG. 7. In the next step 712, a correction factor KRA/F for absorbing the change of a static characteristic due to aging of downstream air fuel ratio sensor 29 is calculated according to the following expression:

$$KRA/F = RA/FO \div RA/F \text{ central value}$$

RA/FO is the central value of RA/F when the static characteristic of downstream air fuel ratio sensor 29 is not varied because of the aging thereof. Correction factor KRA/F is obtained by dividing the central value RA/FO by the central value of the current RA/F obtained in step 711. Afterward, in step 713, the time counter COUNTER is cleared and this routine is finished. If the central value operation execution flag FLAG is '0' in step 710, processing proceeds to step 713 without performing steps 711 and 712, the time counter COUNTER is cleared and this routine is finished.

While application of the operating voltage is suspended, only when output VOX2 from downstream air fuel ratio sensor 29 as an oxygen sensor is stable in a predetermined range, the central value of RA/F is calculated at step 711. RA/F static characteristic correction factor KRA/F is calculated based on the central value of RA/F.

[Calculation of the outflow of an exhaust gas component]

Figure 27:
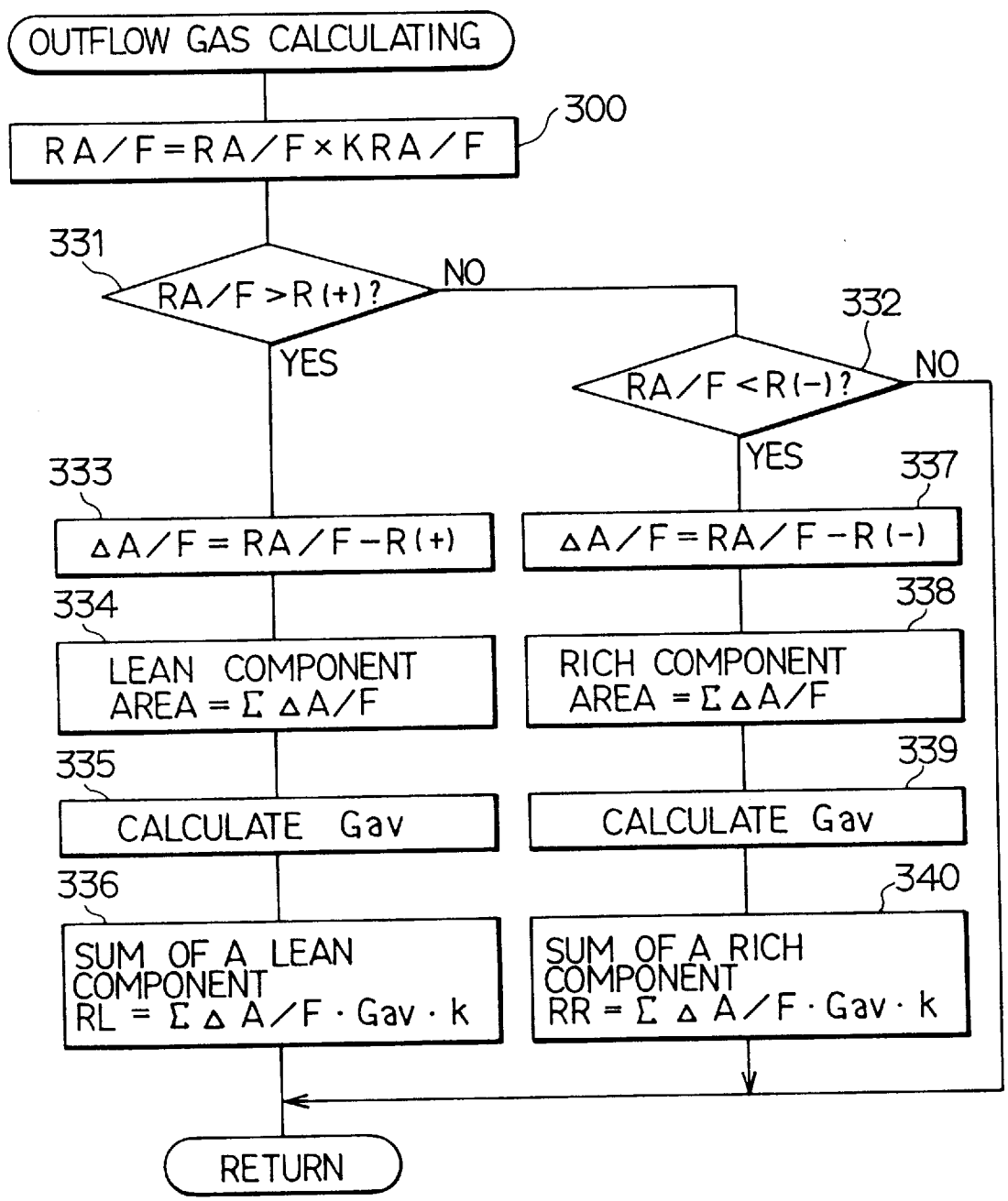
FIG. 27 is a flowchart showing an exhaust gas component outflow calculating routine in the fourth embodiment.

An exhaust gas component outflow calculating routine shown in FIG. 27 adds step 300 to the routine shown in FIG. 16. In this routine, first in step 300, the output RA/F of downstream air fuel ratio sensor 29 is multiplied by the correction factor KRA/F for absorbing the change of the static characteristic obtained in step 712. Hereby, the accurate value of RA/F in which an error due to the change of the static characteristic is eliminated is obtained. Processing in each step after step 300 is the same as that shown in FIG. 16. The lean component quantity RL and the rich component quantity RR of exhaust gas flowing out of catalyst 27 are precisely calculated using RA/F corrected in step 300.

In this embodiment, processing other than that shown in FIGS. 26 and 27 is the same as that in the first embodiment.

(Fifth Embodiment)

Figure 14:
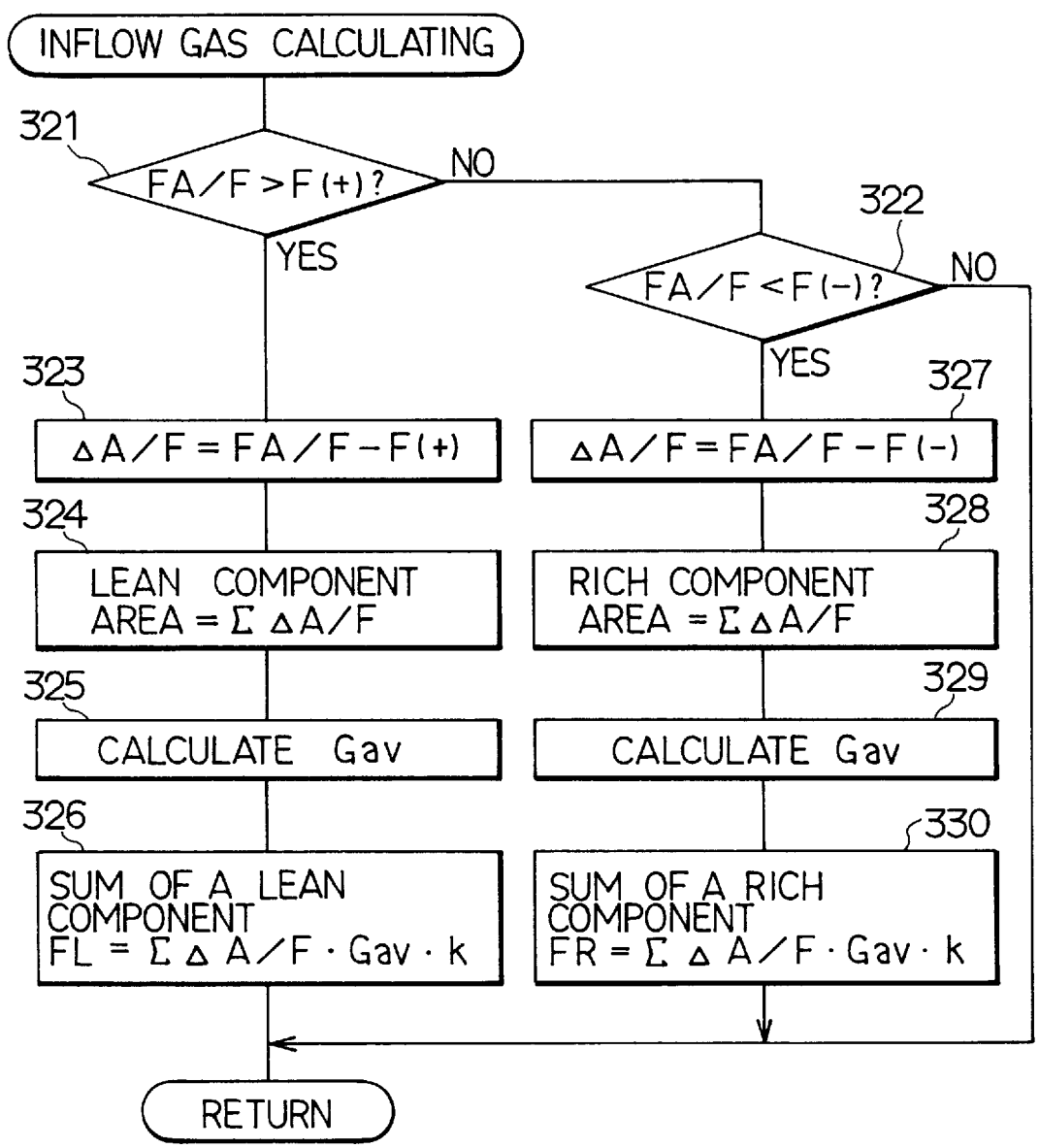
FIG. 14 is a flowchart showing an exhaust gas component inflow calculating routine.

In the first embodiment, when the quantity of an exhaust gas component flowing into/out of catalyst 27 is calculated as shown in FIGS. 14 and 16, the integrated value ΣΔA/F (area) of the deviation ΔA/F of air fuel ratio is multiplied by the average value Gav of the quantity of exhaust gas. However, in a fifth embodiment shown in FIGS. 28 to 30, a quantity of an exhaust gas component is calculated every time a deviation ΔA/F is calculated. The method of the calculation will be described in detail below.

[Calculation of the inflow quantity of an exhaust gas component]

Figure 28:
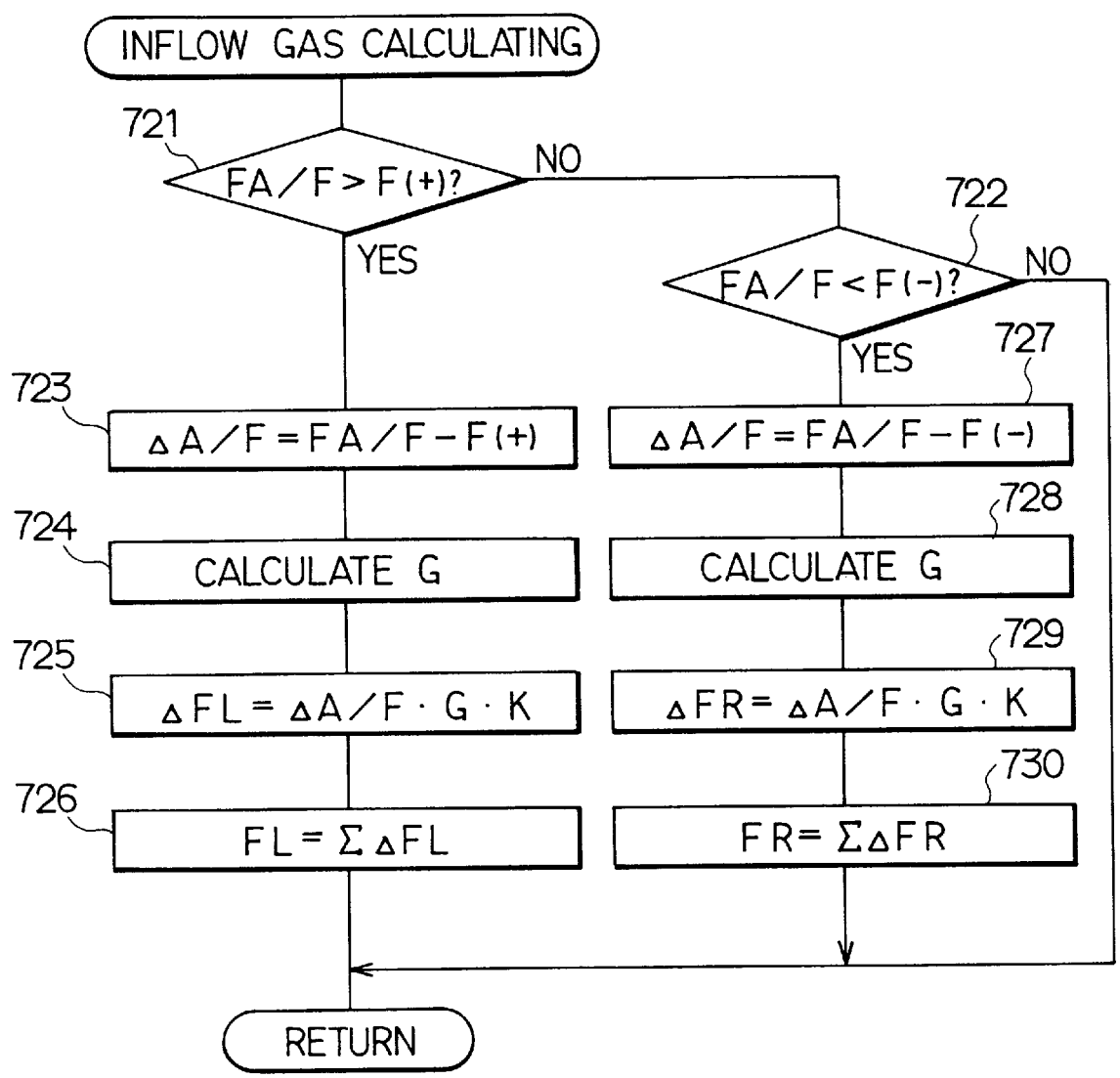
FIG. 28 is a flowchart showing an exhaust gas component inflow calculating routine in a fifth embodiment.

Referring to FIG. 28, an exhaust gas component inflow calculating routine for calculating the inflow quantity of an exhaust gas component flowing into catalyst 27 will be described below. In this routine, first in steps 721 and 722, the output FA/F of upstream air fuel ratio sensor 28 is compared with the upper limit F(+) and the lower limit F(−) of the central value of FA/F. If F(−)≦FA/F≦F(+), that is, if FA/F can be regarded as the central value of FA/F, this routine is finished without executing further steps.

If FA/F>F(+), that is, if air fuel ratio on the upstream side of catalyst 27 is off on the side of a lean component from the central value of FA/F, processing proceeds to step 723. A deviation ΔA/F (=FA/F−F(+)) between FA/F and the upper limit F(+) is calculated in step 723. In the next step 724, the quantity G of exhaust gas flowing into catalyst 27 is calculated based upon the operating state of engine 11. Afterward, in step 725, a lean component quantity FL of exhaust gas flowing into catalyst 27 is calculated according to the following expression:

$$\Delta FL = \Delta A/F \times G \times k \text{ (}k\text{: coefficient)}$$

Afterward, in step 726, lean component quantity ΔFL of exhaust gas is integrated to obtain the total lean component quantity FL of exhaust gas.

If FA/F<F(−), that is, if air fuel ratio on the upstream side of catalyst 27 is off on the side of a rich component from the central value of FA/F, processing proceeds to step 727. A deviation ΔA/F=(FA/F−F(−)) between FA/F and the lower limit F(−) is calculated in step 727. In the next step 728, the quantity G of exhaust gas is calculated based upon operating state of engine 11. Afterward, in step 729, a rich component quantity ΔFR of exhaust gas flowing into catalyst 27 is calculated according to the following expression:

$$\Delta FR = \Delta A/F \times G \times k \text{ (}k\text{: coefficient)}$$

Afterward, in step 730, rich component quantity ΔFR of exhaust gas is integrated to obtain a total rich component quantity FR of exhaust gas flowing into catalyst 27.

FIGS. 30A to 30C show the relationship among the total lean and rich component quantities FL and FR of exhaust gas and air fuel ratio FA/F detected by upstream air fuel ratio sensor 28.

[Calculation of the outflow of an exhaust gas component]

Figure 29:
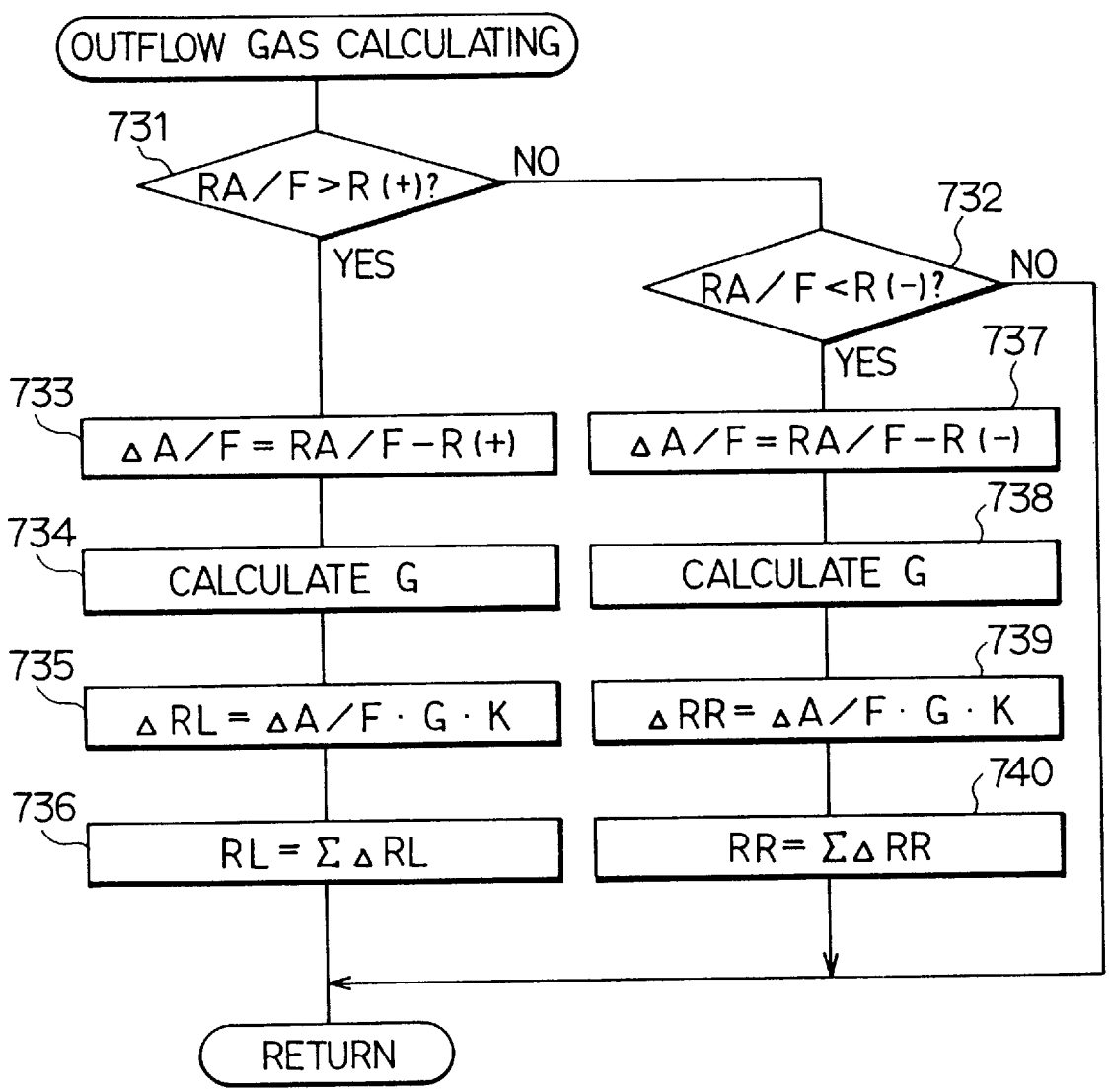
FIG. 29 is a flowchart showing an exhaust gas component outflow calculating routine in the fifth embodiment.
Figure 30:
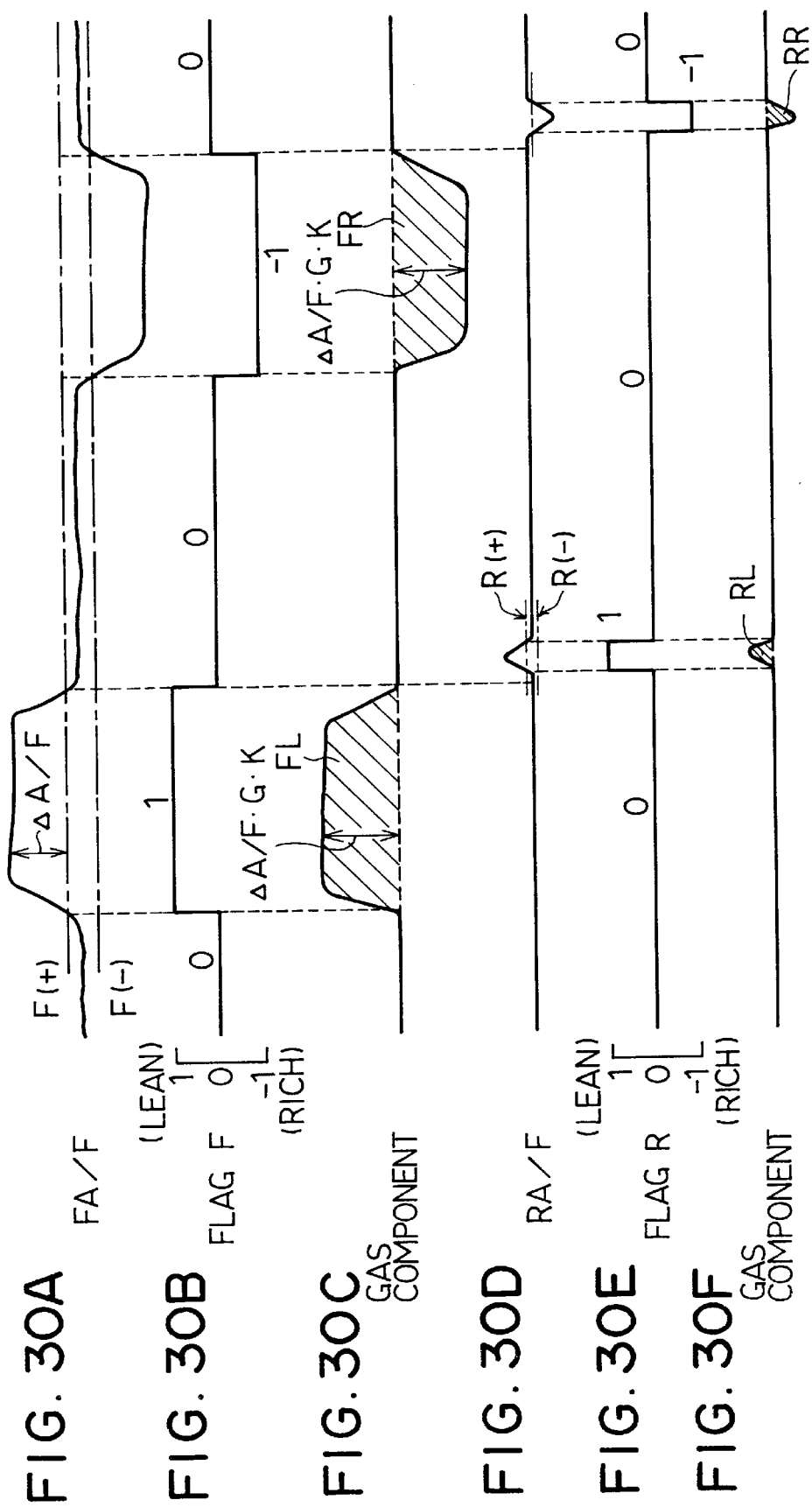
FIGS. 30A to 30F are time charts showing the processing timing of calculating the quantity of an exhaust gas component.

Referring to FIG. 29, an exhaust gas component outflow calculating routine for calculating the outflow quantity of an exhaust gas component flowing out of catalyst 27 will be described below. In this routine, first in steps 731 and 732, the output RA/F of downstream air fuel ratio sensor 29 is compared with the upper limit R(+) and the lower limit R(−) of the central value of RA/F. If R(−)≦RA/F≦R(+), that is, if RA/F can be regarded as the central value of RA/F, this routine is finished without executing further steps.

If RA/F>R(+), that is, if air fuel ratio on the downstream side of catalyst 27 is off on the side of a lean component from the central value of RA/F, processing proceeds to step 733. A deviation ΔA/F=(RA/F−R(+)) between RA/F and the upper limit R(+) is calculated in step 733. In the next step 734, the quantity G of exhaust gas is calculated based upon the operating state of engine 11. Afterward, in step 735, a lean component quantity ΔRL of exhaust gas flowing out of catalyst 27 is calculated according to the following expression:

$$\Delta RL = \Delta A/F \times G \times k \quad (k: \text{coefficient})$$

Afterward, in step 736, the lean component quantity ΔRL of exhaust gas is integrated to obtain a total lean component quantity RL of exhaust gas flowing out of catalyst 27.

If RA/F<R(−), that is, if air fuel ratio on the downstream side of catalyst 27 is off on the side of a rich component from the central value of RA/F, processing proceeds to step 737. A deviation ΔA/F (=RA/F−R(−)) between RA/F and the lower limit R(−) is calculated in step 737. In the next step 738, the quantity G of exhaust gas is calculated based upon the operating state of engine 11. Afterward, in step 739, a rich component quantity ΔRR of exhaust gas flowing out of catalyst 27 is calculated according to the following expression:

$$\Delta RR = \Delta A/F \times G \times k \quad (k: \text{coefficient})$$

Afterward, in step 740, the rich component quantity ΔRR of exhaust gas is integrated to obtain a total rich component quantity RR of exhaust gas flowing out of catalyst 27.

FIGS. 30D to 30F show the relationship among the total lean and rich component quantities RL and RR of exhaust gas and air fuel ratio RA/F detected by downstream air fuel ratio sensor 29.

(Sixth Embodiment)

From the first embodiment to the fifth embodiment, as downstream air fuel ratio sensor 29, a linear A/F sensor which generates a linear air fuel ratio signal according to air fuel ratio of exhaust gas is used. However, in a sixth embodiment shown in FIGS. 31 to 53, as a downstream air fuel ratio sensor 29, an oxygen sensor the output of which is inverted depending upon the air fuel ratio of exhaust gas being on the side of a rich or lean component is used. The output voltage of the oxygen sensor is linearized by output linearizing means (processing in step 859 shown in FIG. 39 described later) to convert into air fuel ratio.

[Calculation of the inflow quantity of an exhaust gas component]

Figure 31:
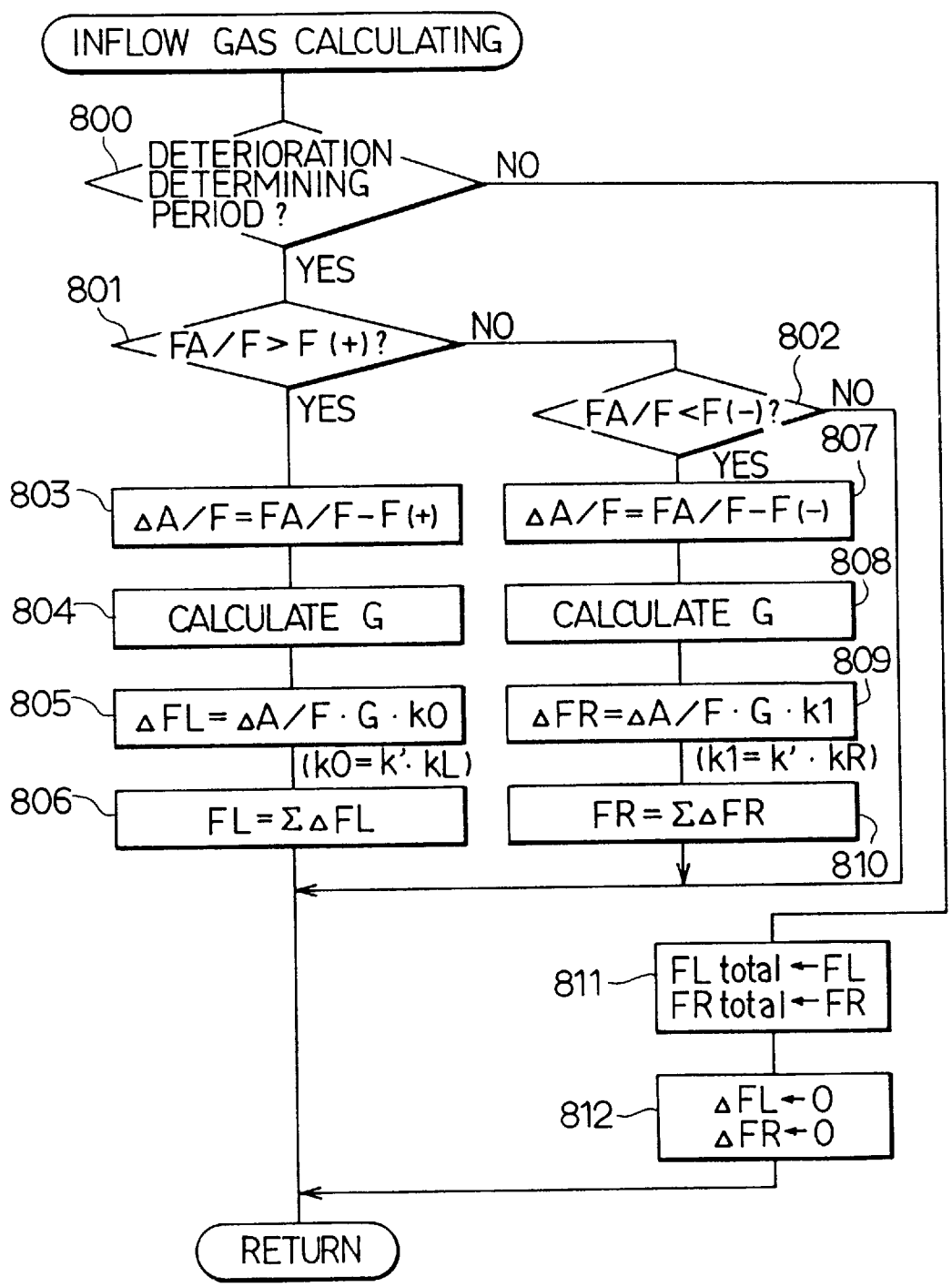
FIG. 31 is a flowchart showing an exhaust gas component inflow calculating routine in a sixth embodiment.

Referring to FIG. 31, an exhaust gas component inflow calculating routine for calculating the inflow quantity of an exhaust gas component flowing into catalyst 27 will be described below. In this routine, first in step 800, it is determined according to deterioration determining period setting routines (1) to (3) described later whether the operating state of engine 11 is in one of deterioration determining periods during which the deterioration of catalyst 27 is determined. In the deterioration determining period setting routines (1) to (3), it is determined whether the operating state of engine 11 is in one of the deterioration determining periods based upon the value of a period indicating flag set by each routine.

If the operating state of engine 11 is in the deterioration determining period, processing proceeds to step 801. The total inflow quantity of an exhaust gas component in the deterioration determining period is calculated according to steps 801 to 810.

First in steps 801 and 802, the output FA/F of upstream air fuel ratio sensor 28 is compared with the upper limit F(+) and the lower limit F(−) of the central value of FA/F. If F(−)≦FA/F≦F(+), that is, if FA/F can be regarded as the central value of FA/F, this routine is finished without executing further steps.

If FA/F>F(+), that is, if air fuel ratio on the upstream side of catalyst 27 is off on the side of a lean component from the central value of FA/F, processing proceeds to step 803. A deviation ΔA/F=(FA/F−F(+)) between FA/F and the upper limit F(+) is calculated at step 803. In the next step 804, the quantity G of exhaust gas is calculated based upon the operating state of engine 11. Afterward, in step 805, the molar value ΔFL of a lean component quantity of exhaust gas flowing into catalyst 27 is calculated according to the following expression:

$$\Delta FL = \Delta A/F \times G \times k0$$

$$k0 = k' \times kL$$

Figure 32:
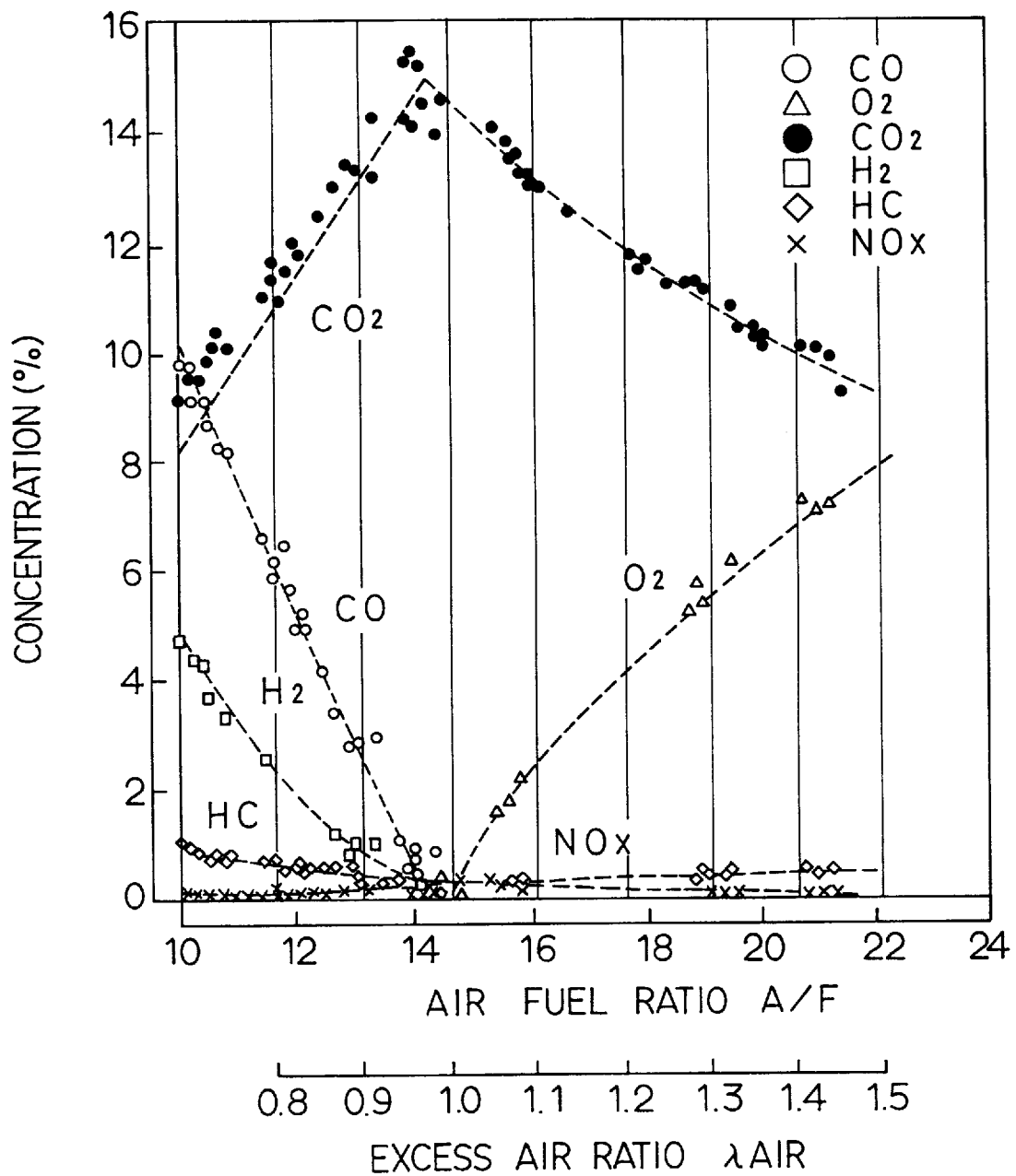
FIG. 32 is a graph showing the concentration of each component against the air fuel ratio A/F of exhaust gas.
Figure 33:
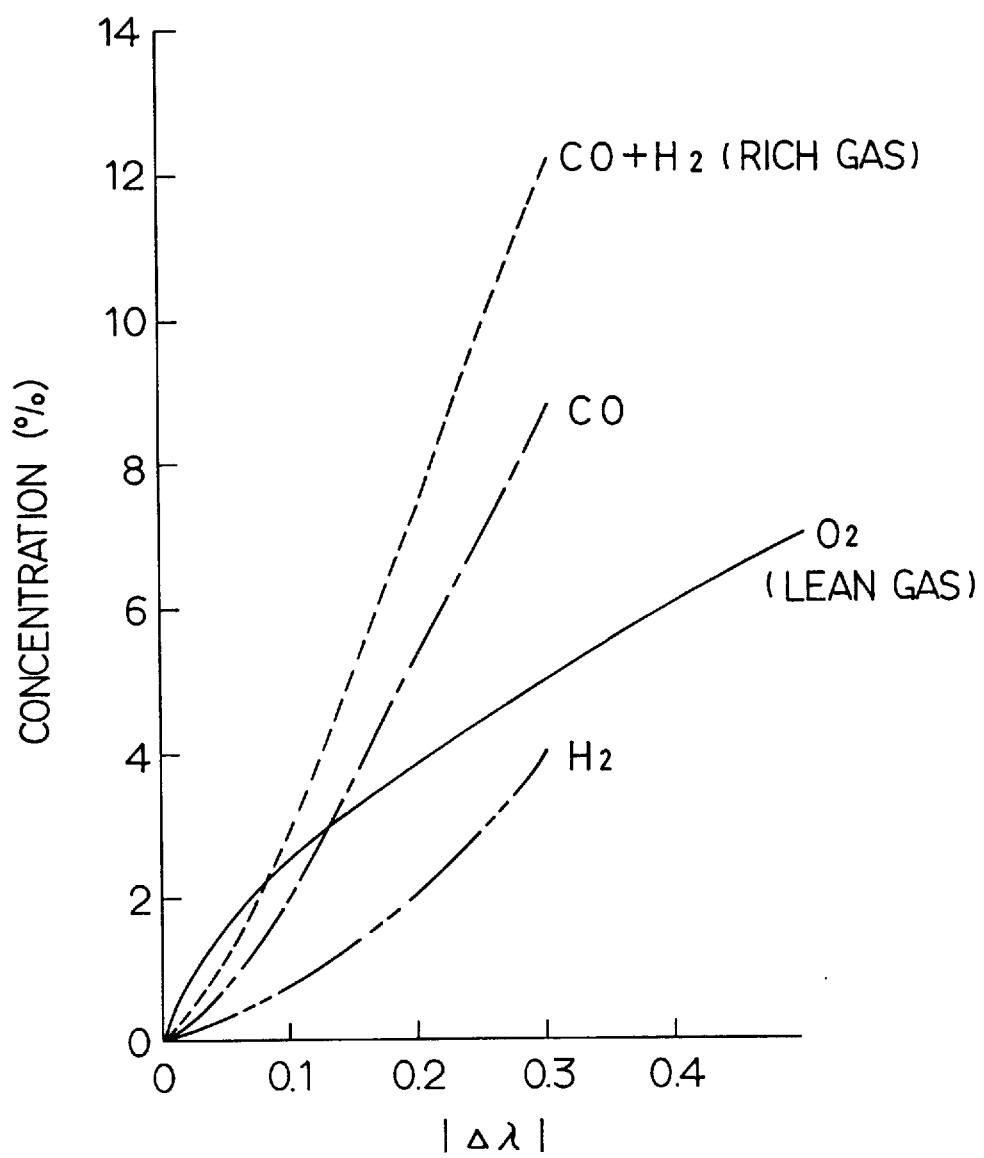
FIG. 33 is a graph showing the concentration of a lean component ($O_2$) and that of a rich component ($Co+H_2$) against an absolute value $|\lambda air|$ in excess air ratio $\lambda air$.

In the above expression, "k'" denotes a coefficient for converting the lean component quantity ΔA/F×G into a molar value and "kL" denotes a lean component correction coefficient. The reason why this lean component correction factor kL is used is as follows: FIG. 32 shows the concentration of each component against air fuel ratio A/F of inflow exhaust gas and FIG. 33 shows the relationship between the concentration of a lean component ($O_2$) and that of a rich component (Co+H2) against excess air ratio λair. In a graph shown in FIG. 33, HC is not included in a rich component. However, as shown in FIG. 32, since HC is smaller compared with CO and H2, it can be ignored. As apparent in FIGS. 32 and 33, even if air fuel ratio A/F is off on the side of a lean or rich component by the same quantity Δ A/F, the molar value of a lean component ($O_2$) and that of a rich component ($CO+H_2$) are different.

If the molar value ΔFL of the lean component quantity of exhaust gas is calculated based upon the error ΔA/F of air fuel ratio A/F from a theoretical air fuel ratio, the molar value converting coefficient k' is corrected based upon the molar concentration ratio of lean and rich components. Such correction is performed by the following two methods: In a first method, a lean component correction factor kL against a deviation |Δλ| of the excess air ratio λair from 1 is worked out with regard to a rich component as the reference (kR=1) using a kL map shown in FIG. 34. In a second method, a rich component correction factor kR against a deviation |Δλ| of the excess air ratio λair from 1 is worked out with regard to a lean component as the reference (kL=1) using a kR map shown in FIG. 35.

After an expression "ΔFL=ΔA/F×G×k0" is operated as described above, in step 806 this ΔFL is integrated to obtain a total molar value FL of a lean component quantity of exhaust gas flowing into catalyst 27.

If FA/F<F(−), that is, if air fuel ratio FA/F on the upstream side of catalyst 27 is off on the side of a rich component from the central value of FA/F, processing proceeds to step 807. A deviation ΔA/F (=FA/F−F(−)) between FA/F and the lower limit F(−) is calculated in step 807. In the next step 808, the quantity G of exhaust gas is calculated based upon the operating state of engine 11. Afterward, in step 809, the molar value ΔFR of a rich component quantity of exhaust gas flowing into catalyst 27 is calculated according to the following expression:

$$\Delta FR = \Delta A/F \times G \times k1$$

$$k0 = k' \times kR$$

In the above expression, "k'" denotes a molar value converting coefficient and "kR" denotes a rich component correction coefficient. As described above, the rich component correction coefficient kR is set using the kR map shown in FIG. 35 when a lean component is set to be reference value (kL=1). On the other hand, when a rich component is used as a reference value, the rich component correction coefficient kR is set to 1.

In the next step 810, the molar value ΔFR calculated in step 809 is integrated to obtain a total molar value FR of the rich component quantity of exhaust gas flowing into catalyst 27.

The routine is performed by interruption every combustion of each cylinder to calculate the total molar value FL of the lean component quantity and the total molar value FR of the rich component quantity during the deterioration determining period. When the deterioration determining period terminates, processing proceeds from step 800 to step 811. The total molar value FL of the lean component quantity and the total molar value FR of the rich component quantity are respectively set as period total inflow quantities FLtotal and FRtotal of the exhaust gas component. Afterward, the stored molar values ΔFL and ΔFR of the lean and rich component quantities of each exhaust gas are reset and this routine is finished.

Time charts of FIGS. 49A to 49F show an example of the processing for calculating FL and FR.

[Setting of deterioration determining periods]

A deterioration determining period during which the deterioration of catalyst 27 is determined is a period since engine 11 is started until the warming of catalyst 27 is finished, that is, the temperature of catalyst 27 rises to the temperature at which catalyst 27 works effectively, or a period since engine 11 begins to operate in a steady state after fully warmed up until a predetermined time kdt elapses. For a method of determining whether the warming of catalyst 27 is completed, there are two methods. One of them uses elapsed time after engine is started and another uses an integrated value integrating combustion energy of engine 11 after engine 11 is started. Therefore, for a method of setting a deterioration determining period, there are the following three methods.

<Setting of a deterioration determining period (1)>

Figure 36:
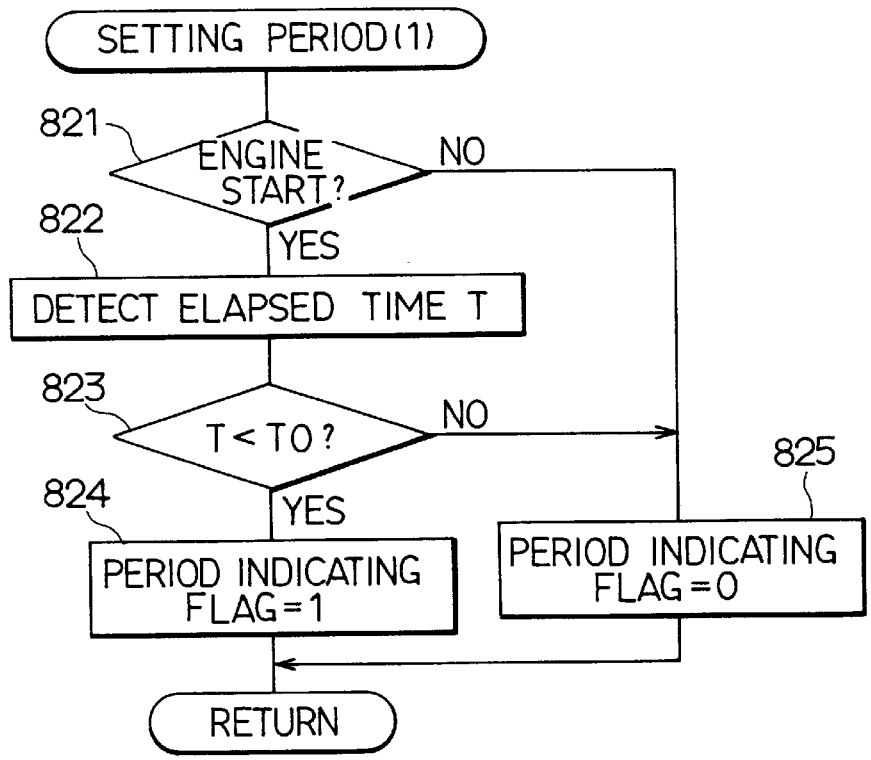
FIG. 36 is a flowchart showing a processing for setting a deterioration determination period (1)

A deterioration determining period setting routine (1) shown in FIG. 36 sets a deterioration determining period based upon elapsed time since engine 11 is started. This routine is performed by interruption each predetermined interval. In step 821, it is determined whether engine 11 is started. If engine 11 is not started, processing proceeds to step 825. In step 825, a period indicating flag is set to zero which means that the operating state of engine 11 corresponds to a state after or before the deterioration determining period and this routine is finished.

If engine 11 is started, processing proceeds from step 821 to step 822 and elapsed time T from the start of engine 11 is detected. In the next step 823, it is determined whether the elapsed time T reaches predetermined time T0 required for warming catalyst 27. If the elapsed time T does not reach the predetermined time T0, processing proceeds to step 824. In step 824, the period indicating flag is set to '1' which means that the operating state of engine 11 corresponds to a state for the deterioration determining period and this routine is finished.

Afterward, when elapsed time T from the start of engine 11 reaches predetermined time T0, the warming of catalyst 27 is considered to be completed. Processing proceeds to step 825, the period indicating flag is set to '1'.

By the above-described processing, a period since engine 11 is started until predetermined time T0 elapses is set as a deterioration determining period. The period indicating flag is held to '1' during the deterioration determining period.

<Setting of a deterioration determining period (2)>

Figure 37:
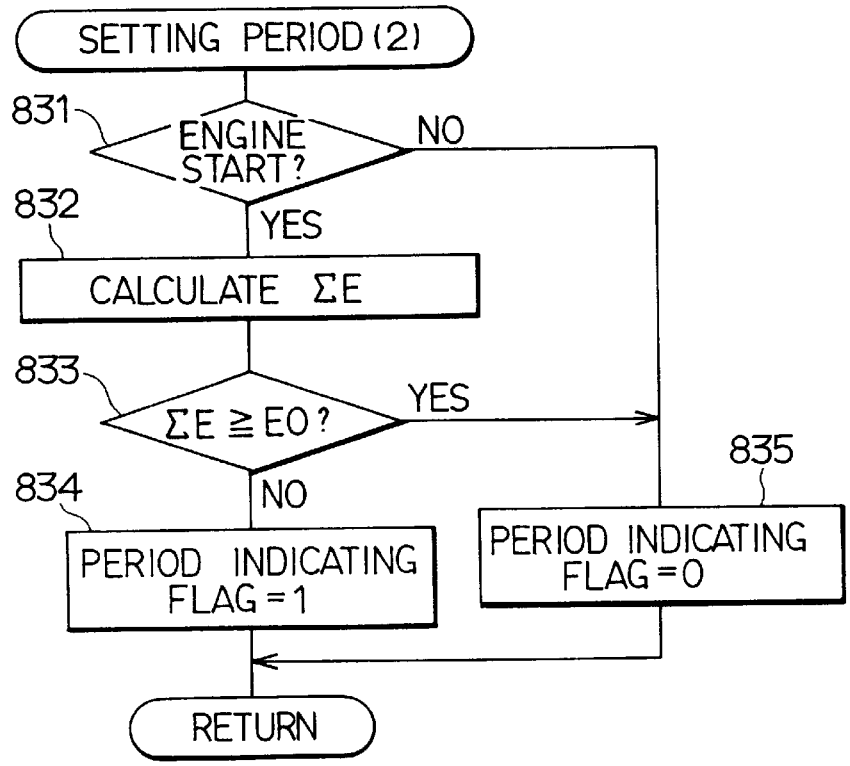
FIG. 37 is a flowchart showing a processing for setting a deterioration determination period (2)

A deterioration determining period setting routine (2) shown in FIG. 37 sets a deterioration determining period based upon the integrated value of combustion energy of engine 11 since engine 11 is started. The routine is performed by interruption every combustion of each cylinder of engine 11. In step 831, it is determined whether engine 11 is started. If engine 11 is not started, processing proceeds to step 835, a period indicating flag is set to '0' and this routine is finished.

If engine 11 is started, processing proceeds from step 831 to step 832 and combustion energy E is integrated to obtain an integrated value ΣE since engine 11 is started. The combustion energy E is calculated using a map (not shown) in which at least one of air fuel ratio, engine speed, pressure in an inlet pipe and intake air quantity is used as a parameter. In the next step 833, it is determined whether the integrated value ΣE of combustion energy E reaches a predetermined value E0 required for warming catalyst 27. If the integrated value ΣE does not reach the predetermined value E0, processing proceeds to step 834. In step 834, the period indicating flag is set to '1' and this routine is finished.

Afterward, when the integrated value ΣE of combustion energy E reaches the predetermined value E0, the warming of catalyst 27 is considered to be completed. Thus, processing proceeds to step 835, the period indicating flag is set to '0' and this routine is finished.

By the above-described processing, a period since engine 11 is started until the integrated value ΣE of combustion energy E reaches a predetermined value E0 is set as a deterioration determining period. The period indicating flag is held to '1' during the deterioration determining period.

<Setting of a deterioration determining period (3)>

Figure 38:
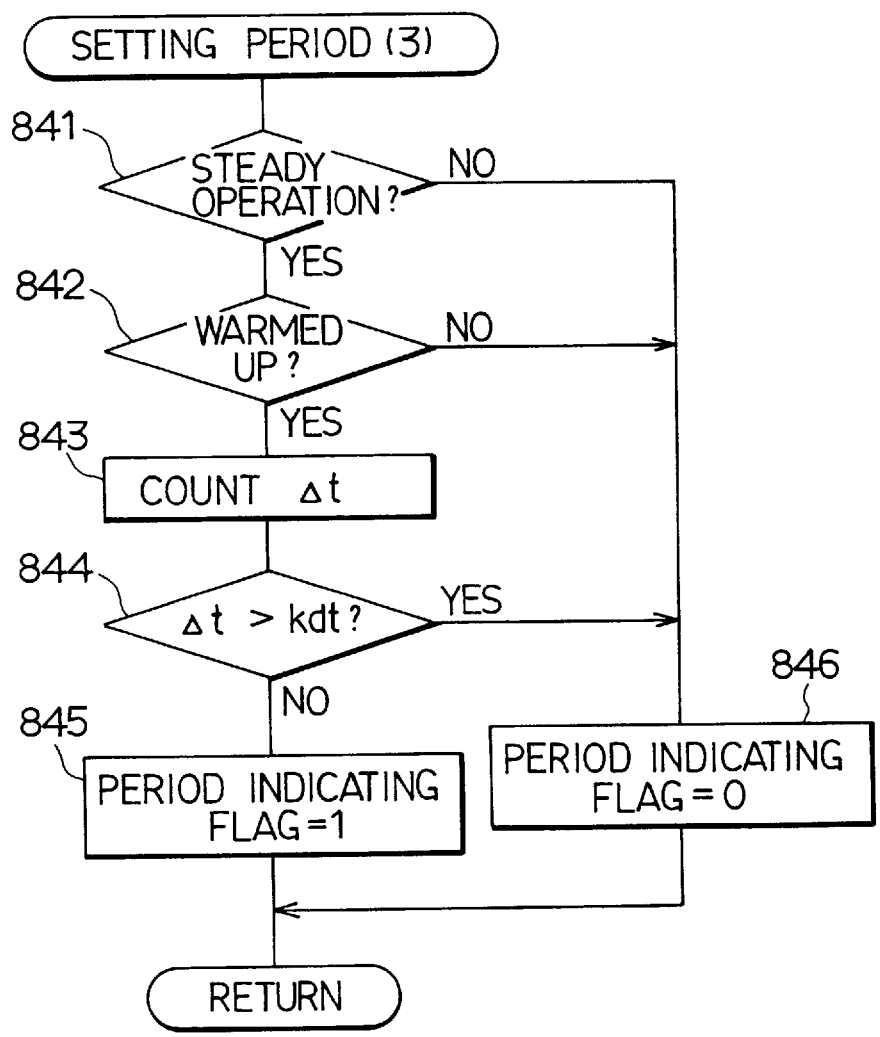
FIG. 38 is a flowchart showing a processing for setting a deterioration determination period (3)

A deterioration determining period setting routine (3) shown in FIG. 38 sets a period since engine 11 begins to operate in a steady state after fully warmed up until a predetermined time kdt elapses as a deterioration determining period. This routine is performed by interruption each predetermined interval. In step 841, it is determined whether engine 11 is operated in a steady state based upon whether engine speed, pressure in an inlet pipe, intake air quantity and others are stable. If engine 11 is operated in a steady state, processing proceeds to step 842. In step 842, it is determined based upon an engine coolant temperature whether engine 11 is fully warmed up. If engine 11 is not operated in a steady state or is not fully warmed up, processing proceeds to step 846. In step 846, the period indicating flag is set to zero and this routine is finished.

If engine 11 is operated in a steady state and fully warmed up, a deterioration determining period is started. Processing proceeds to step 843 and elapsed time Δt from the start of the deterioration determining period is counted. In the next step 844, it is determined whether the elapsed time Δt is greater than a predetermined time kdt. If the elapsed time Δt is not greater than the predetermined time kdt, processing proceeds to step 845. In step 845, the period indicating flag is set to '1' and this routine is finished. Afterward, when the elapsed time Δt is greater than the predetermined time kdt, processing proceeds to step 846. In step 846, the period indicating flag is set to zero and this routine is finished.

By the above-described processing, a period since engine 11 begins to be operated in a steady state after fully warmed up until a predetermined time kdt elapses is set as a deterioration determining period. During the period, the period indicating flag is held to '1'.

It may be enough to use either of the above-described deterioration determining period setting routines (1) to (3) respectively shown in FIGS. 36 to 38. However, the routines (1) and (3) or the routines (2) and (3) may be also used together.

[Calculation of the outflow quantity of an exhaust gas component]

Figure 39:
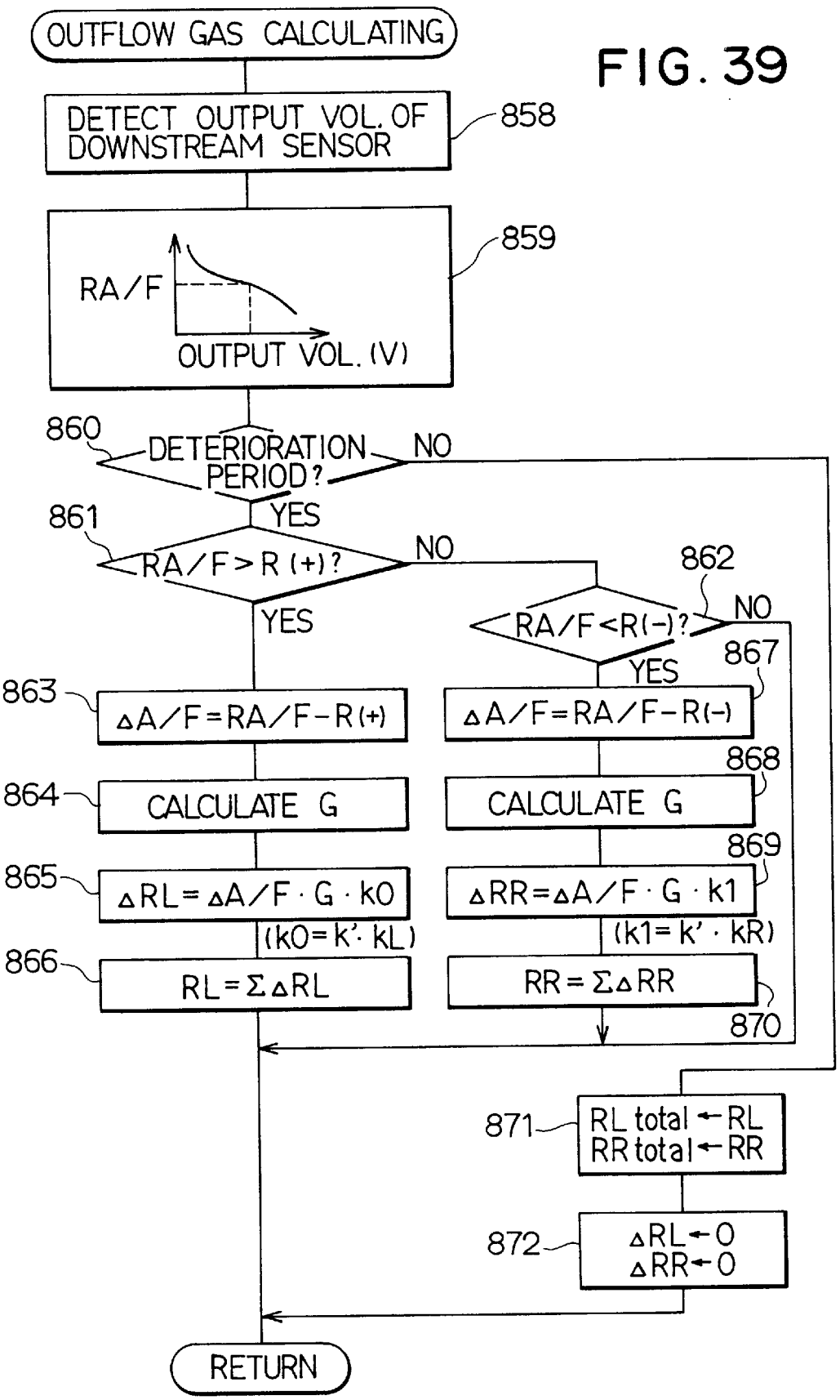
FIG. 39 is a flowchart showing an exhaust gas component outflow calculating routine.
Figure 40:
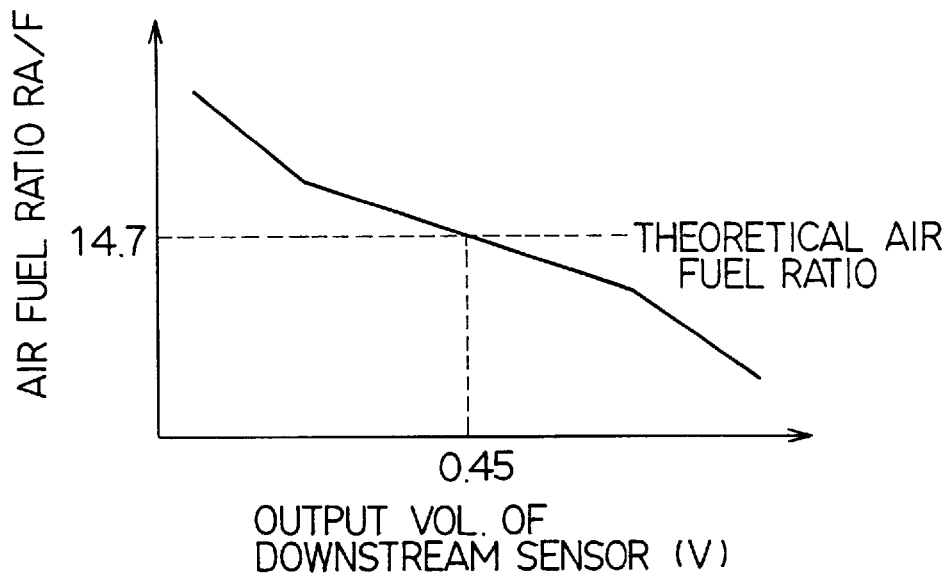
FIG. 40 is a graph schematically showing a conversion table for converting the output voltage of a downstream air-fuel ratio sensor to air fuel ratio RA/F.

Referring to FIG. 39, an exhaust gas component outflow calculating routine for calculating the total outflow quantity of exhaust gas components flowing out of catalyst 27 during the deterioration determining period will be described below. In this routine, first in step 858, the output voltage of downstream oxygen sensor 29 is detected. In the next step 859, the output voltage of downstream oxygen sensor 29 is converted to air fuel ratio RA/F according to a preset conversion table (see FIG. 40). Afterward, in step 860, it is determined whether the operating state of engine 11 corresponds to a state during a deterioration determining period. If a positive determination is made at step 860, processing proceeds to step 861 and the outflow quantity of an exhaust gas component is calculated by the processing from step 861 to 870.

In steps 861 and 862, the output RA/F of downstream air fuel ratio sensor 29 is compared with the upper limit R(+) and the lower limit R(−) of the central value of RA/F. If R(−) ≦ RA/F ≦ R(+), that is, if the output RA/F can be regarded as the central value of RA/F, this routine is finished without executing further steps.

If RA/F>R(+), that is, if air fuel ratio RA/F on the downstream side of catalyst 27 is off on the side of a lean component from the central value of RA/F, processing proceeds to step 863. A deviation ΔA/F (=RA/F−R(+)) between RA/F and the upper limit R(+) is calculated at step 863. In the next step 864, the quantity G of exhaust gas is calculated based upon the operating state of engine 11. Afterward, in step 865, the molar value ΔRL of a lean component quantity of exhaust gas flowing output of catalyst 27 is calculated according to the following expression:

$$\Delta RL = \Delta A/F \times G \times k0$$

$$k0 = k' \times kL$$

Figure 34:
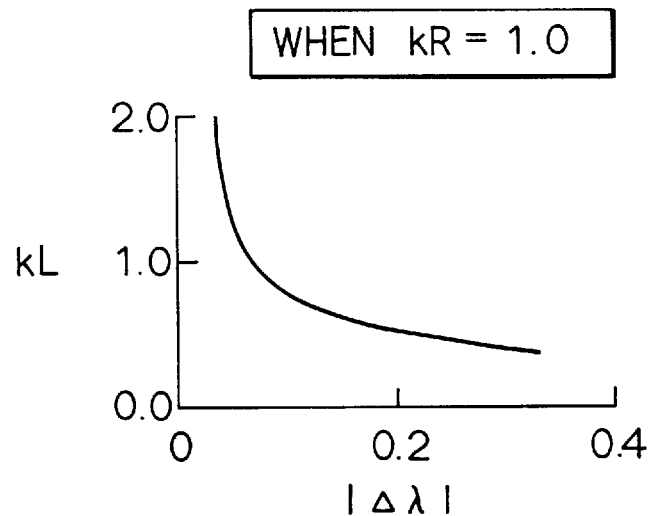
FIG. 34 shows a kL map.

In the above expression, "k'" denotes a molar value converting coefficient and "kR" denotes a lean component correction coefficient (see FIG. 34). In the next step 866, the molar value ΔRL of the lean component quantity of exhaust gas integrated to obtain a total molar value RL of the lean component quantity of exhaust gas flowing out of catalyst 27.

If RA/F<R(−), that is, if air fuel ratio RA/F on the downstream side of catalyst 27 is off on the side of a rich component from the central value of RA/F, processing proceeds to step 867. A deviation ΔA/F (=RA/F−R(−)) between RA/F and the lower limit R(−) is calculated in step 867. In the next step 868, the quantity G of exhaust gas is calculated based upon the operating state of engine 11. Afterward, in step 869, a molar value ΔRR of a rich component quantity of exhaust gas flowing out of catalyst 27 is calculated according to the following expression:

$$\Delta RR = \Delta A/F \times G \times k1$$

$$k0 = k' \times kR$$

Figure 35:
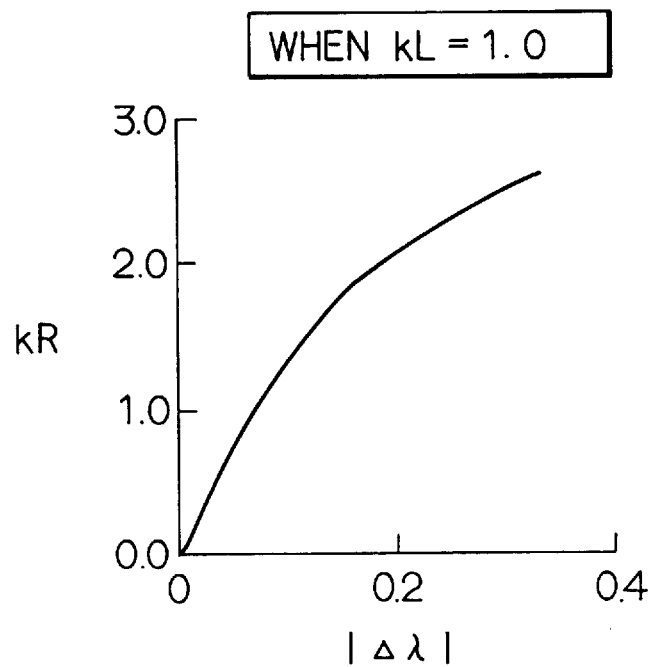
FIG. 35 shows a kR map.

In the above expression, "k'" denotes a molar value converting coefficient and "kL" denotes a rich component correction coefficient (see FIG. 35). In the next step 870, the molar value ΔRR of the rich component quantity of exhaust gas is integrated to obtain a total molar value RR of the rich component quantity of exhaust gas flowing out of catalyst 27.

The routine is performed by interruption every combustion of each cylinder to calculate the total molar value RL of the lean component quantity and the total molar value RR of the rich component quantity during the deterioration determining period. When the deterioration determining period terminates, processing proceeds from step 860 to step 871. The total molar value RL of the lean component quantity and the total molar value RR of the rich component quantity are respectively set as period total outflow quantities RLtotal and RRtotal of the exhaust gas component. Afterward, the stored molar values ΔRL and ΔRR of the lean and rich component quantities of each exhaust gas are reset and this routine is finished.

Time charts shown in FIGS. 49A to 49F show an example of the above-described processing for calculating RL and RR.

[Correction of the temperature of an element of a downstream oxygen sensor]

Figure 41:
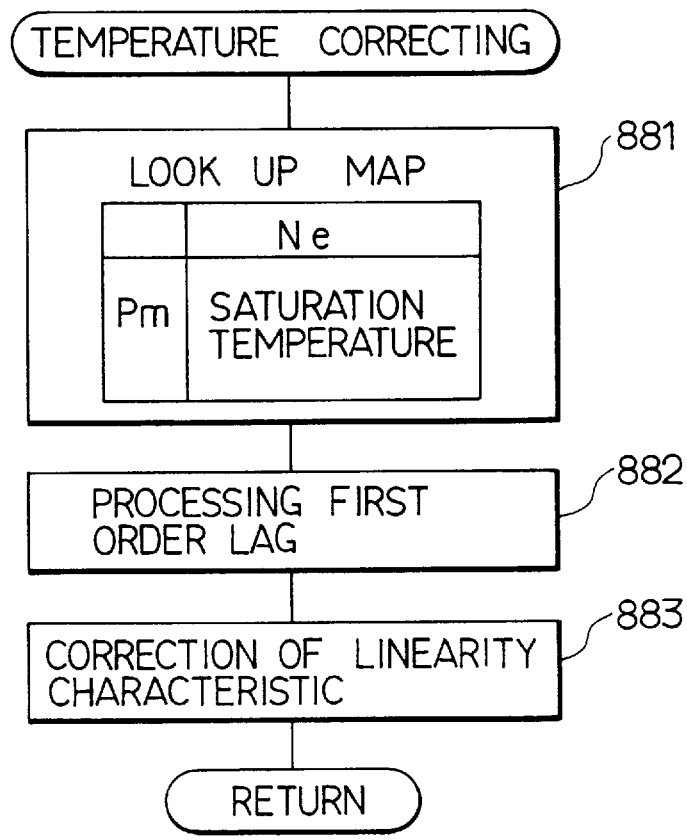
FIG. 41 is a flowchart showing a downstream air-fuel ratio sensor element temperature correcting routine.
Figure 42:
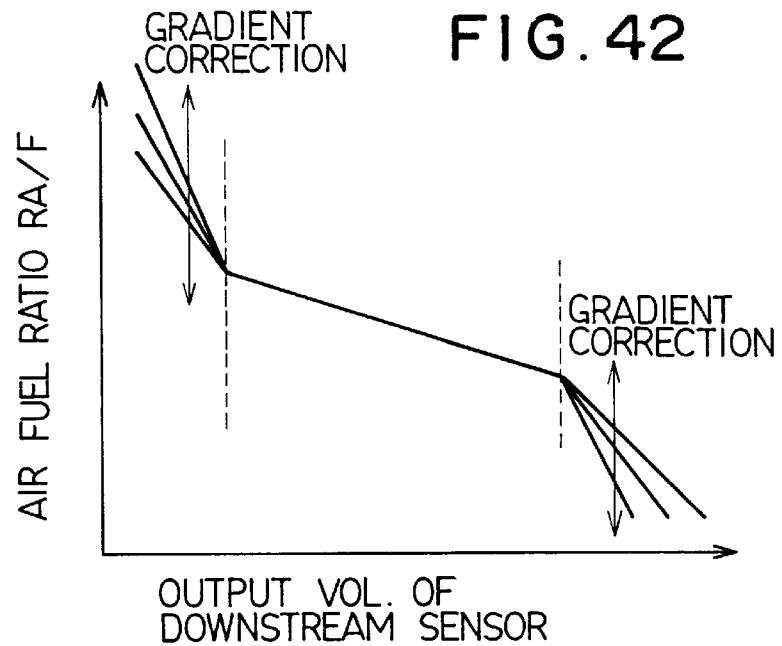
FIG. 42 is a graph schematically showing the correction of the characteristic of linearity of the conversion table based upon the temperature of the element of the downstream air-fuel ratio sensor.

A downstream oxygen sensor element temperature correcting routine shown in FIG. 41 estimates the temperature of element 51 of downstream oxygen sensor 29 and corrects the characteristic of linearity of a conversion table for converting the output voltage of downstream oxygen sensor 29 to air fuel ratio RA/F according to the estimated temperature of element 51. This is because the output characteristic of downstream oxygen sensor 29 varies according to the temperature of element 51.

In this routine, first in step 881, a saturation temperature map having engine speed Ne and pressure Pm in an inlet pipe as parameters is retrieved and the saturation temperature of downstream oxygen sensor 28, which is corresponds to the quantity of heat of exhaust gas which is substantially determined by Ne and Pm, is worked out. Afterward, in step 882, the saturation temperature is processed in first order lag and thereby the temperature of element 51 of downstream oxygen sensor 29 is estimated. It is because the change of the temperature of element 51 of downstream oxygen sensor 29 caused by the change (the change of Ne and Pm) of the quantity of heat of exhaust gas can be approximated in first order lag. In the next step 883, the characteristic of linearity of lean and rich components in the conversion table for converting the output voltage of downstream oxygen sensor 29 to air fuel ratio RA/F is corrected according to the temperature of element 51 of downstream oxygen sensor 29 (see FIG. 42).

[Correction when fuel is cut]

Figure 43:
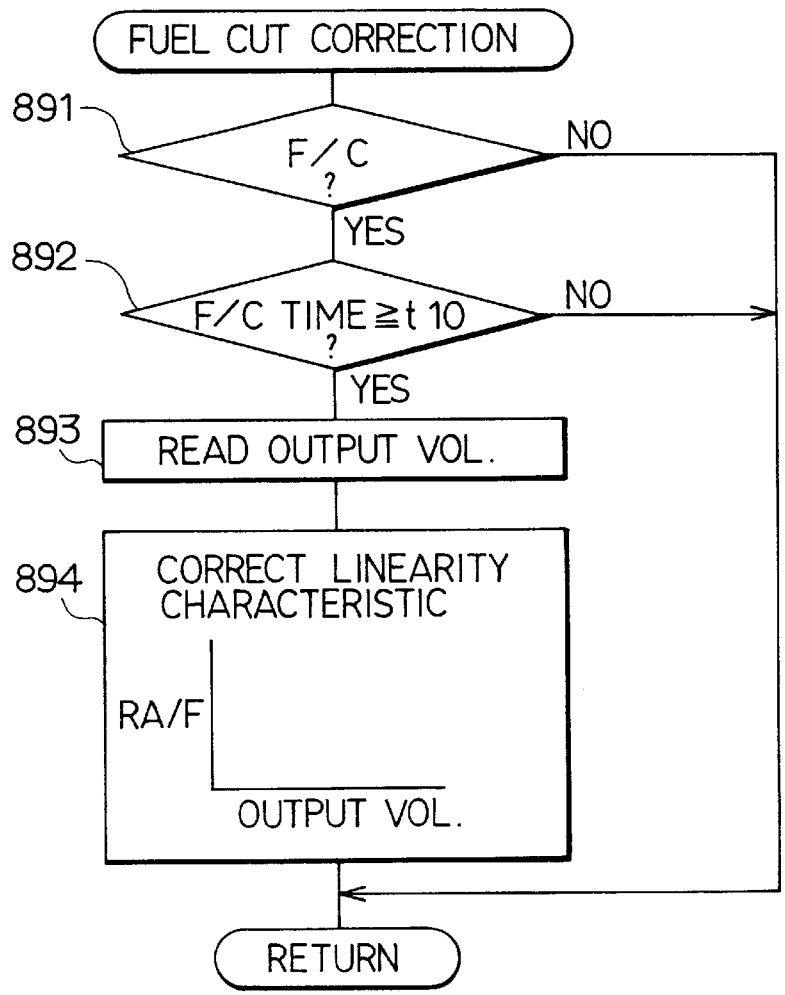
FIG. 43 is a flowchart showing a correcting routine performed when fuel is cut.
Figure 44:
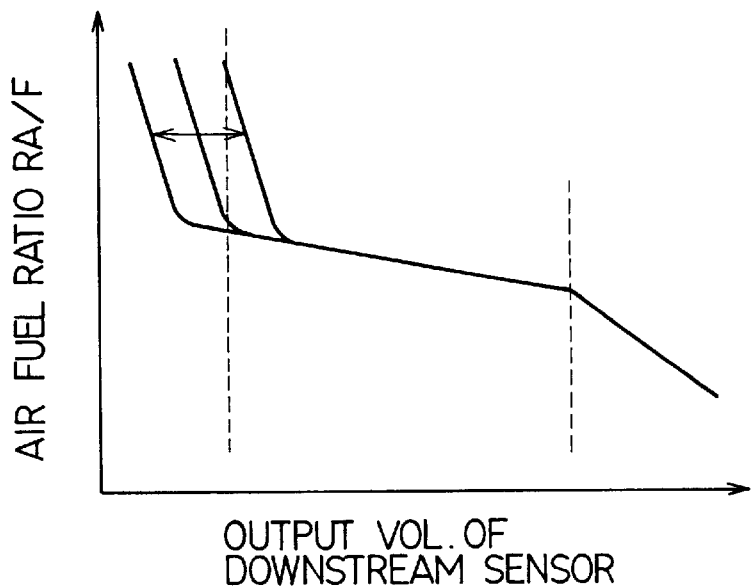
FIG. 44 is a graph schematically showing the correction of the characteristic of linearity of a lean component in the conversion table when fuel is cut.

A correction routine, which is shown in FIG. 43, corrects the characteristic of linearity of a lean component in a conversion table for converting the output voltage of downstream oxygen sensor 29 to air fuel ratio RA/F when fuel is cut. In this routine, first in step 891, it is determined whether fuel is cut (F/C). If fuel is cut, processing proceeds to step 892 and it is determined whether an elapsed time since fuel cut starts reaches a predetermined time t10. If fuel is not cut or if the elapsed time does not reach the predetermined time t10, this routine is finished without executing further steps.

If the elapsed time reaches the predetermined time t10, processing proceeds to step 893 and the output voltage of downstream oxygen sensor 29 is read. Afterward, in step 894, the characteristic of linearity of a lean component in the conversion table is corrected (see FIG. 44).

[Determination of air fuel ratio on the upstream side]

Figure 45:
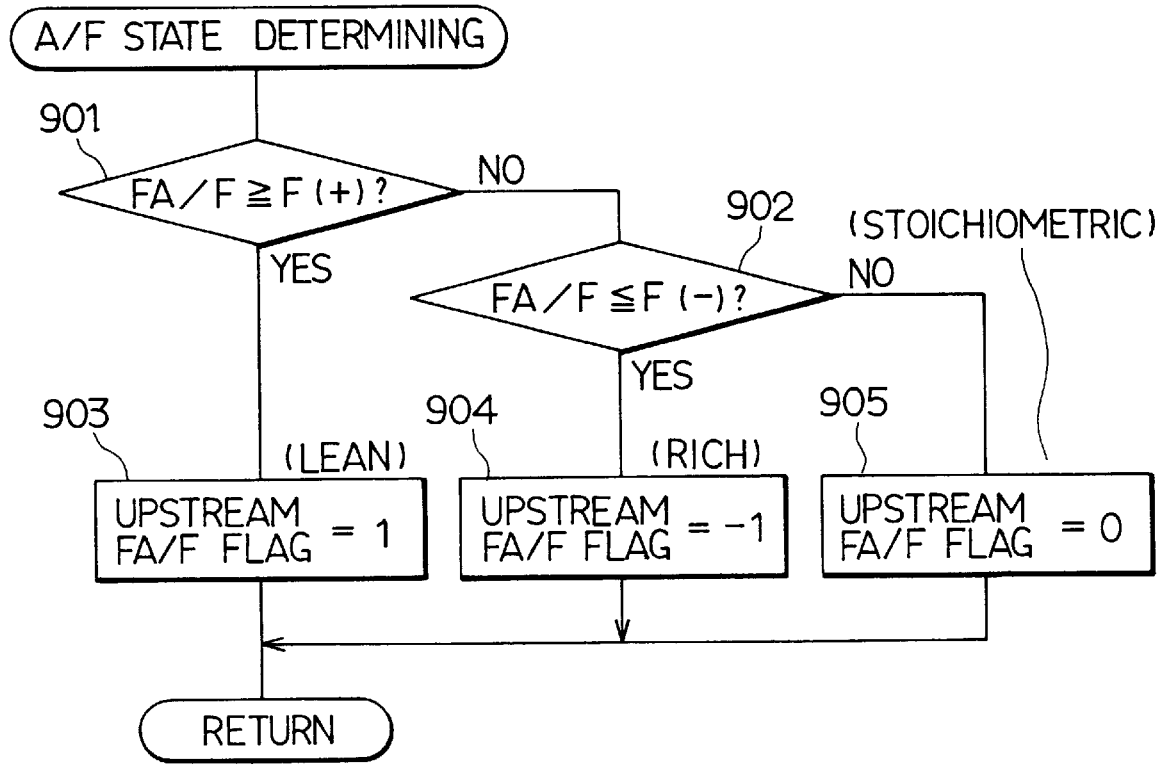
FIG. 45 is a flowchart showing an upstream air fuel ratio state determining routine.

An upstream air fuel ratio state determining routine shown in FIG. 45 determines under which of richness, leanness or stoichiometry air fuel ratio FA/F on the upstream side of catalyst 27 comes. This determination is made using the upper limit F(+) and the lower limit F(−) calculated in step 120 shown in FIG. 7.

In this routine, first in steps 901 and 902, it is determined whether air fuel ratio FA/F on the upstream side is equal to or larger than the upper limit F(+) or equal to or lower than the lower limit F(−). If FA/F≧F(+), air fuel ratio FA/F is determined to be lean. In this case, processing proceeds to step 903 and an upstream air fuel ratio flag is set to '1'. If FA/F≦F(−), air fuel ratio FA/F is determined to be rich. In this case, processing proceeds to step 904 and the upstream air fuel ratio flag is set to '−1'. If F(+)>FA/F>F(−), air fuel ratio is determined to be stoichiometric. In this case, processing proceeds to step 904 and the upstream air fuel ratio flag is set to '0'.

Time charts shown in FIGS. 49A to 49F show an example of the above-described switching timing of the upstream air fuel ratio flag.

[Determination of air fuel ratio on the downstream side]

Figure 46:
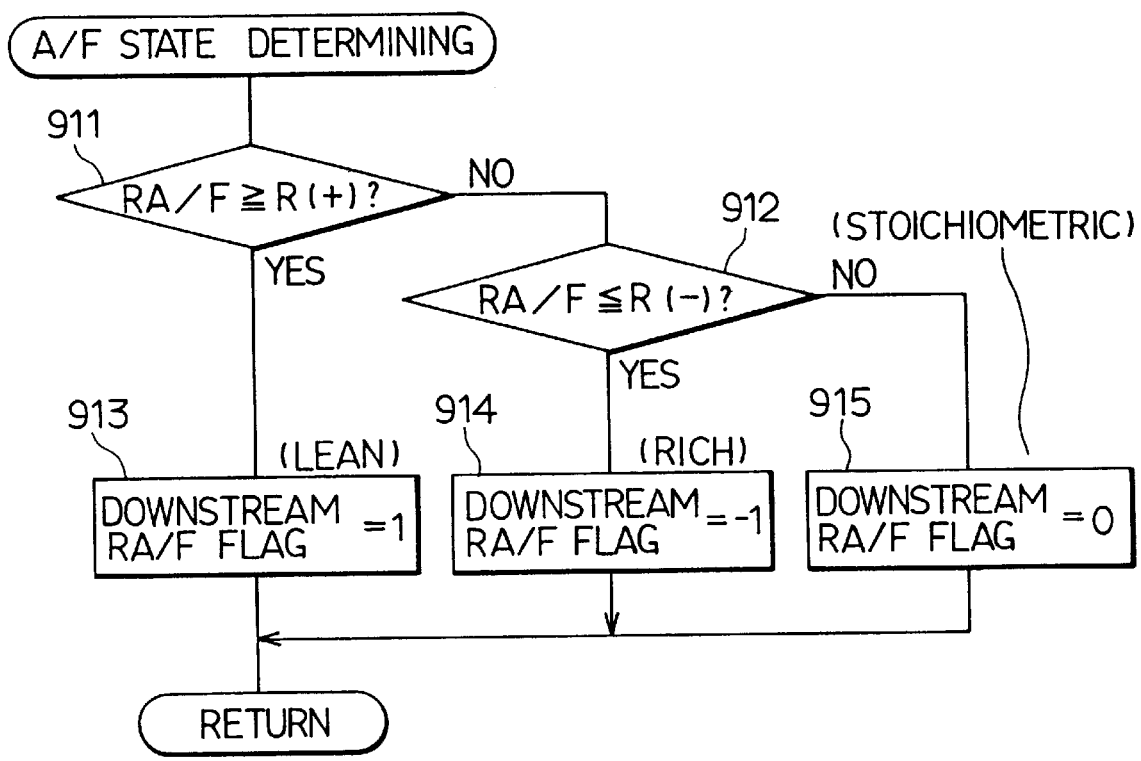
FIG. 46 is a flowchart showing a downstream air fuel ratio state determining routine.

A downstream air fuel ratio state determining routine shown in FIG. 46 determines under which of richness, leanness or stoichiometry air fuel ratio RA/F on the downstream side of catalyst 27 comes. This determination is made using the upper limit R(+) and the lower limit R(−) calculated in step 116 shown in FIG. 7.

In this routine, first in steps 911 and 912, it is determined whether air fuel ratio RA/F on the downstream side is equal to or larger than the upper limit R(+) or equal to or lower than the lower limit R(−). If RA/F≧R(+), air fuel ratio RA/F is determined to be lean. In this case, processing proceeds to step 913 and a downstream air fuel ratio flag is set to '1'. If RA/F≦R(−), air fuel ratio RA/F is determined to be rich. In this case, processing proceeds to step 914 and the downstream air fuel ratio flag is set to '−1'. If R(+)>RA/F>R(−), air fuel ratio RA/F is determined to be stoichiometric. In this case, processing proceeds to step 914 and the downstream air fuel ratio flag is set to '0'.

Time charts shown in FIGS. 49A to 49F show an example of the above-described switching timing of the downstream air fuel ratio flag.

[Cancelable calculation of the inflow quantity of an exhaust gas component]

Figure 47:
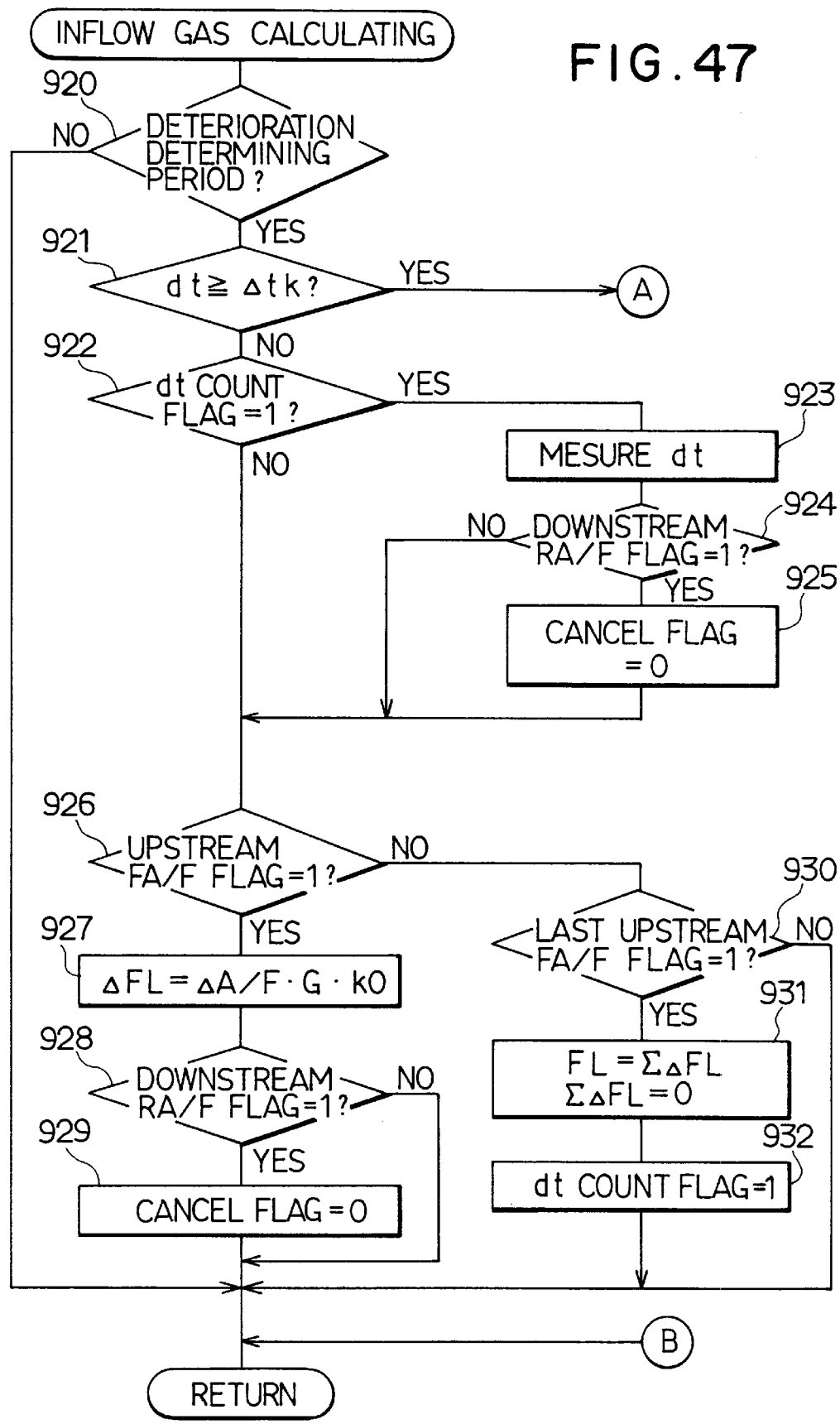
FIG. 47 is a first flowchart showing an exhaust gas component inflow calculating routine having a canceling function.
Figure 48:
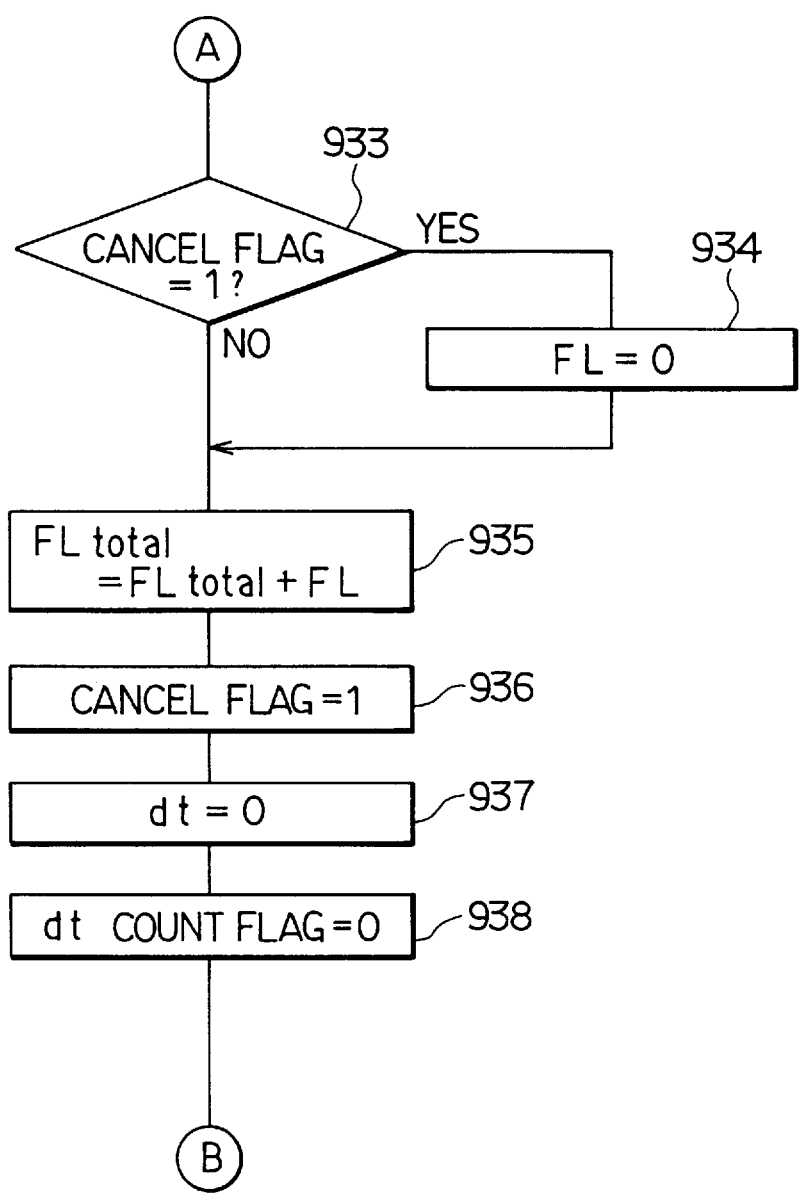
FIG. 48 is a second flowchart showing an exhaust gas component inflow calculating routine having a canceling function.

A cancelable exhaust gas component inflow calculating routine shown in FIGS. 47 and 48 adds a cancelling function to the exhaust gas component inflow calculating routine shown in FIG. 31. Therefore, if processing shown in FIGS. 47 and 48 is adopted, the processing shown in FIG. 31 is not required.

The routines shown in FIGS. 47 and 48 are executed by interruption processing every combustion of each cylinder. When a lean component is detected by upstream air fuel ratio sensor 28 during the deterioration determining period or when a predetermined time Δtk does not elapse since upstream air fuel ratio sensor 28 finishes to detect a lean component, if a lean component is not detected by downstream air fuel ratio sensor 29, it means that catalyst 27 is not saturated. Therefore, a lean component quantity of exhaust gas calculated based upon the output of upstream air fuel ratio sensor 28 is canceled (a cancel flag is set to '1') so that the lean component quantity has no effect on detecting the deterioration of a catalyst.

In detail, first in step 920, it is determined whether the operating state of engine 11 corresponds to a state in the deterioration determining period. If a negative determination is made at step 920, this routine is finished without executing further steps. If a positive determination is made at step 920, processing proceeds to step 921. In step 921, it is determined whether an elapsed time dt reaches a predetermined time Δtk since air fuel ratio on the upstream side is shifted from a lean area to a stoichiometric area. If the elapsed time dt does not reach the predetermined time Δtk, processing proceeds to step 922. In step 922, it is determined whether an elapsed time (dt) count flag has been set to '1'. Here, the dt count flag is held to '1' since the elapsed time dt is begun to measure until the elapsed time dt reaches the predetermined time Δtk.

In step 922, if it is determined that the dt count flag is '1', processing proceeds to step 923. In step 923, the elapsed time dt is measured. In the next step 924, it is determined whether a downstream air fuel ratio flag is '1' which means that air fuel ratio RA/F on the downstream side is lean. If the downstream air fuel ratio flag is '1', processing proceeds to step 925. The cancel flag is set to '0' which means that the lean component quantity FL of exhaust gas is not cancelled. If the downstream air fuel ratio flag is not '1' in step 924, step 925 is skipped and processing proceeds to step 926. The initial value of the cancel flag is set to '1' which means that the lean component quantity FL of exhaust gas is cancelled.

If the dt count flag is not '1' in step 922, processing also proceeds to step 926. In step 926, it is determined whether the upstream air fuel ratio flag is '1' which means that air fuel ratio FA/F on the upstream side is lean. If the upstream air fuel ratio flag is '1', processing proceeds to step 927. In step 927, a molar value ΔFL of a lean component quantity of exhaust gas flowing into catalyst 27 is calculated according to the following expression:

$$\Delta FL = \Delta A/F \times G \times k0$$

$$\Delta A/F = FA/F - F(+)$$

$$k0 = k' \times kL$$

In the above expression, G denotes the quantity of exhaust gas, "k'" denotes a molar value converting coefficient and "kL" denotes a lean component correction coefficient.

In the next step 928, it is determined whether the downstream air fuel ratio flag is '1' which means that air fuel ratio PA/F on the downstream side is lean. If the downstream air fuel ratio flag is '1', processing proceeds to step 929. In step 929, the cancel flag is set to '0' in order not to cancel the lean component quantity FL of exhaust gas. However, if the downstream air fuel ratio flag is not '1', this routine is finished without performing step 929.

In the above step 926, if the upstream air fuel ratio flag is not '1', processing proceeds to step 930. In step 930, it is determined whether the last upstream air fuel ratio flag is '1', that is, whether air fuel ratio on the upstream side in the last processing was lean. In step 930, "Yes" is selected immediately after the upstream air fuel ratio sensor 28 finishes to detect a lean component. In this case, in step 931, the molar value ΔFL of the lean component quantity while upstream air fuel ratio sensor detects a lean component is integrated to obtain a lean component quantity FL of exhaust gas flowing into catalyst 27 and ΣΔFL is cleared. Afterward, in step 932, the dt count flag is set to '1' and this routine is finished. If the last upstream air fuel ratio flag is not '1' in step 930, that is, if air fuel ratio on the upstream side in the last processing is not lean, this routine is finished without executing steps 931 and 932.

Afterward, when the elapsed time dt reaches the predetermined time Δtk since air fuel ratio on the upstream side is shifted from a lean area to a stoichiometric area, "Yes" is selected in step 921. Processing proceeds to step 933 shown in FIG. 48 and it is determined whether the cancel flag is '1' which means that the lean component quantity FL of exhaust gas should be cancelled. If the cancel flag is '1', processing proceeds to step 934 and the lean component quantity FL of exhaust gas is canceled. If the cancel flag is '0' which means that the lean component quantity FL of exhaust gas does not have to be cancelled, processing proceeds to the step 935 without performing step 934.

In step 935, the current lean component quantity FL of exhaust gas is added to a last total inflow quantity FLtotal of a lean component in the deterioration determining period to update the total inflow quantity FLtotal of the lean component. After the cancel flag is set to '1' in step 936, a timer dt is cleared in step 937. In the next step 938, the dt count flag is set to '0' and this routine is finished.

The above-described processing for cancellation shown in FIGS. 47 and 48 is related to the lean component quantity FL of exhaust gas. However, for the rich component quantity FR of exhaust gas, the same method may be also used. Time charts shown in FIGS. 50A to 50F show an example of the processing for cancellation.

[Counting of the frequency of saturation by a rich/lean component]

Figure 51:
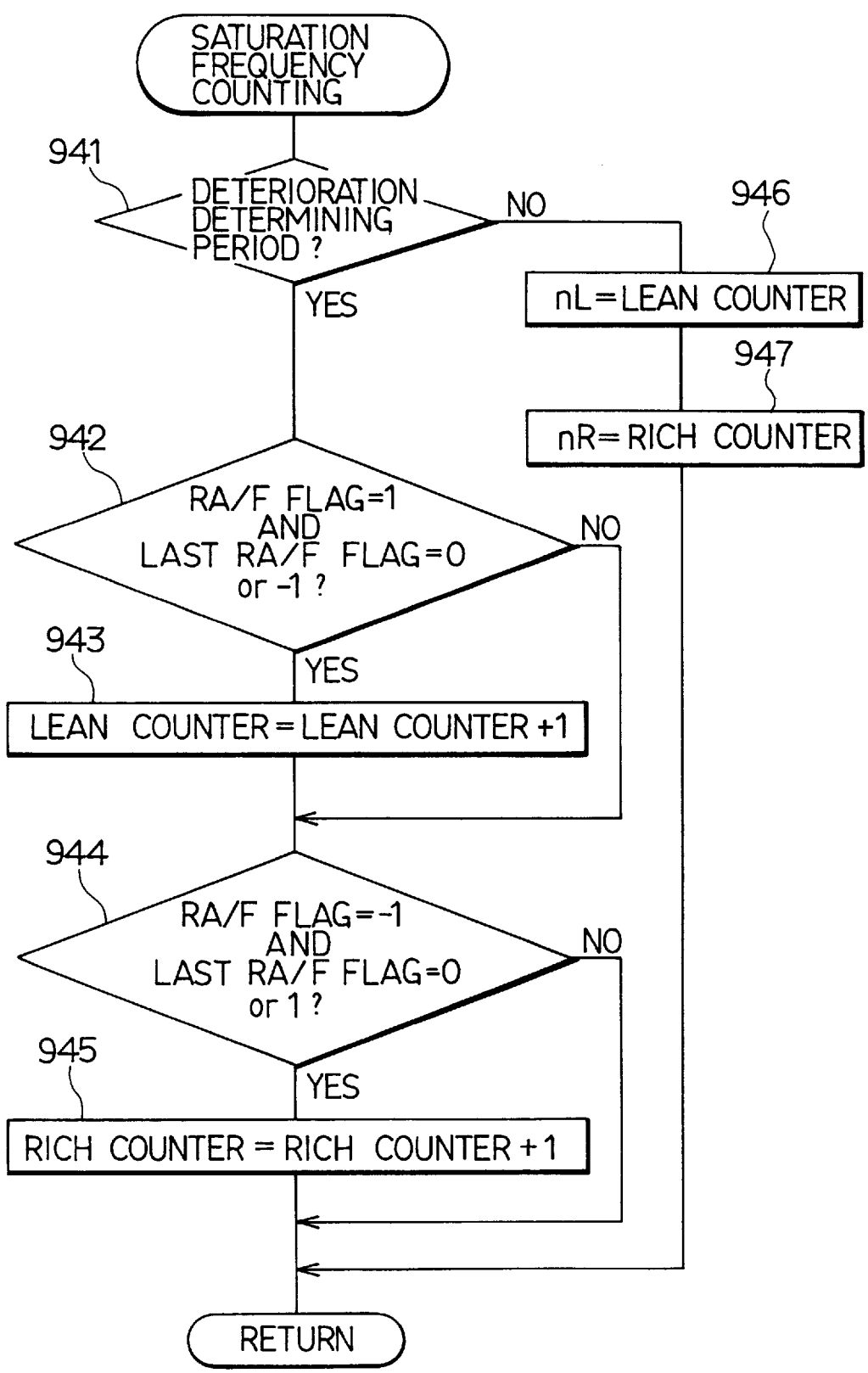
FIG. 51 is a flowchart showing a counting routine for counting a frequency wherein a catalyst is saturated by rich/lean component.

A rich/lean component saturation frequency counting routine shown in FIG. 51 counts a frequency in which the catalyst 27 is saturated with a lean component and a frequency in which it is saturated with a rich component during a deterioration determining period.

In this routine, first in step 941, it is determined whether the operating state of engine 11 corresponds to a state in the deterioration determining period based on the period indicating flag. If the period indicating flag is '1' representing the deterioration determining period, processing proceeds to step 942. In step 942, it is determined (1) whether the downstream air fuel ratio flag is set to '1' and (2) whether the current value of the downstream air fuel ratio flag is different from the last value thereof. If the above conditions (1) and (2) are simultaneously met, catalyst 27 is determined to be saturated with a lean component. Processing proceeds to step 943, a lean counter for a lean component saturation is incremented by one. However, if catalyst 27 is not saturated with a lean component, processing proceeds to step 944 without incrementing the lean counter.

In step 944, it is determined (1) whether the downstream air fuel ratio flag is set to '−1' and (2) whether the current value of the downstream air fuel ratio flag is different from the last value thereof. If the above conditions (1) and (2) are simultaneously met, catalyst 27 is determined to be saturated with a rich component. Processing proceeds to step 945 and a rich counter for a rich component saturation is incremented by one. However, if catalyst 27 is not saturated with a rich component, the routine is finished without incrementing the rich counter.

Afterward, when the deterioration determining period terminates, processing proceeds from step 941 to steps 946 and 947. The value of the lean counter and the value of the rich counter are set to nL and nR, respectively, in order to use them in a catalyst deterioration detecting routine described later and shown in FIGS. 52 and 53.

[Detection of the deterioration of catalyst 27 on the side of a lean component]

Figure 52:
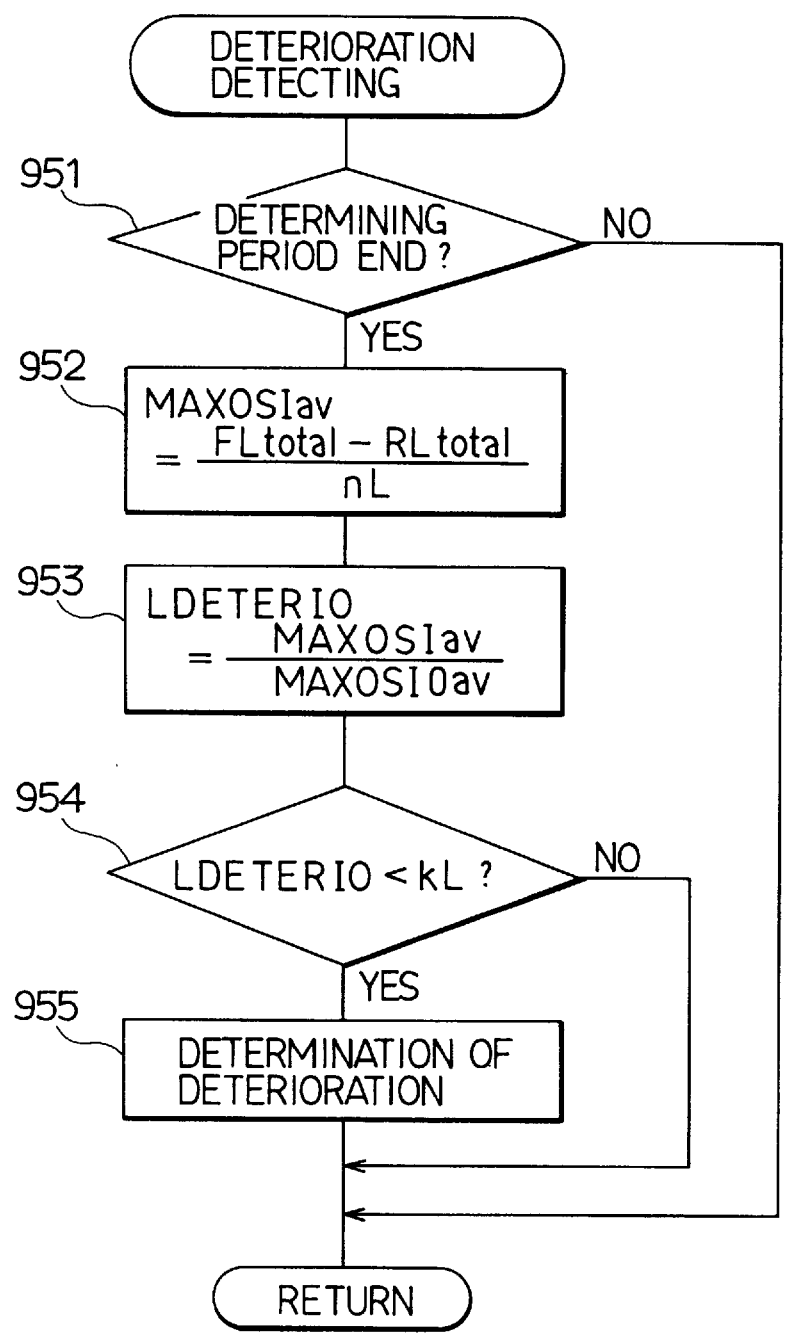
FIG. 52 is a flowchart showing a lean component catalyst deterioration detecting routine.

A lean component side catalyst deterioration detecting routine shown in FIG. 52 is executed immediately after a deterioration determining period ends (step 951). Immediately after the deterioration determining period ends, processing proceeds to step 952. In step 952, the average value MAXOSIav of the maximum quantity in which a lean component is absorbed in the deterioration determining period is calculated according to the following expression using the total inflow quantity FLtotal of an exhaust gas lean component, the total outflow quantity RLtotal of an exhaust gas lean component and a frequency nL in which a catalyst is saturated with a lean component in the deterioration determining period:

$$\text{MAX}OSIav = (FL\text{total} - RL\text{total})/nL$$

In the next step 953, the current average value MAXOSIav of the maximum quantity in which a lean component is absorbed is divided by the average value MAXOSIOav of the maximum quantity of a lean component absorbed when catalyst 27 is new to obtain a catalyst deterioration degree determination value LDETERIO. In the next step 954, the catalyst deterioration degree determination value LDETERIO is compared with a predetermined deterioration determination value kL. If LDETERIO<kL, catalyst 27 is determined to deteriorate in step 955. On the other hand, if LDETERIO≧kL, this routine is finished without determining catalyst 27 to deteriorate.

[Detection of the deterioration of catalyst 27 on the side of a rich component]

Figure 53:
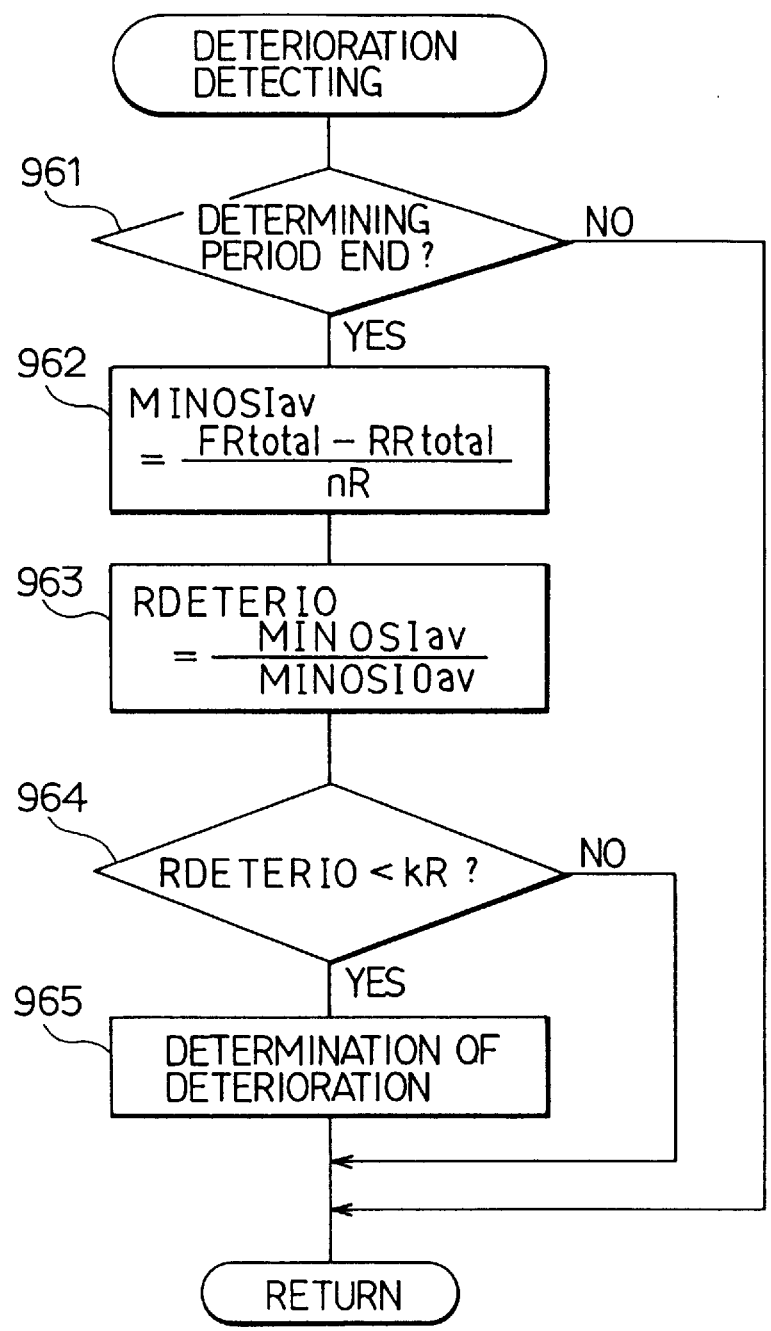
FIG. 53 is a flowchart showing a rich component catalyst deterioration detecting routine.

A rich component side catalyst deterioration detecting routine shown in FIG. 53 is executed immediately after a deterioration determining period ends (step 961). Immediately after the deterioration determining period ends, processing proceeds to step 962. In step 962, the average value MINOSIav of the maximum quantity in which a rich component is absorbed in the deterioration determining period is calculated according to the following expression using the total inflow quantity FRtotal of an exhaust gas rich component, the total outflow quantity RRtotal of an exhaust gas rich component and a frequency nR in which catalyst 27 is saturated with a rich component in the deterioration determining period:

$$\text{MIN}OSIav = (FR\text{total} - RR\text{total})/nR$$

In the next step 963, the current average value MINOSIav of the maximum quantity in which a rich component is absorbed is divided by the average value MINOSIOav of the maximum quantity of a rich component absorbed when catalyst 27 is new to obtain a catalyst deterioration degree determination value RDETERIO. In the next step 964, the catalyst deterioration degree determination value RDETERIO is compared with a predetermined deterioration determination value kR. If RDETERIO<kR, catalyst 27 is determined to deteriorate in step 965. On the other hand, if RDETERIO≧kR, this routine is finished without determining catalyst 27 to deteriorate.

Only either of catalyst deterioration detecting routines shown in FIGS. 52 and 53 may be also executed. If both routines shown in FIGS. 52 and 53 are executed, a method of determining the deterioration of catalyst 27 when the deterioration of catalyst 27 is detected by either of the routines and another of determining the deterioration of catalyst 27 when the deterioration of catalyst 27 is simultaneously detected by both routines are conceivable.

(Other Embodiment)

[Supplying injection dither]

Figure 54:
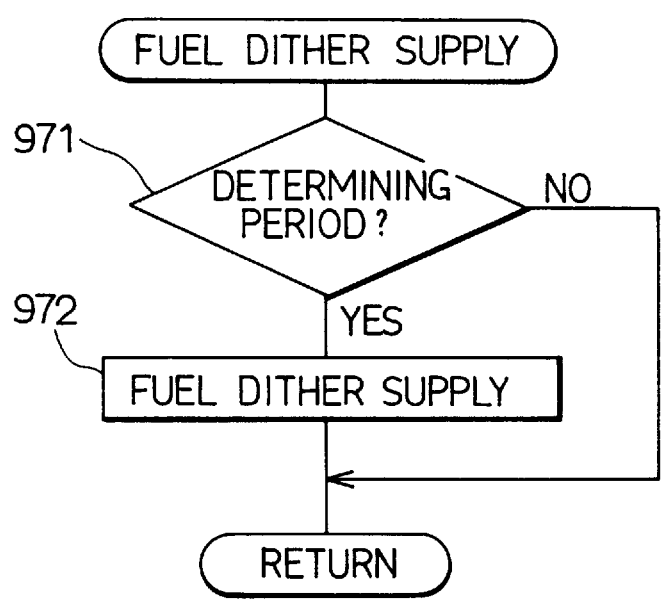
FIG. 54 is a flowchart showing an fuel injection dither supplying routine.

In a fuel dither supply routine shown in FIG. 54, first in step 971, it is determined whether the operating state of engine 11 is a state in a deterioration determining period. If it is a state in the deterioration determining period, processing proceeds to a step 972 and fuel dither supply in which fuel injection quantity is varied so that air fuel ratio of exhaust gas alternately fluctuates on the sides of a rich component and a lean component by predetermined value is executed. If it is not in the deterioration determining period, no fuel dither supply is executed. The average values MAXOSIav and MINOSIOav of the maximum quantity of an exhaust gas component absorbed by catalyst 27 during the deterioration determining period can be precisely calculated by executing the fuel dither supply during the deterioration determining period.

What is claimed is:

1. An abnormality detector for an air-fuel ratio control system, said detector comprising:

inflow calculating means for calculating an inflow quantity of an exhaust gas component flowing into a catalyst based on output signal from an air-fuel ratio sensor which detects an air fuel ratio of exhaust gas and a load condition applied to an engine when a current air fuel ratio of exhaust gas on an upstream side of said catalyst deviates from a theoretical air fuel ratio;

outflow calculating means for calculating an outflow quantity of an exhaust gas component flowing out of said catalyst based on output signal from an air-fuel ratio sensor which detects an air fuel ratio of exhaust gas and a load condition applied to an engine when a current air fuel ratio of exhaust gas on a downstream side of said catalyst deviates from a theoretical air fuel ratio; and catalyst state detecting means for detecting a state of said catalyst based upon the result of calculations made by said inflow calculating means and said outflow calculating means.

2. An abnormality detector for an air-fuel ratio control system according to claim 1, wherein:

said inflow calculating means uses a central value of air fuel ratio of exhaust gas on the upstream aide of said catalyst when an engine is operated in a steady state as said theoretical air fuel ratio; and said outflow calculating means uses a central value of air fuel ratio of exhaust gas on the downstream side of said catalyst when said engine is operated in a steady state as said theoretical air fuel ratio.

3. An abnormality detector for an air-fuel ratio control system according to claim 2, wherein:

said inflow calculating means operates said inflow quantity of said exhaust gas component flowing into said catalyst based upon a difference between said current air fuel ratio and said central value of air fuel ratio of exhaust gas on the upstream side of said catalyst and a load condition applied to said engine; and said outflow calculating means operates said outflow quantity of said exhaust gas component flowing out of said catalyst based upon a difference between said current air fuel ratio and said central value of air fuel ratio of exhaust gas on the downstream side of said catalyst and a load condition applied to said engine.

4. An abnormality detector for an air-fuel ratio control system according to claim 3, wherein:

said inflow calculating means calculates an inflow quantity of a rich component of exhaust gas flowing into said catalyst as said inflow quantity of said exhaust gas quantity when said current air fuel ratio on the upstream side of said catalyst deviates toward a side of a rich component from said central value of air fuel ratio;

said inflow calculating means calculates an inflow quantity of a lean component of exhaust gas flowing into said catalyst as said inflow quantity of said exhaust gas component when said current air fuel ratio on the upstream side of said catalyst deviates toward a side of a lean component from said central value of air fuel ratio;

said outflow calculating means calculates an outflow quantity of a rich component of exhaust gas flowing out of said catalyst as said outflow quantity of said exhaust gas quantity when said current air fuel ratio on the downstream side of said catalyst deviates toward a side of a rich component from said central value of air fuel ratio; and said outflow calculating means calculates an outflow quantity a lean component of exhaust gas flowing out of said catalyst as said outflow quantity of said exhaust gas component when said current air fuel ratio on the downstream side of said catalyst deviates toward a side of a lean component from said central value of air fuel ratio.

5. An abnormality detector for an air-fuel ratio control system according to claim 1, wherein:

said inflow calculating means includes molar value converting means for converting said inflow quantity of said exhaust gas component to a molar value of a rich component or a lean component of exhaust gas; and said outflow calculating means includes molar value converting means for converting said outflow quantity of said exhaust gas component to a molar value of a rich component or a lean component of exhaust gas.

6. An abnormality detector for an air-fuel ratio control system according to claim 1, wherein:

said inflow calculating means includes prohibiting means for prohibiting an operation of said inflow quantity of said exhaust gas component when a deviation between said current air fuel ratio and said central value of said air fuel ratio of exhaust gas on the upstream side of said catalyst is in a predetermined range; and said outflow calculating means includes prohibiting means for prohibiting an operation of said outflow quantity of said exhaust gas component when a deviation between said current air fuel ratio and said central value of said air fuel ratio of exhaust gas on the downstream side of said catalyst is in a predetermined range.

7. An abnormality detector for an air-fuel ratio control system according to claim 1, wherein said catalyst state detecting means includes:

period setting means for setting a deterioration determining period during which deterioration of said catalyst is determined; and catalyst deterioration detecting means for detecting deterioration of said catalyst based upon a total inflow quantity and a total outflow quantity of said exhaust gas component during said deterioration determining period set by said period setting means.

8. An abnormality detector for an air-fuel ratio control system according to claim 4, wherein said catalyst state detecting means detects the state of said catalyst based on each of a rich component and lean component of exhaust gas.

9. An abnormality detector for an air-fuel ratio control system, said detector comprising:

inflow calculating means for calculating an inflow quantity of an exhaust gas component flowing into a catalyst when a current air fuel ratio of exhaust gas on an upstream side of said catalyst deviates from a theoretical air fuel ratio;

outflow calculating means for calculating an outflow quantity of an exhaust gas component flowing out of said catalyst when a current air fuel ratio of exhaust gas on a downstream side of said catalyst deviates from a theoretical air fuel ratio; and catalyst state detecting means for detecting a state of said catalyst based upon the result of calculations made by said inflow calculating means and said outflow calculating means;

wherein said catalyst state detecting means includes means for deriving a current quantity of said exhaust gas component absorbed by said catalyst by subtracting said outflow quantity of said exhaust gas component from said inflow quantity of said exhaust gas component when an absolute value of said outflow quantity of said exhaust gas component is smaller than a predetermined value.

10. An abnormality detector for an air-fuel ratio control system, said detector comprising:

inflow calculating means for calculating an inflow quantity of an exhaust gas component flowing into a catalyst when a current air fuel ratio of exhaust gas on an upstream side of said catalyst deviates from a theoretical air fuel ratio;

outflow calculating means for calculating an outflow quantity of an exhaust gas component flowing out of said catalyst when a current air fuel ratio of exhaust gas on a downstream side of said catalyst deviates from a theoretical air fuel ratio; and catalyst state detecting means for detecting a state of said catalyst based upon the result of calculations made by said inflow calculating means and said outflow calculating means;

wherein said catalyst state detecting means includes means for deriving a maximum quantity of said exhaust gas component absorbed by said catalyst by subtracting said outflow quantity of said exhaust gas component from said inflow quantity of said exhaust gas component when an absolute value of said outflow quantity of said exhaust gas component is equal to or greater than a predetermined value.

11. An abnormality detector for an air-fuel ratio control system, said detector comprising:

inflow calculating means for calculating an inflow quantity of an exhaust gas component flowing into a catalyst when a current air fuel ratio of exhaust gas on an upstream side of said catalyst deviates from a theoretical air fuel ratio;

outflow calculating means for calculating an outflow quantity of an exhaust gas component flowing out of said catalyst when a current air fuel ratio of exhaust gas on a downstream side of said catalyst deviates from a theoretical air fuel ratio; and catalyst state detecting means for detecting a state of said catalyst based upon the result of calculations made by said inflow calculating means and said outflow calculating means;

wherein:

said catalyst state detecting means includes:

current quantity deriving means for deriving a current quantity of said exhaust gas component absorbed by said catalyst by subtracting said outflow quantity of said exhaust gas component from said inflow quantity of said exhaust gas component when an absolute value of said outflow quantity of said exhaust gas component is smaller than a predetermined value;

maximum quantity deriving means for deriving a maximum quantity of said exhaust gas component absorbed by said catalyst by subtracting said outflow quantity of said exhaust gas component from said inflow quantity of said exhaust gas component when an absolute value of said outflow quantity of said exhaust gas component is equal to or greater than a predetermined value; and catalyst deterioration detecting means for detecting a degree of deterioration of said catalyst by comparing said maximum quantity of said exhaust gas component absorbed by said catalyst with a maximum quantity of said exhaust gas component absorbed by said catalyst when said catalyst does not deteriorate.

12. An abnormality detector for an air-fuel ratio control system, said detector comprising:

inflow calculating means for calculating an inflow quantity of an exhaust gas component flowing into a catalyst when a current air fuel ratio of exhaust gas on an upstream side of said catalyst deviates from a theoretical air fuel ratio;

outflow calculating means for calculating an outflow quantity of an exhaust gas component flowing out of said catalyst when a current air fuel ratio of exhaust gas on a downstream side of said catalyst deviates from a theoretical air fuel ratio; and catalyst state detecting means for detecting a state of said catalyst based upon the result of calculations made by said inflow calculating means and said outflow calculating means;

wherein:

said catalyst state detecting means includes:

period setting means for setting a deterioration determining period during which deterioration of said catalyst is determined; and catalyst deterioration detecting means for detecting deterioration of said catalyst based upon a total inflow quantity and a total outflow quantity of said exhaust gas component during said deterioration determining period set by said period setting means; and said catalyst state detecting means includes:

saturation frequency counting means for counting a frequency in which said catalyst is saturated with lean/rich component during said deterioration determining period;

maximum quantity average value calculating means for calculating an average value of a maximum quantity of said lean/rich component of said exhaust gas absorbed by said catalyst by dividing a maximum quantity obtained by subtracting a total outflow quantity of said lean/rich component from a total inflow quantity of said lean/rich component during said deterioration determining period by said frequency in which said catalyst is saturated, counted by said saturation frequency counting means; and catalyst deterioration detecting means for detecting a degree of deterioration of said catalyst based upon said average value of said maximum quantity of said lean/rich component absorbed by said catalyst.

13. An abnormality detector for an air-fuel ratio control system according to claim 12, wherein said catalyst deterioration detecting means includes means for detecting said degree of deterioration of said catalyst by comparing said average value of said maximum quantity of said lean/rich component absorbed by said catalyst with an average value of maximum quantity of said lean/rich component absorbed by said catalyst when said catalyst does not deteriorate.

14. An abnormality detector for an air-fuel ratio control system, comprising:

a catalyst provided in an exhaust pipe of an engine for purifying exhaust gas exhausted from said engine;

an upstream air fuel ratio sensor for detecting air fuel ratio on an upstream side of said catalyst;

a downstream air fuel ratio sensor for detecting air fuel ratio on a downstream side of said catalyst;

inflow calculating means for calculating an inflow quantity of an exhaust gas component flowing into said catalyst based upon an output of said upstream air fuel ratio sensor and a load condition applied to said engine;

outflow calculating means for calculating an outflow quantity of an exhaust gas component flowing out of said catalyst based upon an output of said downstream air fuel ratio sensor and a load condition applied to said engine; and catalyst state detecting means for detecting a state of said catalyst based upon said inflow quantity of said exhaust gas component and said outflow quantity of said exhaust gas component calculated by said inflow calculating means and said outflow calculating means.

15. An abnormality detector for an air-fuel ratio control system, said detector comprising:

a catalyst provided in an exhaust pipe of an engine for purifying exhaust gas exhausted from said engine;

an upstream air fuel ratio sensor for detecting air fuel ratio on an upstream side of said catalyst;

a downstream air fuel ratio sensor for detecting air fuel ratio on a downstream side of said catalyst;

inflow calculating means for calculating inflow quantity of an exhaust gas component flowing into said catalyst based upon an output of said upstream air fuel ratio sensor;

outflow calculating means for calculating an outflow quantity of an exhaust gas component flowing out of said catalyst based upon an output of said downstream air fuel ratio sensor; and catalyst state detecting means for detecting a state of said catalyst based upon said inflow quantity of said exhaust gas component and said outflow quantity of said exhaust gas component calculated by said inflow calculating means and said outflow calculating means;

wherein:

said downstream air fuel ratio sensor has output characteristics in which its output signal varies linearly according to air fuel ratio of exhaust gas while an operating voltage is applied thereto and its output is inverted depending upon air fuel ratio being rich or lean while said operating voltage is not applied;

said outflow calculating means calculates said outflow quantity of said exhaust gas component flowing out of said catalyst based upon a difference between an air fuel ratio detected by said downstream air fuel sensor and a central value of air fuel ratios detected by said downstream air fuel ratio when said engine is operated in a steady state and a load condition applied to said engine; and determining means for determining whether said central value of air fuel ratio is to be calculated based upon an output of said downstream air fuel ratio sensor when said operating voltage is not applied to said downstream air fuel ratio sensor.

16. An abnormality detector for an air-fuel ratio control system according to claim 15, further comprising:

output correcting means for correcting an output of said downstream air fuel ratio sensor based upon a central value of air fuel ratio obtained when said downstream air fuel ratio sensor does not deteriorate and said central value of air fuel ratio operated in said outflow calculating means.

17. An abnormality detector for an air-fuel ratio control system, said detector comprising:

a catalyst provided in an exhaust pipe of an engine for purifying exhaust gas exhausted from said engine;

an upstream air fuel ratio sensor for detecting air fuel ratio on an upstream side of said catalyst;

a downstream air fuel ratio sensor for detecting air fuel ratio on a downstream side of said catalyst;

inflow calculating means for calculating inflow quantity of an exhaust gas component flowing into said catalyst based upon an output of said upstream air fuel ratio sensor;

outflow calculating means for calculating an outflow quantity of an exhaust gas component flowing out of said catalyst based upon an output of said downstream air fuel ratio sensor; and catalyst state detecting means for detecting a state of said catalyst based upon said inflow quantity of said exhaust gas component and said outflow quantity of said exhaust gas component calculated by said inflow calculating means and said outflow calculating means;

wherein said downstream air fuel ratio sensor is an oxygen sensor an output voltage of which inverts depending upon air fuel ratio of exhaust gas being rich or lean, and further comprising:

output linearizing means for converting said output voltage of said oxygen sensor into air fuel ratio by linearizing said output voltage.

18. An abnormality detector for an air-fuel ratio control system, said detector comprising:

inflow calculating means for calculating an inflow quantity of an exhaust gas component flowing into a catalyst when a current air fuel ratio of exhaust gas on an upstream side of said catalyst deviates from a theoretical air fuel ratio;

outflow calculating means for calculating an outflow quantity of an exhaust gas component flowing out of said catalyst when a current air fuel ratio of exhaust gas on a downstream side of said catalyst deviates from a theoretical air fuel ratio; and catalyst state detecting means for detecting a state of said catalyst based upon the result of calculations made by said inflow calculating means and said outflow calculating means;

upstream and downstream air fuel ratio sensors respectively installed on an upstream side and on a downstream side of a catalyst provided in an exhaust pipe of an engine to purify exhaust gas;

means for calculating a central value of air fuel ratio on the upstream side of said catalyst based upon an output of said upstream air fuel ratio sensor;

means for calculating a central value of air fuel ratio on the downstream side of said catalyst based upon an output of said downstream air fuel ratio sensor;

means for calculating an error between said central value of air fuel ratio on the upstream side of said catalyst and said central value of air fuel ratio on the downstream side of said catalyst; and sensor abnormality determining means for determining an abnormality of said upstream air fuel ratio sensor or said downstream air fuel ratio sensor based upon whether said error is in a predetermined range.

19. An abnormality detector for an air-fuel ratio control system according to claim 18, further comprising:

upstream sensor abnormality determining means for determining an abnormality of said upstream air fuel ratio sensor.

20. An abnormality detector for an air-fuel ratio control system according to claim 19, wherein said upstream sensor abnormality determining means determines said abnormality of said upstream air fuel ratio sensor based upon a variation of air fuel ratio detected by said upstream air fuel ratio sensor or a control parameter changed according to said variation of air fuel ratio.

21. An abnormality detector for an air-fuel ratio control system according to claim 20, further comprising:

basic injection quantity calculating means for calculating a basic injection quantity according to an operating state of said engine;

air fuel ratio correction value setting means for setting an air fuel ratio correction value according to a deviation between air fuel ratio detected by said upstream air fuel ratio sensor and a target air fuel ratio; and injection control means for controlling fuel injection quantity applied to said engine based upon said basic injection quantity and said air fuel ratio correction value, wherein said upstream sensor abnormality determining means determines said abnormality of said upstream air fuel ratio sensor based upon a variation of air fuel ratio detected by said upstream air fuel ratio sensor when said basic injection quantity is suddenly varied.

22. An abnormality detector for an air-fuel ratio control system according to claim 20, further comprising:

basic injection quantity calculating means for calculating a basic injection quantity according to an operating state of said engine;

air fuel ratio correction value setting means for setting an air fuel ratio correction value according to a deviation between air fuel ratio detected by said upstream air fuel ratio sensor and a target air fuel ratio; and injection control means for controlling fuel injection quantity applied to said engine based upon said basic injection quantity and said air fuel ratio correction value, wherein said upstream sensor abnormality determining means determines said abnormality of said upstream air fuel ratio sensor based upon a variation of air fuel ratio correction value set by said air fuel ratio correction value setting means when said basic injection quantity is suddenly varied.

23. An abnormality detector for an air-fuel ratio control system according to claim 21, further comprising:

target air fuel ratio setting means for setting a target air fuel ratio according to an operating state of said engine, wherein said upstream sensor abnormality determining means for determining abnormality of said upstream air fuel ratio sensor by comparing a magnitude of a variation of said air fuel ratio correction value set by said air fuel ratio correction value setting means and a magnitude of a variation of target air fuel ratio set by said target air fuel ratio setting means when said target air fuel ratio is varied.

24. An abnormality detector for an air-fuel ratio control system according to claim 21, further comprising:

injection quantity correcting means for increasing or reducing an injection quantity according to an operating state of said engine; and total correction quantity calculating means for calculating a total correction quantity for said basic injection quantity calculated by said basic injection quantity calculating means when said injection quantity is corrected by said injection quantity correcting means, wherein said upstream sensor abnormality determining means determines said abnormality of said upstream air fuel ratio sensor by comparing said total correction quantity calculated by said total correction quantity calculating means and a variation of air fuel ratio detected by said upstream air fuel ratio sensor when said injection quantity is increased or reduced by said injection quantity correcting means.

25. An abnormality detector for an air-fuel ratio control system according to claim 21, further comprising:

amplitude detecting means for detecting an amplitude of fluctuation of air fuel ratio detected by said upstream air fuel ratio sensor, wherein:

said upstream sensor abnormality determining means determining said abnormality of said upstream air fuel ratio sensor based upon said amplitude of fluctuation of air fuel ratio detected by said amplitude detecting means when an operating state of said engine is in a non-steady state.

26. An abnormality detector for an air-fuel ratio control system according to claim 19, further comprising determining means for determining which of said upstream air fuel ratio sensor and said downstream air fuel ratio sensor is abnormal based upon a result determined by said sensor abnormality determining means and a result determined by said upstream sensor abnormality determining means.

27. An abnormality detector for an air-fuel ratio control system in which upstream and downstream air fuel ratio sensors are respectively installed on an upstream side and on a downstream side of a catalyst provided in an exhaust pipe of an engine to purify exhaust gas, comprising:

means for calculating a central value of air fuel ratio on the upstream side of said catalyst based upon an output of said upstream air fuel ratio sensor;

means for calculating a central value of air fuel ratio on the downstream side of said catalyst based upon an output of said downstream air fuel ratio sensor;

means for calculating an error between said central value of air fuel ratio on the upstream side of said catalyst and said central value of air fuel ratio on the downstream side of said catalyst; and sensor abnormality determining means for determining an abnormality of said upstream air fuel ratio sensor or said downstream air fuel ratio sensor based upon whether said error is in a predetermined range.

28. An abnormality detector for an air-fuel ratio control system according to claim 27, further comprising:

upstream sensor abnormality determining means for determining an abnormality of said upstream air fuel ratio sensor.

29. An abnormality detector for an air-fuel ratio control system according to claim 27, wherein said upstream sensor abnormality determining means determines said abnormality of said upstream air fuel ratio sensor based upon a variation of air fuel ratio detected by said upstream air fuel ratio sensor or a control parameter changed according to said variation of air fuel ratio.

30. An abnormality detector for an air-fuel ratio control system according to claim 29, further comprising:

basic injection quantity calculating means for calculating a basic injection quantity according to an operating state of said engine;

air fuel ratio correction value setting means for setting an air fuel ratio correction value according to a deviation between air fuel ratio detected by said upstream air fuel ratio sensor and a target air fuel ratio; and injection control means for controlling fuel injection quantity applied to said engine based upon said basic injection quantity and said air fuel ratio correction value, wherein said upstream sensor abnormality determining means determines said abnormality of said upstream air fuel ratio sensor based upon a variation of air fuel ratio detected by said upstream air fuel ratio sensor when said basic injection quantity is suddenly varied.

31. An abnormality detector for an air-fuel ratio control system according to claim 29, further comprising:

basic injection quantity calculating means for calculating a basic injection quantity according to an operating state of said engine;

air fuel ratio correction value setting means for setting an air fuel ratio correction value according to a deviation between air fuel ratio detected by said upstream air fuel ratio sensor and a target air fuel ratio; and injection control means for controlling fuel injection quantity applied to said engine based upon said basic injection quantity and said air fuel ratio correction value, wherein said upstream sensor abnormality determining means determines said abnormality of said upstream air fuel ratio sensor based upon a variation of air fuel ratio correction value set by said air fuel ratio correction value setting means when said basic injection quantity is suddenly varied.

32. An abnormality detector for an air-fuel ratio control system according to claim 30, further comprising:

target air fuel ratio setting means for setting a target air fuel ratio according to an operating state of said engine, said upstream sensor abnormality determining means determining abnormality of said upstream air fuel ratio sensor by comparing a variation of said air fuel ratio correction value set by said air fuel ratio correction value setting means and a variation of target air fuel ratio set by said target air fuel ratio setting means when said target air fuel ratio is suddenly varied.

33. An abnormality detector for an air-fuel ratio control system according to claim 30, further comprising:

injection quantity correcting means for increasing or reducing an injection quantity according to an operating state of said engine; and total correction quantity calculating means for calculating a total correction quantity for said basic injection quantity calculated by said basic injection quantity calculating means when said injection quantity is corrected by said injection quantity correcting means, wherein said upstream sensor abnormality determining means determines said abnormality of said upstream air fuel ratio sensor by comparing said total correction quantity calculated by said total correction quantity calculating means and a variation of air fuel ratio detected by said upstream air fuel ratio sensor when said injection quantity is increased or reduced by said injection quantity correcting means.

34. An abnormality detector for an air-fuel ratio control system according to claim 30, further comprising:

amplitude detecting means for detecting an amplitude of fluctuation of air fuel ratio detected by said upstream air fuel ratio sensor, wherein:

said upstream sensor abnormality determining means determining said abnormality of said upstream air fuel ratio sensor based upon said amplitude of fluctuation of air fuel ratio detected by said amplitude detecting means when an operating state of said engine is in a transient state.

35. An abnormality detector for an air-fuel ratio control system according to claim 28, further comprising determining means for determining which of said upstream air fuel ratio sensor and said downstream air fuel ratio sensor is abnormal based upon a result determined by said sensor abnormality determining means and a result determined by said upstream sensor abnormality determining means.

* * * * *